United States Patent [19]

Masatsugu et al.

[11] Patent Number: 4,700,401
[45] Date of Patent: Oct. 13, 1987

[54] METHOD AND APPARATUS FOR CHARACTER RECOGNITION EMPLOYING A DEAD-BAND CORRELATOR

[75] Inventors: Cary H. Masatsugu, Freemont; Bruce S. Denning, San Jose; Martin N. Nelson, Danville, all of Calif.

[73] Assignee: Dest Corporation, Milpitas, Calif.

[21] Appl. No.: 902,071

[22] Filed: Aug. 27, 1986

Related U.S. Application Data

[63] Continuation of Ser. No. 470,241, Feb. 28, 1983, abandoned.

[51] Int. Cl.⁴ ............................................. G06K 9/64
[52] U.S. Cl. .......................................... 382/34; 382/30
[58] Field of Search ........................ 382/69, 54, 27, 30, 382/34, 42; 364/728

[56] References Cited

U.S. PATENT DOCUMENTS

| | | | |
|---|---|---|---|
| 3,167,746 | 1/1965 | Reines et al. | 382/69 |
| 3,219,974 | 11/1965 | Rabinow | 382/9 |
| 3,274,550 | 9/1966 | Klein | 382/48 |
| 3,295,105 | 12/1966 | Gray et al. | 382/48 |
| 3,303,466 | 2/1967 | Holt | 382/9 |
| 3,496,543 | 2/1970 | Greenly | 382/9 |
| 3,618,016 | 11/1971 | Van Steenis | 382/30 |
| 3,629,826 | 12/1971 | Cutala et al. | 382/9 |
| 3,634,822 | 1/1972 | Chow | 382/69 |
| 3,760,356 | 9/1973 | Srivastava | 382/30 |
| 3,805,237 | 4/1974 | Cobb et al. | 382/9 |
| 3,818,445 | 6/1974 | Neville | 382/54 |
| 3,820,067 | 6/1974 | Shepard | 382/17 |
| 3,846,754 | 11/1974 | Oka et al. | 382/55 |
| 3,878,509 | 4/1975 | Kikuchi et al. | 382/35 |
| 3,905,018 | 9/1975 | Gray | 382/34 |
| 3,934,225 | 1/1976 | De Possel | 382/26 |
| 4,153,897 | 5/1979 | Yasuda et al. | 382/30 |
| 4,288,782 | 9/1981 | Bader et al. | 382/34 |
| 4,308,523 | 12/1981 | Schapira | 382/34 |

OTHER PUBLICATIONS

IBM Technical Disclosure Bulletin, vol. 15, No. 5 (Oct. 1972), "Amount Line Finding Logic", K. Kerchmar.
IBM Technical Disclosure Bulletin, vol. 14, No. 9, Feb. 1972, "Iterative Segmentation", R. J. Baumgartner.

*Primary Examiner*—Leo H. Boudreau
*Attorney, Agent, or Firm*—Flehr, Hohbach, Test, Albritton & Herbert

[57] ABSTRACT

A character recognition system is disclosed utilizing a dead-band correlator for providing recognition of printed typestyles having horizontal and vertical stroke width variations without impairing the resolution required for character feature analysis. The system provides fewer character-to-mask registration errors, simultaneous computation of correlation scores of registration positions of masks with respect to the unknown character to compensate for additional registration errors, improved reject and substitution rates by utilizing unique threshold and separation requirements for masks, lower error rates by using small and large noise filtering and combining dual level acceptance criteria used in conjunction with re-try methods, stroke width normalization to aid in recognition of characters with badly degraded stroke widths, and selection of specific mask sets during multiple typestyle recognition processing than has previously been possible.

48 Claims, 41 Drawing Figures

Fig. 9

| RELATIVE ADDRESS | | | | | | | | | |
|---|---|---|---|---|---|---|---|---|---|
| 0 | LENGTH | CHKSUM | | NAME | | | CPP FLAGS | RPP OFFSET | TABLE LENGTH |
| 10H | TRAN TBL OFFSET | ISO TBL OFFSET | T/S TBL OFFSET | BP TBL OFFSET | BASE T | BASE S | TEST MASK OFFSET | | |
| 20H | C O P Y R I G H T   D E S T | | | | | | | | |
| 30H | O. R P O R A T I O N   1 9 8 2 | | | | | | | | |

CPP FLAGS – CONTEXTUAL POST PROCESSING FLAGS

RPP OFFSET – OFFSET TO RECOGNITION POST PROCESSING TABLES

TABLE LENGTH – LENGTHS OF TRANSLATION TABLES AND THRESHOLD/SEPARATION TABLES

TRAN TBL OFFSET – OFFSET TO TRANSLATION TABLE
ISO TBL OFFSET – OFFSET TO ISOLATION PARAMETER TABLE
T/S TBL OFFSET – OFFSET TO THRESHOLD / SEPARATION TABLE
BP TBL OFFSET – OFFSET TO FIRST BREAKPOINT TABLE
BASE T – BASE THRESHOLD
BASE S – BASE SEPARATION
TEST MASK OFFSET – OFFSET TO TEST MASK

BREAKPOINT TABLE DESCRIPTION

BYTE
0 – MINIMUM HEIGHT REQUIREMENT
1 – MAXIMUM HEIGHT RESTRICTION
2 – SCORE REPORTING THRESHOLD
3 – BREAKPOINT MASK COUNT
4-5 – OFFSET TO FIRST MASK
6-7 – BREAKPOINT MASK ADDRESS

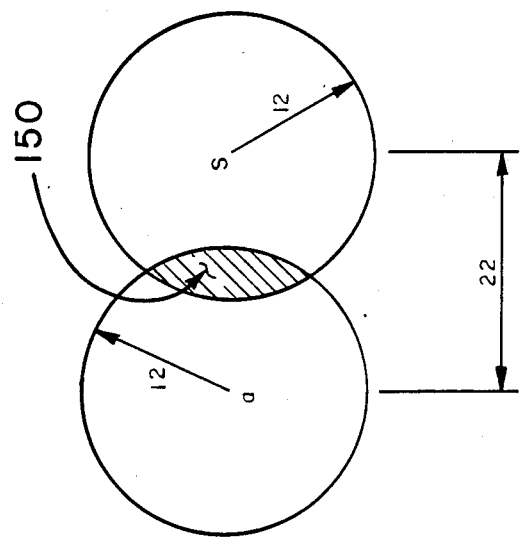
Fig. 14c
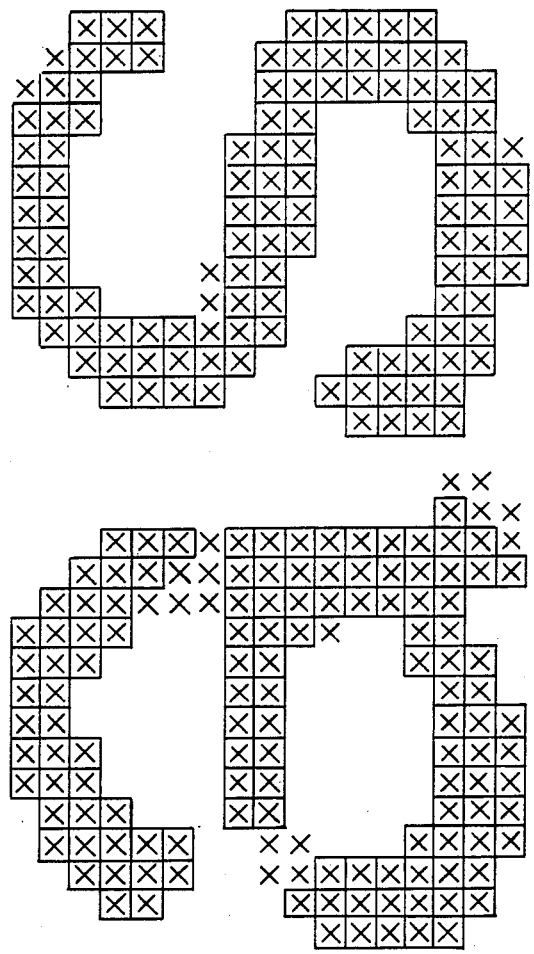
Fig. 14b
Fig. 14a

| Correlator Name | Number of Bits of Shift of Mask Bit and Region | Number of Bits of Shift of Character Bit and Regions |
|---|---|---|
| 1 Center Center | 0 (M13) | 0 (C13) |
| 2 Up Center | 1 Up (M14) | 0 (C13) |
| 3 Down Center | 1 Down (M12) | 0 (C13) |
| 4 Center Right | 0 (M13) | 1 Right (C12) |
| 5 Center Left | 0 (M13) | 1 Left (C14) |
| 6 Up Right | 1 Up (M14) | 1 Right (C12) |
| 7 Up Left | 1 Up (M14) | 1 Left (C14) |
| 8 Down Right | 1 Down (M12) | 1 Right (C12) |
| 9 Down Left | 1 Down (M12) | 1 Left (C124) |

Fig. 23

METHOD AND APPARATUS FOR CHARACTER RECOGNITION EMPLOYING A DEAD-BAND CORRELATOR

This is a continuation of application Ser. No. 470,241 filed Feb. 28, 1983, now abandoned.

BACKGROUND OF THE INVENTION

A simple bit-level correlation scheme for use in a character recognition apparatus entails a one-to-one comparison between each character pixel and its associated mask pixel. For purposes of this specification, a pixel is defined as an individual picture element. Every pixel is given a weight of one or zero, for a mismatch or match respectively. FIGS. 1a and 1b illustrate an example of this scheme. The resulting mismatch count, hereby referred to as the character score for the specific mask, ranges from 0 for a character which is completely identical to a mask, to 768 (i.e., 24×32) for a character which is the negative of a mask. This correlation scheme can be represented by the following equation:

$$\text{SCORE}_{(character)} = \sum_{x=0}^{24} \sum_{y=0}^{32} c_{xy} \oplus m_{xy}$$

where $c_{xy}$ is the character pixel value (either 0 or 1) at row x and column y, and $m_{xy}$ is the associated mask pixel value (either 0 or 1) and $\oplus$ is the "exclusive-OR" logical operation. This technique produces the highest degree of resolution available in a bit matching system. In FIGS. 1a and 1b, pixels labeled $x^a$ in the character to be identified have no counterparts in corresponding locations in the mask, and pixels labeled $x^b$ in the mask have no counterparts in corresponding locations in the character. If the pixels are each weighted by a score of "1", the resulting mismatched score is the sum of $x^a + x^b$, which in the example equals 24.

Maximum resolution is not necessarily desirable for purposes of character recognition. The resulting scores are representative of absolute pixel variations and are not necessarily responsive to character feature variations. An example of such high resolution creating improper identification is shown in FIGS. 2a-2c. Assuming that FIGS. 2a and 2b represent the mask fields for a lower case 'l' and upper case 'I', respectively, an unknown character as diagrammed in FIG. 2c produces scores of 9 for the I mask and 18 for the l mask, as summarized below:

| Mask | Pixel Mismatch | | Weight | | Score |
|---|---|---|---|---|---|
| Mismatched Score: l | 18 | × | 1 | = | 18 |
| I | 9 | × | 1 | = | 9 |

The unknown character, a slightly degraded lower case 'l', is identified as the wrong symbol. Cases such as this occur frequently when a large spectrum of characters are processed. The correlation scheme favors the wrong mask, due to the fact that each pixel mismatch carries the same weight, regardless of the location of that pixel with respect to the main strokes of the characters. Note that in this example the mismatching pixels of the upper case 'I' mask are farther away from the nearest matching pixel, whereas the mismatching pixels of the lower case 'l' mask are only one pixel distance away from the nearest matching pixel.

To counteract this shortcoming, a correlator can be developed that weighs each pixel mismatch as a function of that pixel's distance to the nearest matching pixel. A large weight would be attached to a mismatched pixel that is located a great distance from the nearest matching pixel, and a small weight would be attached to a mismatched pixel that is adjacent to a matching pixel. An example of this grading scheme is shown in FIGS. 3a and 3b for the examples in FIGS. 1a and 1b. A mismatch one pixel away from a matching pixel is given the weight of 0.5; a mismatch two pixels away from the matching pixel is given a weight of 2; and, mismatches n pixels away from the matching pixel are given the weight $n^2$. Thus, pixels 'a' are one pixel distance from the nearest matching pixel, and a weight of 0.5 is given for 'a' pixels. Pixels labeled 'b' are two pixels away, and are weighted 2. Pixels labeled 'c' are three pixels away, and are weighted 9.

The resulting mismatched score is:

| | |
|---|---|
| 8 'a' pixels (× .5) = | 4 pts. |
| 8 'b' pixels (× 2) = | 16 pts. |
| 8 'c' pixels (× 9) = | 72 pts. |
| 24 Pixels = | 92 Pts. |

The example of FIG. 2 with a distance-weighted correlation scheme is illustrated in FIG. 4, with the resulting mismatched score as given below:

| | Mask | Pixel Mismatch | | Weight | | Score |
|---|---|---|---|---|---|---|
| Mismatched Score: | l | 18 | × | .5 | = | 9.0 |
| | I | 3 | × | .5 | = | 1.5 |
| | | 3 | × | 2 | = | 6.0 |
| | | 3 | × | 9 | = | 18.0 |
| | | 27 | | | = | 25.5 |

Hence, the unknown character is properly identified as a lower case "l". Unfortunately, a distance-weighted correlation implementation is both costly and time-consuming, requiring a conversion from bit-level weighting having only two states to multiply level weighting having many states.

SUMMARY OF THE INVENTION

A simple approximation of the distance scheme with binary states can be accomplished by weighting mismatches within a specific distance around and matching pixel with a weight of zero. Each character pixel is compared with the associated mask pixel and a logically OR'ed combination of adjacent mask pixels, hereafter referred to as the dead-band region. The single mask pixel is similarly compared with the associated character pixel and a combination of adjacent character pixels. The specific pixels used in the dead-band region are chosen to be the pixels immediately above and below, and to the right and left of pixel in question.

Since most character strokes are vertically and horizontally oriented, variations between characters and ideal masks tend to appear in those directions. Typical copiers tend to round character corners and blur strokes in directions perpendicular to the page edge, and different sources of type faces commonly have different stroke widths. The dead-band region of the present invention is selected to accommodate stroke width variations and degradations in the horizontal and vertical directions. The result is that the resolution of the correlator is decreased, but this reduction in resolution does not affect the ability to differentiate character features that extend a known number of pixels from the main stroke. The character scores, calculated with such a dead band region, therefore tend to accentuate character feature differences and deemphasize stroke width variations.

With any correlation technique, proper character-to-mask registration is essential. The dead-band correlator of the present invention is more immune to slight registration errors than the single bit level correlator, due to its wider tolerance level. Nonetheless, misregistration in any direction can result in scores. In order to improve the correlation output, nine different character-to-mask registrations are correlated simultaneously. These registrations form a grid about a central registration. This process, together with the use of a dead-band region incorporating a preselected range (in pixels) in vertical and horizontal directions, results in a correlation scheme which is both registration tolerant and informative.

DESCRIPTION OF DRAWINGS

FIG. 9 is a table of character mask threshold values employed in the system of FIG. 7.

FIGS. 14a, b and c illustrate the resolution of intersecting masks according to the principles of the present invention.

FIGS. 10a, b and c illustrate character regrow according to the principles of the present invention.

FIG. 23 illustrates the registration shifting in the corelator.

DESCRIPTION OF THE PREFERRED EMBODIMENT

Figure 5B:
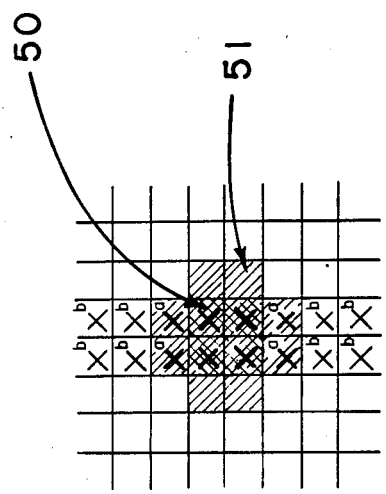
FIGS. 5a and b illustrate operation of a dead-band correlator according to the principles of the present invention.
Figure 5A:
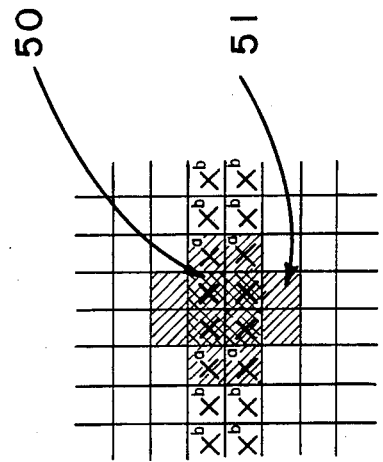

Referring to FIGS. 5a and b, the distance-weighted dead-band correlator of the present invention weights pixel mismatches within a pre-selected distance around a matching pixel at zero weight. Each mask pixel is compared with a corresponding combination of character pixels, and each character pixel is compared with a corresponding combination of mask pixels. The pixels within the dead-band are those immediately above and below, typically 2 each, and to the right and left, also typically 2 each, of the pixel of interest.

The resulting correlation is expressed mathematically below:

$$\text{SCORE}_{(character)} = \sum_{x=0}^{24} \sum_{y=0}^{32} c_{xy} \cdot (m_{xy} + m_{(x+1)y} +$$

$$m_{(x-1)y} + m_{x(y+1)} + m_{x(y-1)}) + m_{xy} \cdot (c_{xy} + c_{(x+1)y} +$$

$$c_{(x-1)y} + c_{x(y+1)} + c_{x(y-1)}),$$

where $c_{xy}$ is the character pixel value represented by a digital 0 or 1 at row x and column y, and $m_{xy}$ is the mask pixel value represented by a digital 0 or 1 at row x and column y. The dead-band region and the new correlation scheme is shown in FIGS. 5a and 5b. The lightly shaded area 50 illustrates a typical dead-band area defined for each pixel to be examined. Pixels labeled 'a' are one pixel away, either horizontally or vertically, from the nearest matching pixel (dark shaded area 51) and are weighted as zero. Pixels labeled 'b' are more than one pixel distance from the nearest matching pixel and are weighted with 1. The resulting mismatched score is:

| | |
|---|---|
| 8 'a' pixels (× 0) = | 0 pts |
| 16 'b' pixels (× 1) = | 16 pts |
| 24 total pixels = | 16 Pts |

The total character score can range from 0 to 768.

Figure 1B:
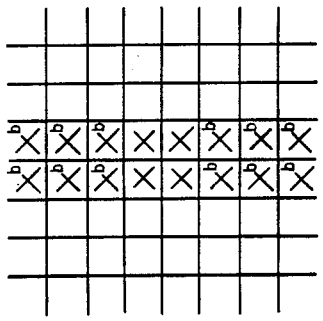
FIGS. 1a and b illustrate operation of a bit-to-bit character correlator typical in the prior art.
Figure 1A:
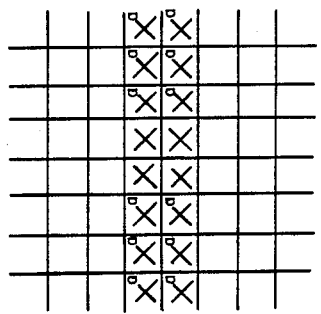
Figure 2C:
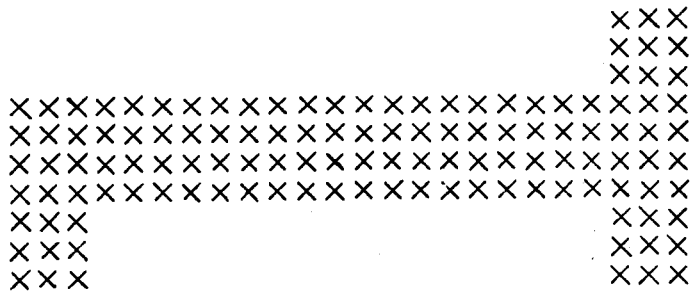
FIGS. 2a, b and c show an example of improper character identification employing the correlation scheme of FIGS. 1a and 1b.
Figure 2B:
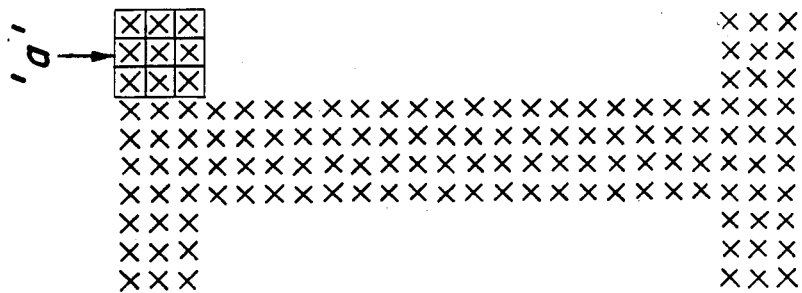
Figure 2A:
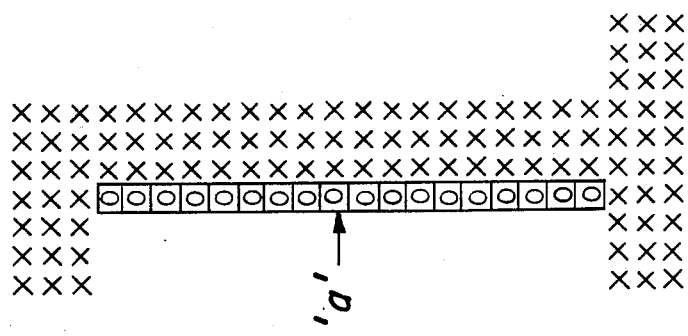
Figure 3B:
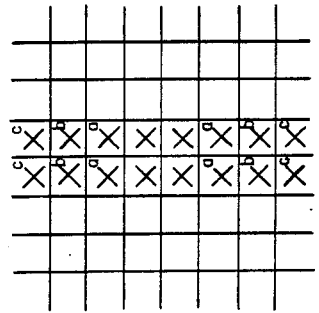
FIGS. 3a and b illustrate operation of a distance-weighted character correlator commonly found in the prior art.
Figure 3A:
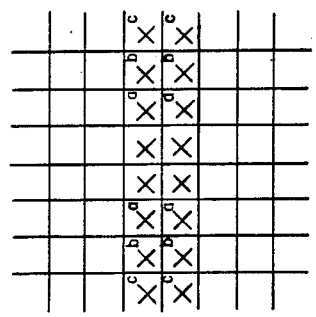
Figure 4C:
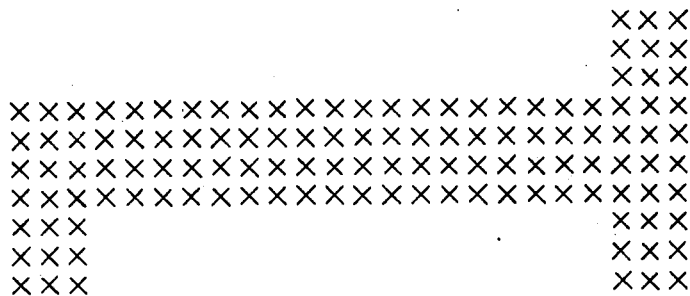
FIGS. 4a, b and c show an example of character identification employing the correlation scheme of FIGS. 3a and 3b.
Figure 4B:
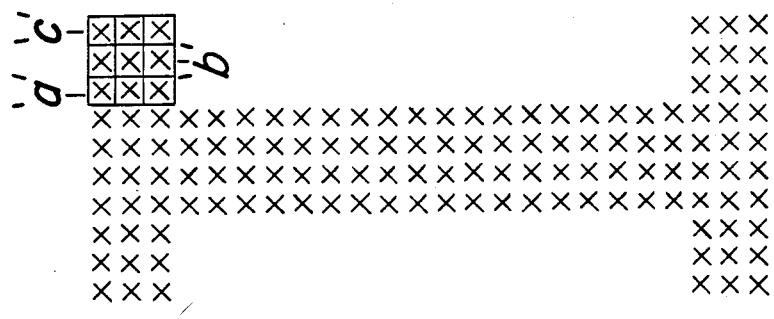
Figure 4A:
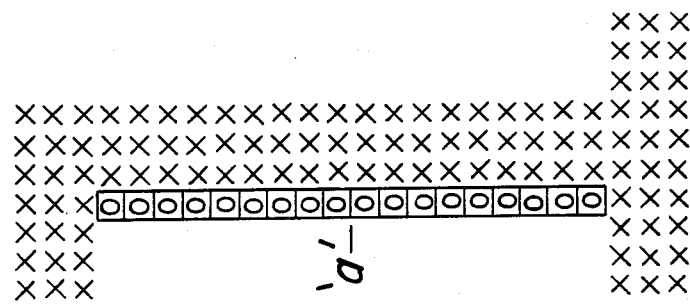
Figure 6C:
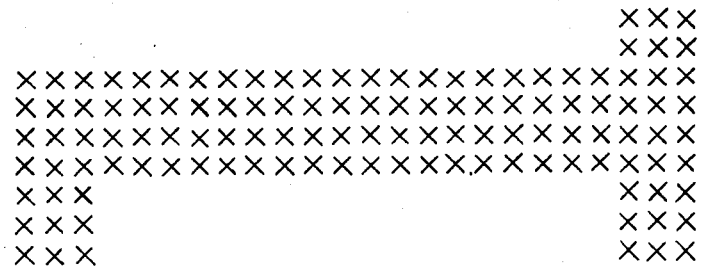
FIGS. 6a, b and c show an example of character identification employing the correlation scheme of FIGS. 5a and 5b.
Figure 6B:
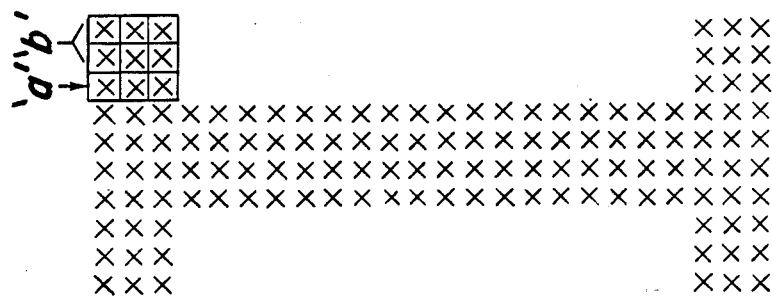
Figure 6A:
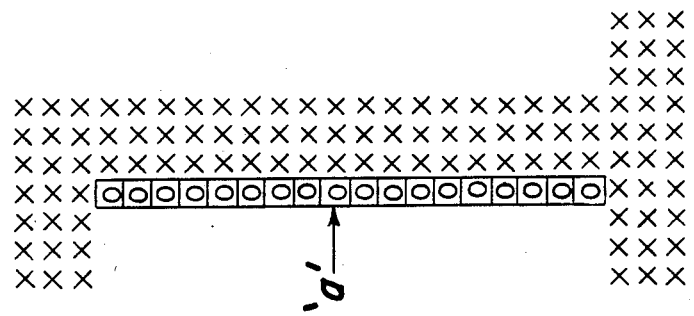

FIG. 6 shows the results as tabulated below of the example in FIGS. 2a-2c with the dead-band correlation scheme:

| | Mask | Pixel Mismatch | | Weight | | Score |
|---|---|---|---|---|---|---|
| Mismatched Score: | 1 | 18 | × | 0 | = | 0 |
| | 1 | 3 | × | 0 | = | 0 |
| | | 6 | × | 1 | = | 6 |

-continued

| | Pixel | | |
| Mask | Mismatch | Weight | Score |
| --- | --- | --- | --- |
| | | + | 6 |

Figure 7:
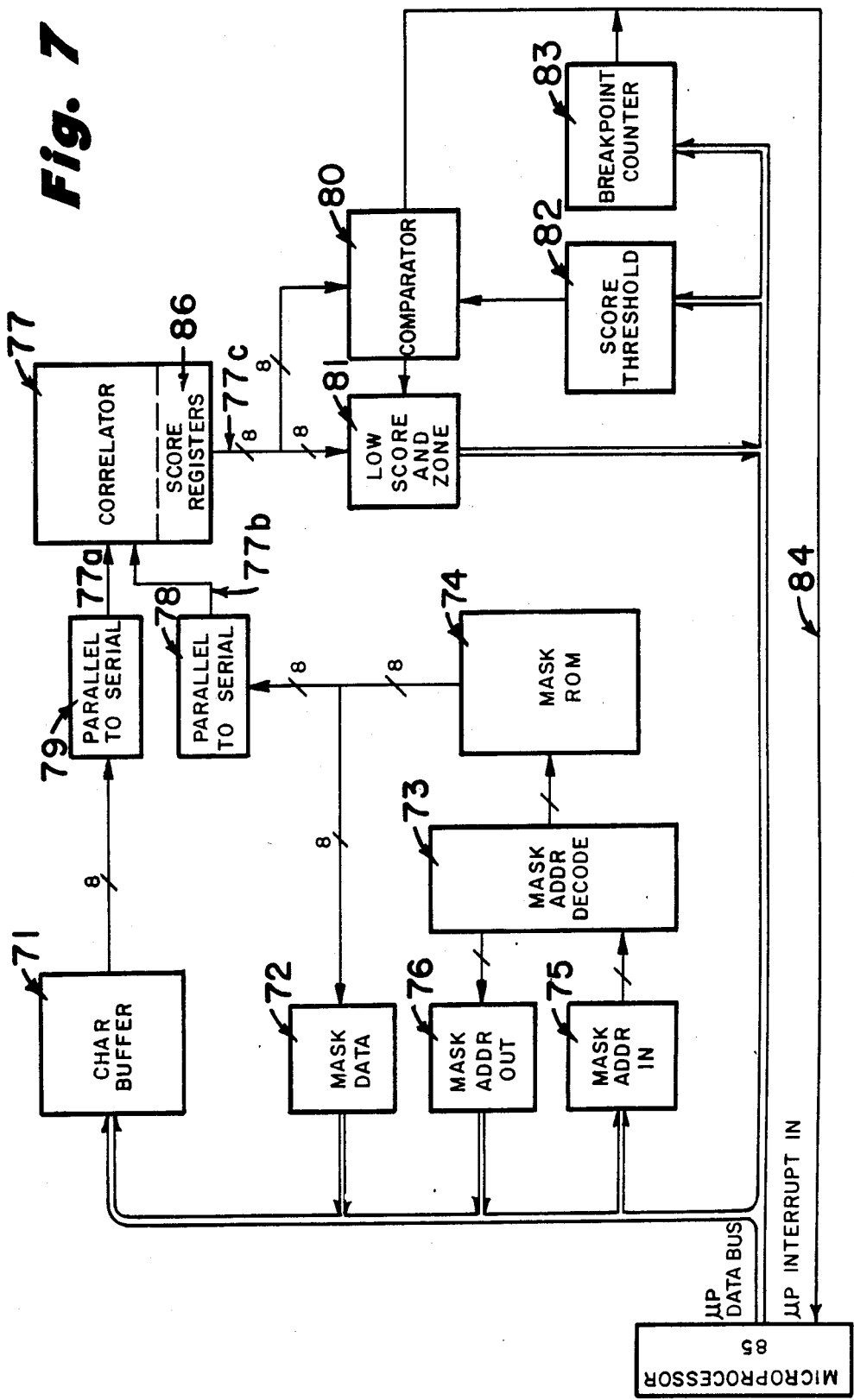
FIG. 7 is a block diagram of a character recognition system according to the principles of the present invention.
Figure 8:
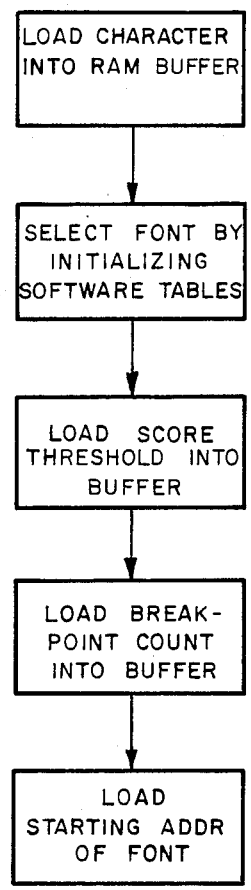
FIG. 8 is a flowchart for initializing the system of FIG. 7.

The recognition process is initiated by loading digital data representing an unknown character field into a correlator RAM buffer 71 as shown in FIG. 7. The software as shown in FIG. 8 then directs the selection of a mask set to be used in a table look-up procedure. The mask set is controlled by a mask header table as shown in FIG. 9. The header table contains information needed to properly utilize the mask set. The hardware of FIG. 7 is initialized by loading the breakpoint counter register 83 with the number of masks to be used. For the preferred embodiment, nine masks are used. A score threshold register 82 is loaded with the maximum score that should be reported. This limits the correlator outputs to scores that are significantly low. Finally, the starting address of the mask space is loaded into mask address registers 75. Accessing the low order address byte enables the hardware processing function.

Figure 10A:
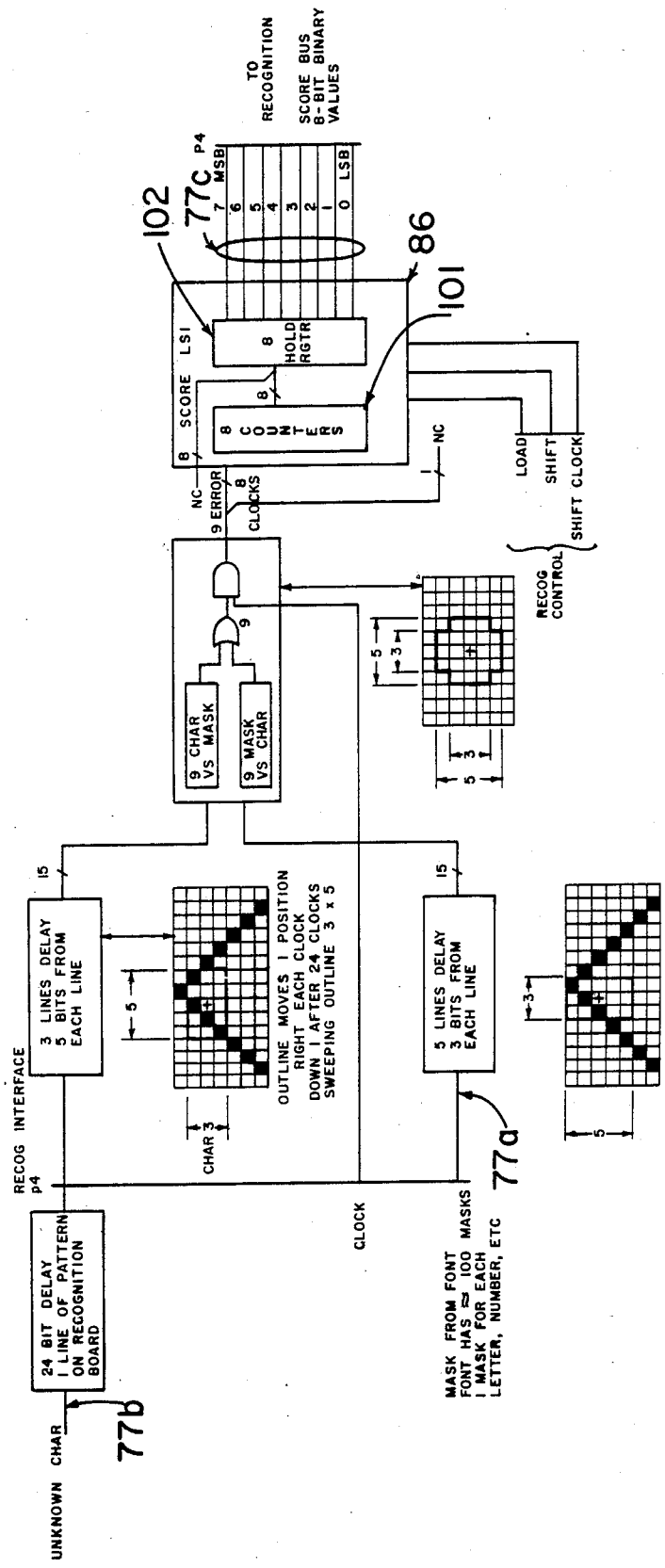
FIGS. 10a and 10b are a block diagram of the correlator employed in the system of FIG. 7.

The unknown character is converted from byte format in the RAM buffer 71 to a serial bit stream with the parallel to serial converter 79. The first mask is likewise serialized in parallel to serial converter 78, and both serial bit streams 77a and 77b are sent into a correlator logic network 77. This network 77, whose block diagram is shown in FIG. 10a, is a combination of sequential and combinatorial circuits. The output of the network 77 is loaded into score counters 101.

Figure 10B:
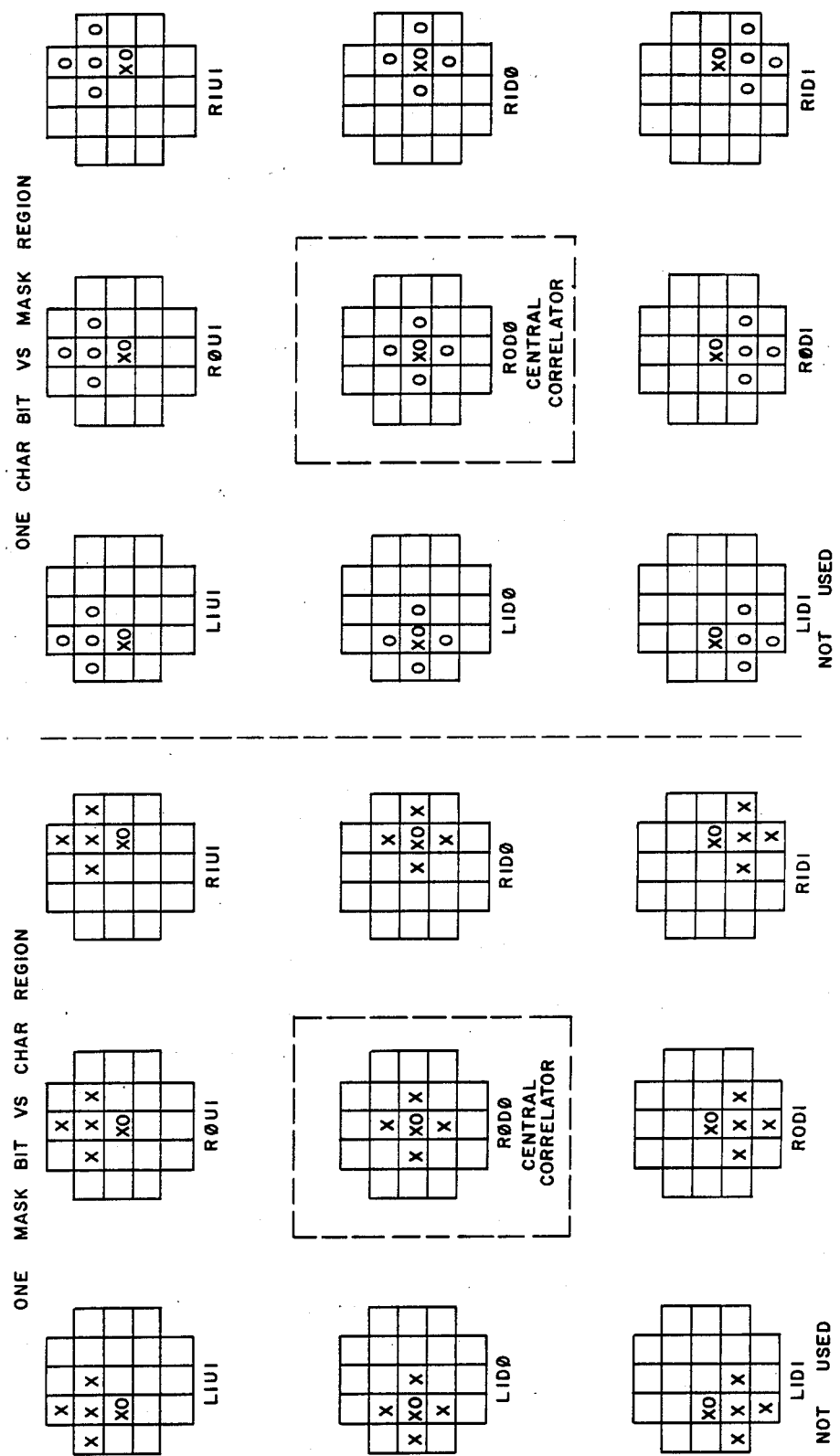

In general, nine score counters 101 are required. However, only eight score counters 101 can also be used. As shown in FIGS. 10a and 10b, the L1D1 registration zone (i.e., the left one and down one group of pixels) can be omitted, thereby reducing the amount of recognition hardware.

At the end of each mask period, the score counters 101 are shifted via bus 77c into a magnitude comparator 80. The lowest of the eight or nine scores is then loaded into an output score register 81. If the lowest score is less than the score threshold register 82, an interrupt is generated on the microprocessor interrupt line 84 to microprocessor 85. The microprocessor 85 is thus informed that a potentially satisfactory correlation has been performed. The lowest score, its associated registration zone, and the mask address are read by the software in the microprocessor 85 and stored for evaluation.

The character is then recirculated and processed with the next mask. Since the masks are continuous in mask memory in the Mask Rom 74, the next mask address need not be loaded. After each mask period, the breakpoint counter 83 is decremented. When the breakpoint counter 83 reaches zero, the hardware ceases processing and another interrupt is generated. This signals the end of the mask set.

Referring again to FIGS. 10a and 10b, an unknown character is shown digitized into 768 bits, 24 bits wide by 32 bits high with each bit representing one pixel. Each font or typestyle is represented by approximately 100 masks, including those for numbers, capitals and the like. The sequence within correlator 77 is given below:

CORRELATOR SEQUENCE

1. Reset: Clears all score counters 101.
2. Count errors in score counters 101 during mask and character clocking.
3. Load: transfers values from counters 101 to holding registers 102.
4. Shift: causes all holding registers 102 to be cascaded so that each score is moved to the next register 102 on each shift clock. The score in the last register 102 is sent to the magnitude comparator 80 on each shift clock.
5. Error counting can start again for the next mask after the load pulse since all scores are saved in the holding registers 102.

DESCRIPTION OF THE CORRELATOR HARDWARE

The unknown characters are isolated from the page of text by an Isolation Process and are passed to a Recognition Process. The character is stored in a matrix 24 wide by 32 high. Each mask is also stored in this format in a font read-only-memory (ROM). The process of character identification is called "mask-matching". The unknown character is tested again all masks in the font.

The method for character identification is to correlate both the character and mask matrices and find the mask with the lowest error score. This correlation method compensates for irregularities in the text, the digitizing system, and the isolation system.

Figure 21:
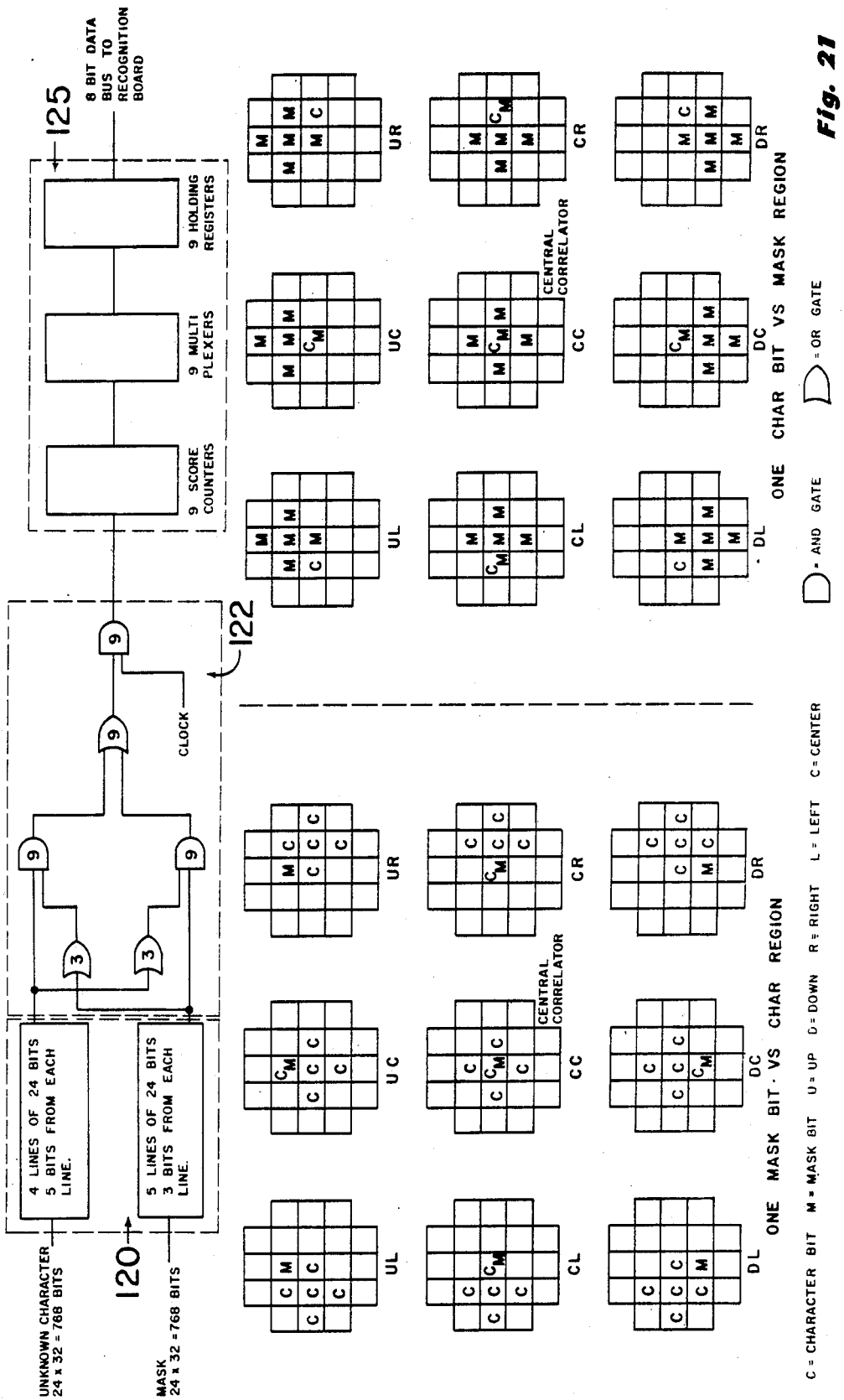
FIG. 21 illustrates the block diagram of the correlator hardware.
Figure 22:
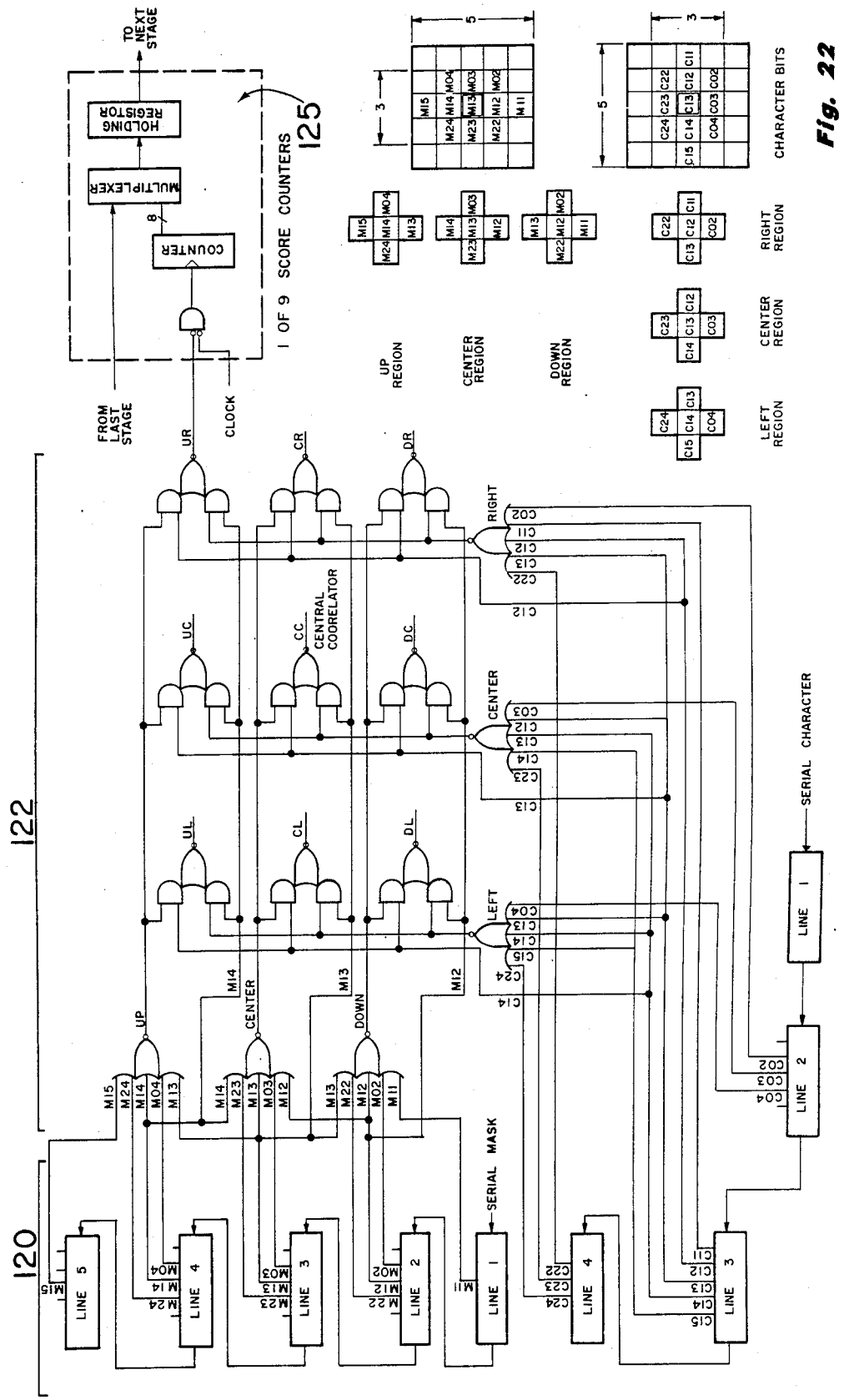
FIG. 22 illustrates the detailed implementation of the correlator hardware.

As shown in FIGS. 21, 22, and 23, the correlator system consists of a shift register section 120, a region (window) generating section 122, and nine simultaneously operating correlators 125. A central correlator assumes perfect registration between the mask and character matrices. Four more correlators account for a 1 bit registration error in one dimension only. The last four correlators account for a 1 bit registration error in both dimensions.

As shown in FIGS. 21 and 22, each correlator is designed in two parts. The first part compares one bit of the character matrix to a corresponding 5-bit region in the mask matrix. The region is defined as the corresponding bit and all four adjacent bits: up, down, right and left. The second part of the correlator compares one bit of the mask matrix to the corresponding 5-bit region of the character matrix. If there is a match in both parts of the comparator, then no error count is recorded.

The correlator hardware performs the matrix matching by a serial mechanism one bit position at a time. The matrices are 24×32 bits, so there are 768 bit positions made during the sequence. The matrices are presented to the correlator board in synchronous serial form. The correlator converts a small portion consisting of five 24-bit lines, back into parallel form so that the surrounding regions are available for each bit position.

As shown in FIGS. 21 and 22, the character bits are observed through a mask window made up of a 3×5 matrix. The mask bits are observed through a character window made up of a 5×3 matrix. As the mask and character signals are synchronously shifted through these windows, measurements are made in each position. The regions are created by OR-ing 5 bits of the shift register together.

The central correlator is implemented as shown in FIG. 22. The central character bit C13 is compared to the mask region made up of M03, M13, M23, M12, M14. The comparison is made to detect a mismatch so that only errors are tabulated. This comparison implements the rule that if C13 is a black bit and either M03, M13, M23, M12, or M14 is a black bit, then there is a match. If none of the bits in the region is black, then there is a mismatch. This function is accomplished by AND-ing the bit and region signals together.

The C13 bit is simultaneously compared with two other regions of the mask which represent an up-shift or a down-shift in relative registration. The mask regions are: Up (M15, M24, M14, M04, M13) and down (M13, M22, M12, M02, M11). In addition, bits C12 and C14 are simultaneously compared to all three mask regions. The result is that nine separate measurements are made.

An additional nine measurements are made with mask bits M12, M13, M14, against three regions of the character: center (C23, C14, C13, C12, C03), left (C24, C15, C14, C13, C04) and right (C22, C13, C12, C11, C02). There are actually a total of eighteen measurements made at each bit position (768 total positions), but in the electronics, matching pairs are OR-ed together so that nine terms remain. The nine results are used to enable the clock to an error score counter.

At the end of the correlation, each of the nine counters can have a different error score in the range of 0 to 768. As a practical matter, the score counters are designed to count to a maximum of 128 since error counts above 128 are not significant.

Figure 11:
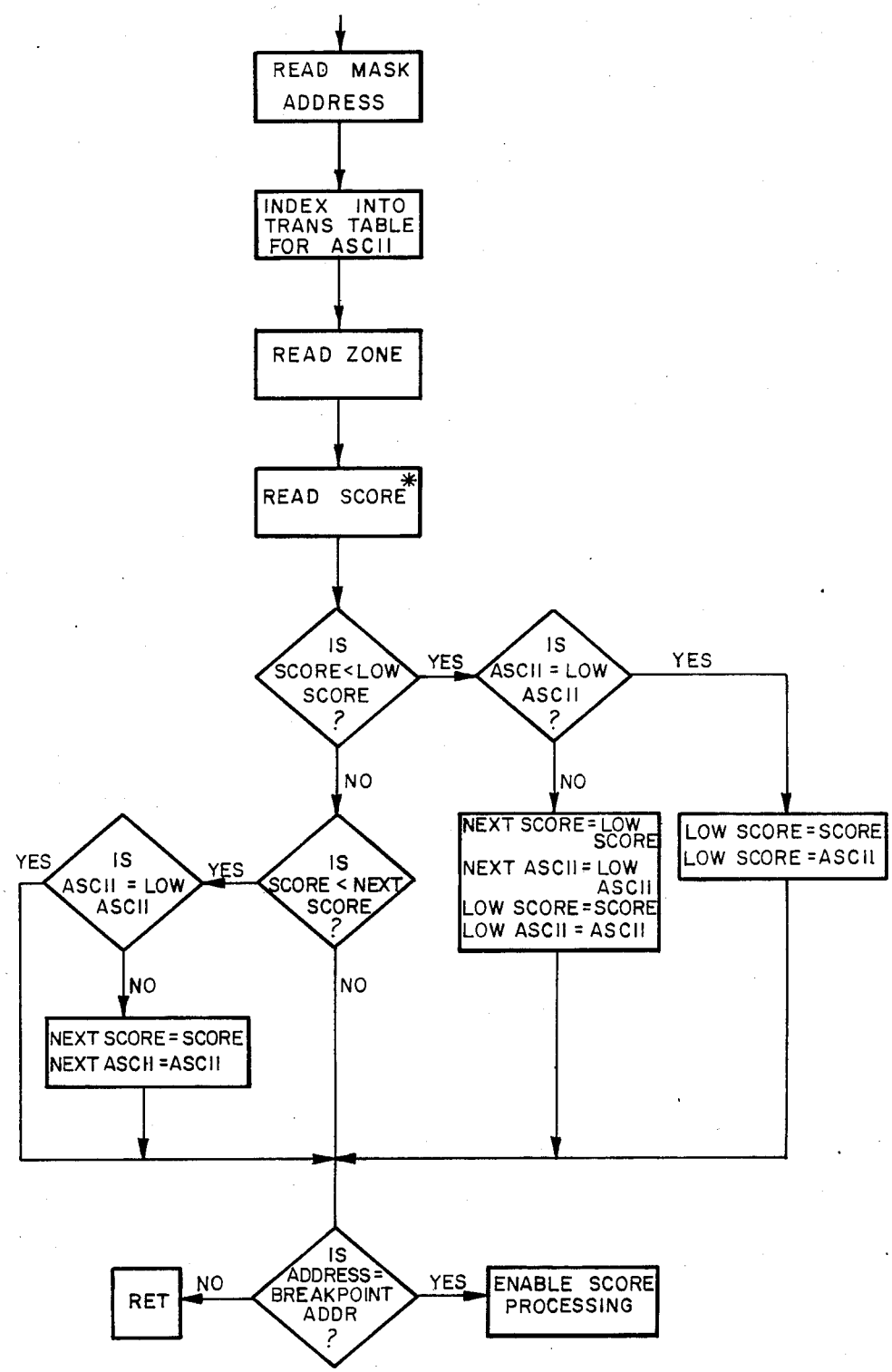
FIG. 11 is a flowchart of the interrupt service routine algorithm employed in the system of FIG. 7.

The interrupt service rountine used by microprocessor 85 is shown in FIG. 11. Since both the low score interrupt and the breakpoint interrupt are on the same interrupt level, the software must check for both on every interrupt. At each interrupt, the mask address is converted to an ASCII code by indexing into an ASCII translation table which is referenced in the mask header table. The new score is then compared to the current low score and next lowest score. Only the lowest score for each ASCII code is retained. The current mask address is then compared to the expected breakpoint address. If the mask address is not equal to the breakpoint address, a simple return from the interrupt service routine is executed. When the breakpoint address is reached, the processing of the accumulated data is enabled. The character is then represented in the mask set by the lowest score and its ASCII code, and the next lowest score and its ASCII code. The former is referred to as the best guess mask, and the latter is its nearest neighbor.

Figure 12:
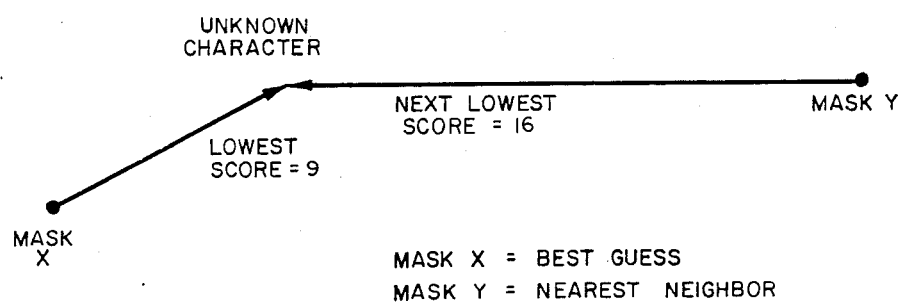
FIG. 12 is a vector diagram of a character mapped into a mask set according to the principles of the present invention.

The scores for a given character can be viewed as vectors in an n-dimensional mask space. In order to simplify the following description, it has been assumed that the vectors can be transformed into a two dimensional space. FIG. 12 is a representation of a character mapped into a mask set by its best guess and nearest neighbor. The vector magnitudes are equivalent to the associated scores, and the vector directions are functions of the ASCII code. Using this concept, all possible character fields (there are $2^{768}$ possible input fields) can be mapped into the mask set. Obviously, not all inputs are legal characters. A method for resolving legitimate characters from unrecognizable characters, noise, and characters from a different mask space is required.

The first approximation for determining a legitimate character is the use of a low score threshold requirement. If the lowest score meets some minimum level, the character is identified by the associated mask's ASCII code. The threshold requirement creates two basic categories of inputs. All input fields that are mapped into any mask's threshold space are identified with that ASCII code. All input fields that do not fall into any mask's threshold space are deemed unidentifiable, and are labeled as rejects. By adjusting the score threshold requirement, the reject rate can be tailored to any level.

Figure 13:
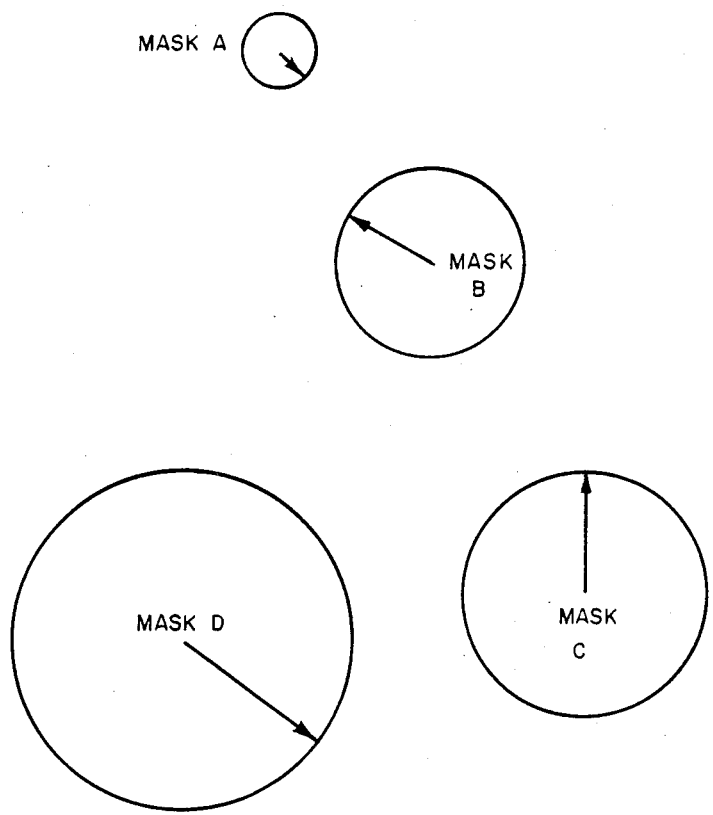
FIG. 13 is a set of vector diagrams for a plurality of recognizable masks for which the threshold values are given in FIG. 9.

The threshold values need not be equal for all masks. Since different masks vary in terms of pixel count, stroke orientation, and surface area, theresholds should be different for each mask. For example, it is reasonable to expect the scores for n samples of a specific punctuation mark will vary much less than the scores for n samples of a capital M. Different thresholds create different recognizable masks spaced as shown in FIG. 13. The threshold criteria are mask set dependent and a threshold table is given in FIG. 9. Characters which fall within circles as defined by mask thresholds are indentified by that mask's ASCII code. Characters that fall outside all circles are rejected.

When two similar masks have intersecting spaces, the intersection must be resolved. An example of this occurs with a Prestige Elite lower case 'a' and lower case 's', as shown in FIGS. 14a and b. The blocked pixels represent matching pixels within dead-band regions. The theoretically ideal mismatch as shown in FIG. 14c is only 22. In order to accommodate most of the characters, the thresholds for each mask will tend to intersect. The shaded area 150 represents possible substitutions. The identity of a character that maps into the intersecting region 150 is uncertain. An incorrectly identified character is called a substitution.

Figure 15:
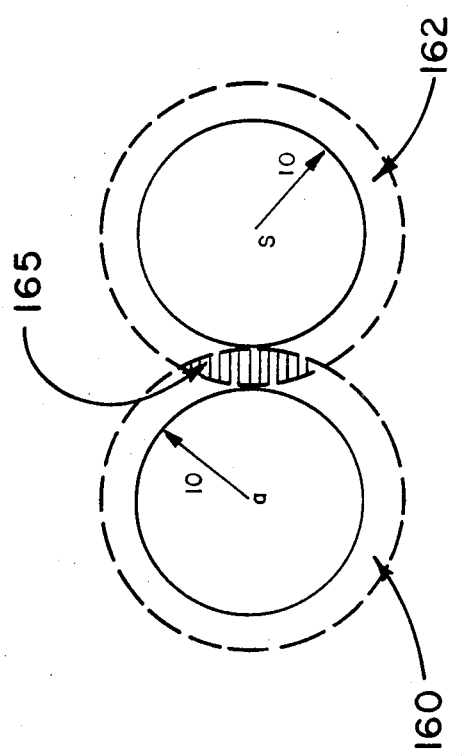
FIG. 15 illustrates the effect of lowering threshold values for masks in the system of the present invention.

There are a number of ways to control the substitution rate. One method is to lower the threshold requirements to a point where no intersections 150 of mask space occur. Characters that may have been substituted before are now rejected properly. Reducing the threshold, however, increases the reject rate of acceptable characters for any given mask. Characters with a magnitude equivalent to that of the potential substitution, but in a different direction, will also be rejected. Thus, as shown in FIG. 15, shaded regions 160 and 162 represent fields of characters that should be identified correctly, but are rejected due to lower thresholds. Dark area 165 represents substitutions which are thereby avoided.

To accomodate acceptable characters while still rejecting potential substitutions, a second requirement should be placed on the recognition of an input field. The next lowest score (nearest neighbor) contains some directional information. By using the difference between the next score and the lowest score (called score separation), the characters which fall in an intersecting field can be isolated. Therefore, a minimum score separation requirement is added to the criteria. Using this second requirement, possible substitutions can be rejected properly while still allowing a broader threshold to accommodate legitimate characters. By adjusting the required thresholds and separations for each mask, the overall reject and separation rates for a mask set can be controlled.

Figure 16C:
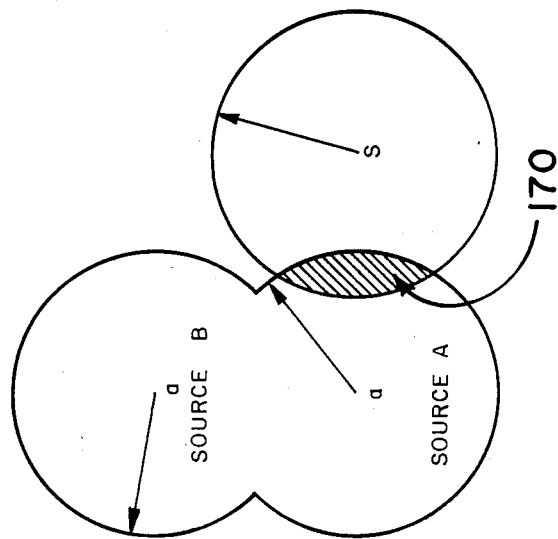
FIGS. 16a, b and c illustrate the effect of a minimum score separation requirement on the resolution of intersecting masks according to the principles of the present invention.
Figure 16B:
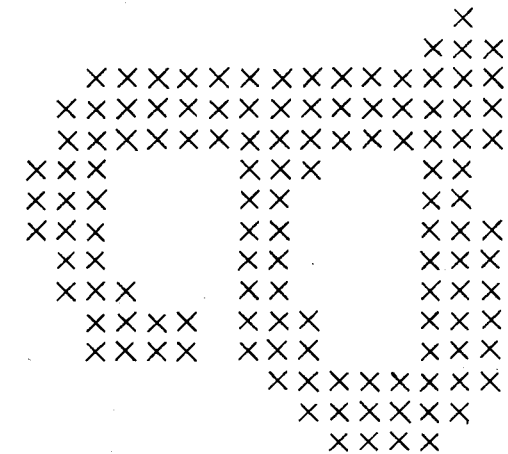
Figure 16A:
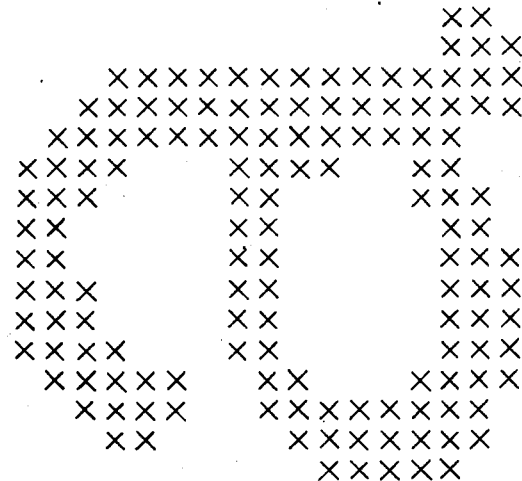

In certain instances, different sources of a generic typestyle produce slightly different characters with the same ASCII code designation. An example is shown in FIGS. 16a and 16b. A typical Prestige Elite lower case 'a' from one manufacturer's typeball (source A) is different from the lower case 'a' from another manufacturer's printwheel (source B), even though they belong to the same generic typestyle. For character pairs such as this, the scoring threshold values that would be required to recognize both types of characters with a single mask would be too large for practical purposes, allowing many possible substitutions and non-recognizable characters into the mask space. Therefore, a duplicate mask with an equivalent ASCII code designation is added to the mask set. This creates a further subdivision for the mask set. Since the ASCII codes for the best guess and nearest neighbor are not allowed to be equal, the threshold and separation criteria can still be applied to all masks of each ASCII code. Thus, referring to FIG. 16c, the shaded region 170 is rejected.

PROCESSING

Figure 17:
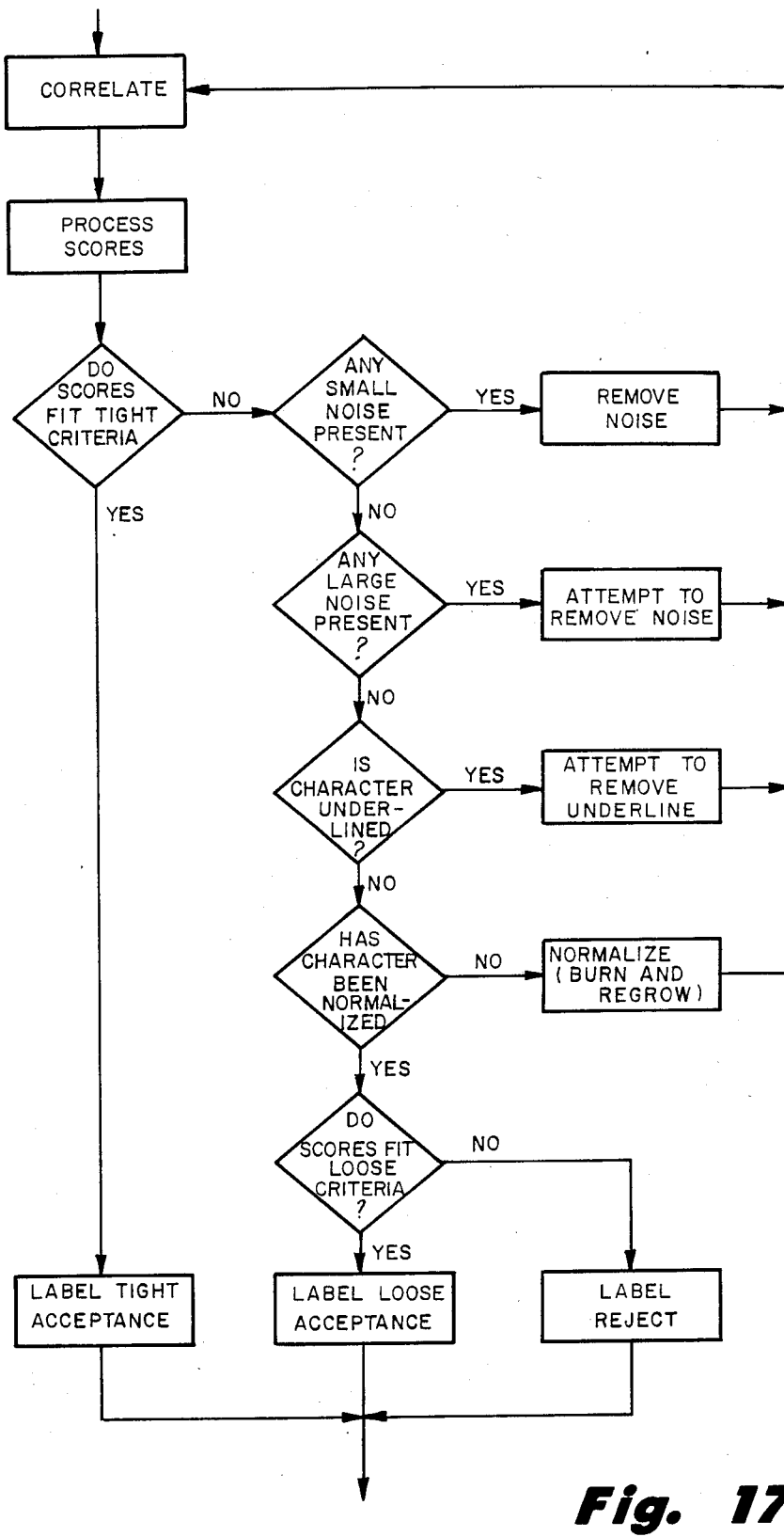
FIG. 17 is a flowchart of the algorithm for reiterative processing of character data employed in the system of FIG. 7.

Referring to FIG. 17, software control permits the recognition of characters to be an iterative process. Confidence in recognition is based on the threshold and separation requirement. A dual level of thresholds and separation is established in order to improve confidence in identification, while still allowing the recognition of a broad spectrum of character inputs.

The original character is assumed to be registered properly. Its data is passed through the correlator 77, and the resulting scores logged. The results are then evaluated using tight threshold and separation criteria. If the results are acceptable with tight requirements, the character is considered recognized with a high confidence factor. If the results fail to meet the tight requirements, the charcter data undergoes "retry processing".

Retry processing is a series of functions designed to eliminate noise and degradations from data representing the character. After each function is performed, the data is processed through the correlator 77. If the results meet the tight requirements, character recognition processing is complete. If not, the new results are compared to the old results to determine if the function has improved recognition of the character (i.e., a lower score). If recognition was improved, the current character is passed on to the next phase of retry. If recognition was degraded, the previous character (before the last retry) is restored and passed on to the next phase of retry.

The level of improvement is dependent on the specific function utilized. This continues until the results have been accepted with the tight thresholds, or all retries are attempted. If all the retries fail to produce a tight acceptance, the results are evaluated with a somewhat looser criteria. If the results are acceptable under the looser criteria, the character is identified with a lower confidence factor. If the results fail under the looser criteria, the character is labeled a reject.

The first retry function attempts to center the character. If the character was previously mis-centered, the character is centered and data representing it is passed to the correlator 77. If the character was previously centered properly, the original character data is passed to the next level of retry.

Figure 18:
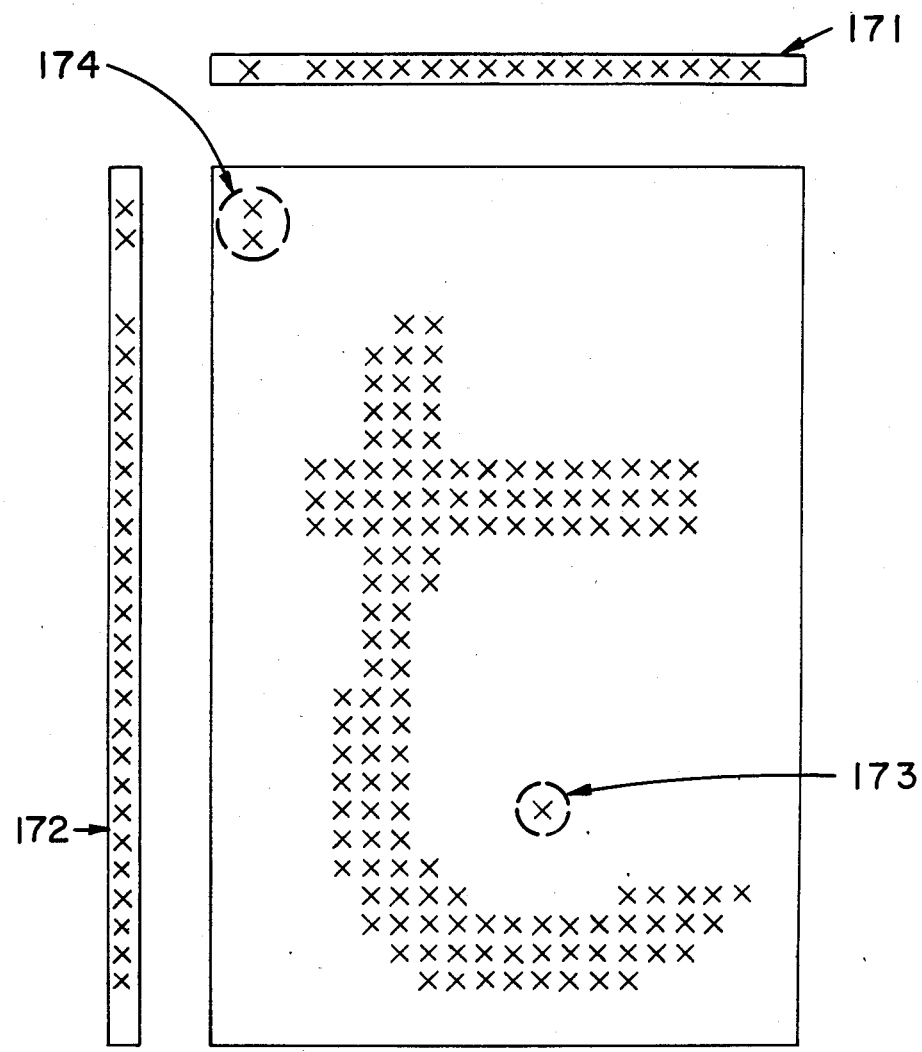
FIG. 18 illustrates the process of removing small amounts of noise from the character field of a character to be identified according to the principles of the present invention.

The second level of retry processing attempts to filter small isolated noise which exists in the character field. This is accomplished by compressing the character field into vertical and horizontal composites to form silhouettes 171 and 172 as shown in FIG. 18. These silhouettes are inspected for isolated black shadows up to two pixels by two pixels in area. If none are found, the character data is passed to the next level of retry. If noise is found, the black bits are erased, using the horizontal and vertical positions of the shadow silhouette as indicies. Referring again to FIG. 18, noise pixel 173 does not affect recognition, while noise pixel 174 may affect recognition of the character. If the character field is now blank, the field is assumed to be noise, and recognition is halted. Any remaining character is re-centered and sent to the correlator 77. No improvement of recognition is required in this phase, since black areas as small as two by two are not considered to be significant features for recognition.

The third level of retry processing is similar to the previous function in that it involves further noise filtering. The character data, along with the correlation results, are copied into a holding buffer. The original character data then undergoes a further noise filtering process which erases any isolated black area smaller than five pixels by seven pixels. If no such areas are found, the character data is passed on to the next level of retry. If the character data field after filtering is blank, the character data is restored from the holding buffer and passed on to the next level of retry. Any remaining character data is re-centered and passed to the correlator 77. If the new results meet the tight requirements for threshold and separation, the filtered character data is considered to represent the final character. If not, the new results are compared to the old results. If the new low score is lower than the old low score, and the new separation is greater than the old separation, the filtering process is considered legitimate, and the filtered character data is passed to the next level of retry. If the old score or separation is better, the original, unfiltered character data is passed to the next level of retry.

The distinction between small and large noise levels and the improvement in recognition are implemented to prevent incorrect filtering. Dots on certain lower case i's, as well as some types of punctuation, can appear smaller than the large noise size requirement since certain character features can be as small as four pixels by six pixels. Improvements in the scores and separations are required to prevent permanent distortions to such characters.

After noise has been erased from the character data field and a tight criteria has not been achieved, the data undergoes a status check. Included in the character field buffer is an indication as to whether or not the character data is located in a region of text that is underscored. If the underscore flag is not set, the character data is passed along to the next level of retry. If the underscore flag is set, the character data enters underline erasure processing. First, the character data and its results are copied into a holding buffer. The bottom row of black is then erased from the character data field, and the new character data is sent to the correlator 77. If the resulting character data meet the tight requirement, the character is deemed identified. If not, the new results are compared to the old results. The original character data is sent to the next level of retry if recognition did not improve. Again, "improvement" means the mismatch score is lower than the previous retry. If the new score and separation are better, another iteration of underscore removal is attempted. This continues until the results satisfy the tight requirements, or three iterations of underscore removal are completed. After three iterations, the character data is sent to the next level of retry.

Figure 19C:
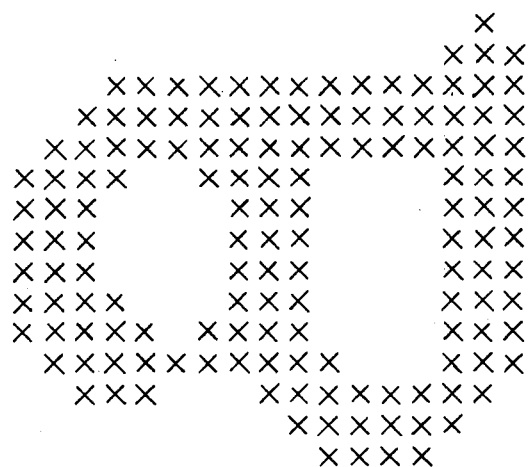
FIGS. 19a, b and c illustrate character burn according to the principles of the present invention.
Figure 19B:
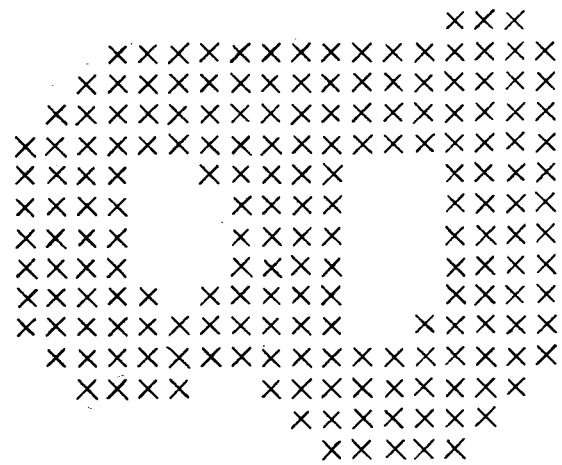
Figure 19A:
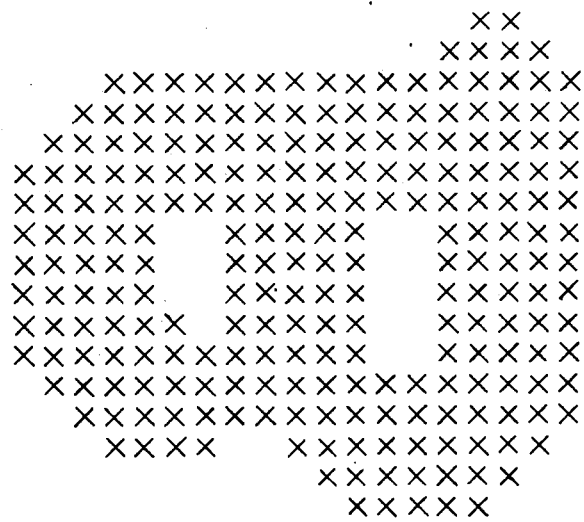

If the character data reaches the fifth level of retry without being identified by the tight criteria, the data goes through a series of stroke width normalizers. These normalizers attempt to improve correlator resolution by varying character stroke width. One form of noramlizer, referred to as a software "burn", attempts to reduce very dark characters to reasonable proportions by removing pixels from the perimeter of character strokes. One phase of "burn" removes one pixel from the top and left of each stroke. The second phase of "burn" removes one pixel from the bottom and right of each stroke. This is accomplished by a series of shifts and logical AND functions performed on the character data. FIGS. 19a–c illustrate an example of a character before (FIG. 19a) and after a first (FIG. 19b) and second (FIG. 19c) burn iteration. Before each phase of burn is performed, the character data and results are copied to the holding buffer. After two burns are performed, the character data is sent to the correlator 77. If the results meet the tight requirements, the character is accepted. If not, a check is made for an improvement in recognition (i.e., a lower mismatch score). If recognition has been improved, the character data undergoes another phase of "burn". This form of retry continues, alternating between the two phases of "burn", until the results meet the tight criteria or recognition fails to improve between the previous results and the current results.

In order to prevent the burn retry algorithm from reducing the character data to a blank, or from changing all characters to punctuation marks, a secondary requirement is attached to the requirement of improved recognition. The ASCII code for the best guess is not allowed to change after a specified level of burn. This inhibits a burn from creating overly forced character data distortions.

Figure 20C:
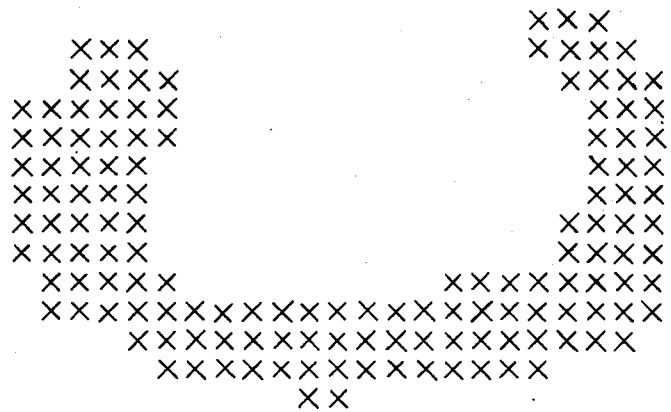
Figure 20B:
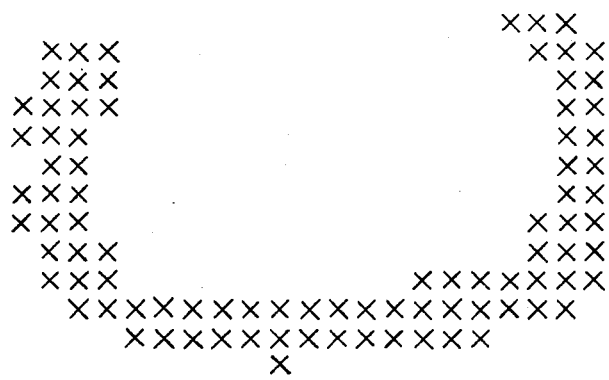
Figure 20A:
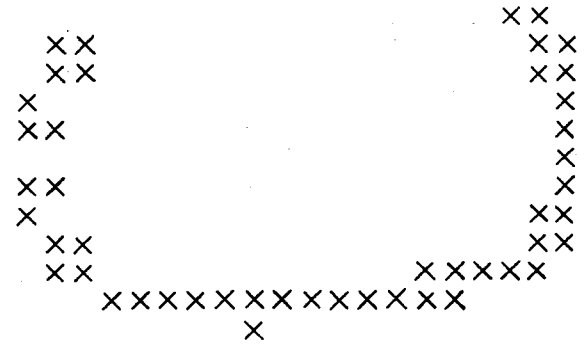

Another normalizer, known as a software "regrow", is very similar to burn, except that it attempts to darken an overly light character. The two phases of regrow consist of adding a pixel to the top and left of each stroke, and adding a pixel to the bottom and right of each stroke. This is accomplished by applying a series of shifts and logical OR functions to the data. FIGS. 20a–c show an example of a character before (FIG. 20a) and after first (FIG. 20b) and second regrows (FIG. 20c). Regrow proceeds in a fashion similar to that of burn, continuing until the character data is accepted under tight requirements, or recognition fails to improve.

The burn and regrow processing is controlled by a normalizer routine, which keeps statistical page information as to whether burn or regrow is more likely to be needed. The routine initializes its counters at the start of each page, and updates them for each recognized character. The counters reflect the number of burns and regrows used before characters are recognized. The state of the counters aids in determining if the characters on the page tend to be darker or lighter than a normalized standard. The normalizing routine activates the burn retry for pages that tend to be darker. If the first burn iteration fails to improve recognition, the regrow retry is attempted. If the character is improved by at least one burn, regrow is disabled. Similarly, if the counters indicate that the page is lighter than normal, regrow is attempted first. If the first phase of regrow fails to improve recognition, the burn retry is attempted. If the character data is improved by at least one regrow phase, burn is inhibited. This normalizer thus assists in adapting the retry mechanism to different qualities of text.

TYPESTYLE RECOGNITION

A machine that is designed to recognize characters from multiple typestyles can compare each character with every mask in the system. This method is usually tedious, decreasing recognition speed for each additional typestyle added. Usually, however, pages are typed with one particular typestyle. Even in cases where multiple typestyles appear on the same page, the characters from a specific region of the page are usually members of the same typestyle. This information can aid in the recognition of a specific page region. If the particular typestyle can be determined, that typestyle mask set can be implemented by collecting data over a range of characters from a particular page area.

Typestyle recognition is initiated at the beginning of each page. A score counter for data representing each typestyle mask in the system is reset to zero. While in typestyle recognition mode, the characters are evaluated using all typestyle mask sets. The correlation results for each typestyle are stored in a typestyle data table. After the character data has been correlated with all possible typestyles, the correlation results are processed. Character data that is rejected in all typestyles is simply rejected, and data that is accepted in at least one typestyle is passed on to further processing. The best typestyle is determined by comparing the level of acceptances for each typestyle. If more than one typestyle recognizes the character data at the best level of acceptance, the ASCII codes from those typestyles are compared. If all of these typestyles do not agree on the ASCII code designation, the character data and all the typestyle results are placed in a holding buffer to await a typestyle determination. If the ASCII codes are all equal, the character data is accepted, and the low scores of all the typestyles are added to their respective score counters. Any typestyle that rejects the character data has its score counter disabled. All typestyle counters that reach a predetermined level are also disabled. A typestyle is recognized when one counter is left enabled, or the holding buffer of character data awaiting typestyle determination is full. If this occurs before all but one counter is disabled, the typestyle whose counter is lowest is selected. The holding buffer is then emptied, using the selected typestyle's results to accept or reject the character.

The selected typestyle is then used exclusively until character data cannot be resolved with the current typestyle set. If the character data fails the separation requirement but passes the tight threshold requirement, the character is rejected. If the character data fails the tight threshold requirement, the character data is processed through all typestyles. If no typestyle accepts the data with a high degree of confidence (i.e. tight acceptance levels), the character is rejected. If one of the typestyles does accept the character data with its tight requirements, typestyle recognition is re-entered, starting with the current character.

The selection of a typestyle mask set thus improves the efficiency and accuracy of the recognition system. The time required to correlate a character is directly proportional to the number of masks it must be compared against. By limiting the number of masks utilized, recognition speed can be increased. Typestyle selection also improves recognition accuracy. Characters within a specific typestyle are designed to be recognizable within that typestyle space. Different ASCII characters from different typestyles may contain similar features. By segregating the mask space by typestyle, near neighbors from different typestyles do not impede recognition capability.

LISTINGS OF INSTRUCTIONS OF ROUTINES AND SUBROUTINES

A listing of instructions of routines and subroutines for algorithms for controlling operation of the system according to the principles of the present invention are shown in Appendix A.

```
ISIS-II 8080/8085 MACRO ASSEMBLER, V3.0         MODULE  PAGE   1
02/14/83-DESTREADER ISOLATION CARD SOFTWARE - DEFINITION MODULE

LOC  OBJ        LINE        SOURCE STATEMENT

1 $NOLIST
                796 $LIST
                797 $TITLE ('RECOGNITION INTERRUPT MODULE')
                798
                799 ;           ************
                800 ;           *          *
                801 ;           *  RECINT  *
                802 ;           *          *
                803 ;           ************
                804
                805 ;
                806 ;PUBLIC PROCEDURE DEFINITIONS
                807 ;
                808         PUBLIC  RECINT          ;RECOGNITION INTERRUPT HANDLER
                809         PUBLIC  RECEOI          ;REC END OF INTERRUPT
                810         PUBLIC  RESTRR          ;RERUN SAME CHARACTER
                811         PUBLIC  RECRSM          ;RESUME RECOGNITION WITH NEXT CHARACTER
                812         PUBLIC  NULREC          ;NULL RECOGNITION ENTRY
                813         PUBLIC  RECEND          ;
                814 ;
                815 ;EXTERNAL PROCEDURE REFERENCES - RECOGNITION
                816 ;
                817         EXTRN   ISORGO          ;RESTART ISOREC
                818         EXTRN   RUNFNT          ;START NEXT FONT (DURING FONT SELECT)
                819         EXTRN   RRFONT          ;CONTINUE WITH SAME FONT
                820         EXTRN   RUNSEG          ;RUN NEXT SEGMENT
                821
                822         EXTRN   RECNTR          ;RE-CENTER CHARACTER
                823         EXTRN   SNFLTR          ;SMALL NOISE FILTER
                824         EXTRN   LNFLTR          ;LARGE NOISE FILTER
                825         EXTRN   UDLRT0          ;UNDERLINE RETRY 0
                826         EXTRN   SWBURN          ;SOFTWARE BURN
                827         EXTRN   SWGROW          ;SOFTWARE REGROW
                828         EXTRN   FONTLD          ;LOAD FONT
                829         EXTRN   FSERCH          ;FONT SEARCH
                830         EXTRN   FSWTCH          ;FONT SWITCH
                831         EXTRN   BUFMOV          ;MOVE BUFFER
                832 ;
                833 ;EXTERNAL PROCEDURE REFERENCES - ISOSYS
                834 ;
                835         EXTRN   SYSERR          ;REPORT SYSTEM ERROR
                836         EXTRN   TSTLNK          ;LINK TO TEST PROM
                837         EXTRN   TIMOUT          ;SET/RESET TIMOUT
                838         EXTRN   SYSOPT          ;SYSTEM OPTION FLAGS
                839 ;
                840 ;EXTERNAL PROCEDURE REFERENCES - ISOUTL
                841 ;
                842         EXTRN   RETCZ           ;SET CC.Z AND RETURN
                843         EXTRN   RETCNZ          ;SET CC.NZ AND RETURN
                844 $EJECT
                845 ;
                846 ;FONT HARDWARE ADDRESS (FHA)
                847 ;
                848         EXTRN   FHAOTF          ;OFFSET TO FIRST MASK
                849         EXTRN   FRAHDR          ;FONT HEADER
                850         EXTRN   FHAORG          ;FONT HARDWARE ORIGIN
                851 ;
                852 ;RECOGNITION VARIABLES
                853 ;
```

| | | | | | | |
|---|---|---|---|---|---|---|
| | | 854 | EXTRN | RCVFLS | ;FONT LOW SCORE | |
| | | 855 | EXTRN | RCVFLA | ;FONT LOW ASCII | |
| | | 856 | | | | |
| | | 857 | EXTRN | RCVPOF | ;PREVIOUS OFFSET | |
| | | 858 | EXTRN | RCVCOF | ;CURRENT ADDRESS | |
| | | 859 | EXTRN | RCVLOF | ;LOW ADDRESS | |
| | | 860 | EXTRN | RCVNOF | ;NEXT ADDRESS | |
| | | 861 | EXTRN | RCVBOF | ;BREAKPOINT OFFSET | |
| | | 862 | | | | |
| | | 863 | EXTRN | RCVCZN | ;CURRENT ZONE | |
| | | 864 | EXTRN | RCVLZN | ;LOW ZONE | |
| | | 865 | EXTRN | RCVZSP | ;ZONE SCORE POINTER | |
| | | 866 | | | | |
| | | 867 | EXTRN | RCVTHS | ;THRESHOLD REQUIREMENT | |
| | | 868 | EXTRN | RCVSEP | ;SEPARATION REQUIREMENT | |
| | | 869 | | | | |
| | | 870 | EXTRN | RCVLSR | ;SCORE REPORTED BY HARDWARE | |
| | | 871 | EXTRN | RCVNML | ;NORMALIZER LEVEL | |
| | | 872 | | | | |
| | | 873 | EXTRN | RCVPFK | ;PRIMARY FONT KNOWN | |
| | | 874 | EXTRN | RTFLNF | ;LARGE NOISE FILTER RETRY FLAG | |
| | | 875 | | | | |
| | | 876 | EXTRN | PPTADR | ;POST PROCESSING TABLE ADDRESS | |
| | | 877 ; | | | | |
| | | 878 ;CURRENT FONT AND SEGMENT VARIABLES | | | | |
| | | 879 ; | | | | |
| | | 880 | EXTRN | SEGPTR | ;CURRENT SEGMENT POINTER | |
| | | 881 | EXTRN | SEGMAS | ;SEGMENT MAXIMUM ALLOWABLE SCORE | |
| | | 882 | EXTRN | FNTNUM | ;FONT NUMBER | |
| | | 883 | EXTRN | FNTCNT | ;NUMBER OF FONTS IN SYSTEM | |
| | | 884 ; | | | | |
| | | 885 ;EXTERNAL DATA - ISOSYS | | | | |
| | | 886 ; | | | | |
| | | 887 | EXTRN | TIMER2 | ;RECOGNITION TIMER | |
| | | 888 ; | | | | |
| | | 889 ;EXTERNAL INTERFACE TABLE DEFINITIONS | | | | |
| | | 890 ; | | | | |
| | | 891 | EXTRN | ITSROF | ;DEBUG FLAGS | |
| | | 892 | EXTRN | ITSR16 | ;REC TEST FLAG | |
| | | 893 | | | | |
| | | 894 $EJECT | | | | |
| | | 895 | CSEG | | | |
| | | 896 ; | | | | |
| | | 897 ;RECOGNITION INTERRUPT | | | | |
| | | 898 ; | | | | |
| 0000 F5 | | 899 RECINT: | PUSH | PSW | ;SAVE REGISTERS | |
| 0001 C5 | | 900 | PUSH | B | ; | |
| 0002 D5 | | 901 | PUSH | DD | ; | |
| 0003 E5 | | 902 | PUSH | H | ; | |
| 0004 3A0480 | | 903 | LDA | RECRUN | ;<A> = REC ACTIVE FLAG | |
| 0007 B7 | | 904 | ORA | A | ; | |
| 0008 3EC4 | | 905 | MVI | A,ERRCUI | ; | |
| 000A CC0000 | E | 906 | CZ | SYSERR | ;REPORT UNEXPECTED RECOGNITION INTERRUPT | |
| 000D 3A0000 | E | 907 | LDA | ITSR16 | ;SAVE 16 ZONE SCORES? | |
| 0010 B7 | | 908 | ORA | A | ; | |
| 0011 CA2B00 | C | 909 | JZ | RDADDR | ;JUMP IF NOT IN TEST LOOP | |
| 0014 2A0000 | E | 910 | LHLD | RCVZSP | ;GET ZONE SCORE POINTER | |
| 0017 7D | | 911 | MOV | A,L | ;END OF ZONE SCORE BUFFER? | |
| 0018 E67F | | 912 | ANI | SYSCHL-1 | ; | |
| 001A CA2B00 | C | 913 | JZ | RDADDR | ;YES, DONT SAVE SCORES | |
| 001D 0608 | | 914 | MVI | B,8 | ;TRANSFER 8 BYTES | |
| 001F 3A46FF | | 915 RECIL1: | LDA | BUSRSR | ;GET NEXT SCORE | |
| 0022 77 | | 916 | MOV | M,A | ;SAVE | |
| 0023 23 | | 917 | INX | H | ; | |
| 0024 05 | | 918 | DCR | B | ;ALL 16 TRANSFERRED? | |
| 0025 C21F00 | C | 919 | JNZ | RECIL1 | ;NO, TRANSFER NEXT SCORE | |
| 0028 220000 | E | 920 | SHLD | RCVZSP | ;YES, SAVE UPDATED POINTER | |
| | | 921 ; | | | | |
| | | 922 ;CALCULATE CURRENT ASCII CODE USING MASK ADDRESS | | | | |

```
                      923 ;
002B 3A40FF           924 RDADDR: LDA    BUSRCH      ;<A> = LOW MASK ADDRESS
002E 5F               925         MOV    E,A         ;
002F 2A0000   E       926         LHLD   FHAOTF      ;<HL> = - OFFSET TO FIRST MASK
0032 3A42FF           927         LDA    BUSRLA      ;<A> = HIGH MASK ADDRESS
0035 57               928         MOV    D,A         ;<DE> = MASK ADDRESS
0036 E60F             929         ANI    0FH         ;
0038 320000   E       930         STA    RCVCZN      ;SAVE AS CURRENT ZONE
003B 7A               931         MOV    A,D         ;
003C E6F0             932         ANI    0F0H        ;
003E 0F               933         RRC                ;
003F 0F               934         RRC                ;
0040 0F               935         RRC                ;
0041 0F               936         RRC                ;
0042 57               937         MOV    D,A         ;<DE> = MASK ADDRESS
0043 EB               938         XCHG               ;
0044 220000   E       939         SHLD   RCVCOF      ;SAVE ABSOLUTE MASK ADDRESS
0047 19               940         DAD    D           ;<HL> = RELATIVE MASK ADDRESS
0048 110098           941         LXI    D,SYSFAM    ;<DE> = ASCII TRANSLATION TABLE
004B 19               942         DAD    D           ;POINT TO CURRENT ASCII
004C 4E               943         MOV    C,M         ;<C> = ASCII
                      944 $EJECT
                      945 ;
                      946 ;READ SCORE AND DETERMINE IF IT SHOULD BE KEPT
                      947 ;
004D 3A0000   E       948         LDA    SEGMAS      ;
0050 47               949         MOV    B,A         ;<B> = MAX SCORE
0051 3A41FF           950         LDA    BUSRHA      ;<A> = LOW SCORE (START PROCESSING NEXT MASK)
0054 B8               951         CMP    B           ;CHECK FOR MAX SCORE
0055 D2A500   C       952         JNC    RECI05      ;JUMP IF NEW >= MAX
0058 2A0000   E       953         LHLD   RCVFLS      ;<L> = LOW SCORE
                      954                            ;<H> = NEXT SCORE
005B BC               955         CMP    H           ;COMPARE NEW SCORE AGAINST NEXT SCORE
005C D2A500   C       956         JNC    RECI05      ;JUMP IF NEW >= NEXT
                      957 ;
                      958 ;POSSIBLE NEW NEXT AND/OR LOW SCORES
                      959 ;
005F 47               960         MOV    B,A         ;<B> = NEW SCORE
                      961                            ;<C> = NEW ASCII
0060 EB               962         XCHG               ;<E> = LOW SCORE
                      963                            ;<D> = NEXT SCORE
0061 2A0000   E       964         LHLD   RCVFLA      ;<L> = LOW ASCII
                      965                            ;<H> = NEXT ASCII
0064 BB               966         CMP    E           ;COMPARE NEW AND LOW SCORES
0065 DA7A00   C       967         JC     NEWLOW      ;JUMP IF NEW < LOW
0068 79               968         MOV    A,C         ;<A> = NEW ASCII
0069 BD               969         CMP    L           ;COMPARE NEW ASCII AND LOW ASCII
006A CAA500   C       970         JZ     RECI05      ;JUMP IF NEW ASCII = LOW ASCII
006D 61               971         MOV    H,C         ;SET NEW NEXT ASCII
006E 50               972         MOV    D,B         ;SET NEW NEXT SCORE
006F E5               973         PUSH   H           ;SAVE ASCIIS
0070 2A0000   E       974         LHLD   RCVCOF      ;
0073 220000   E       975         SHLD   RCVNOF      ;SAVE NEXT OFFSET
0076 E1               976         POP    H           ;
0077 C39900   C       977         JMP    NEWSCR      ;
                      978 ;
                      979 ;NEW LOW SCORE
                      980 ;
007A 7D               981 NEWLOW: MOV    A,L         ;<A> = OLD LOW ASCII
007B B9               982         CMP    C           ;COMPARE WITH NEW LOW ASCII
007C CAB900   C       983         JZ     THROWO      ;JUMP IF NEW ASCII = LOW ASCII
007F 65               984         MOV    H,L         ;<H> = OLD LOW ASCII = NEW NEXT ASCII
0080 53               985         MOV    D,E         ;<E> = OLD LOW SCORE = NEW NEXT ASCII
0081 E5               986         PUSH   H           ;
0082 2A0000   E       987         LHLD   RCVLOF      ;
0085 220000   E       988         SHLD   RCVNOF      ;
0088 E1               989         POP    H           ;
0089 69               990 THROWO: MOV    L,C         ;<H> = NEW LOW ASCII
008A 58               991         MOV    E,B         ;<D> = NEW LOW SCORE
```

```
008B 3A0000  E  992       LDA    RCVCZN    ;
008E 320000  E  993       STA    RCVLZN    ;UPDATE LOW ZONE
0091 E5         994       PUSH   H         ;SAVE ASCIIS
0092 2A0000  E  995       LHLD   RCVCOF    ;
0095 220000  E  996       SHLD   RCVLOF    ;UPDATE LOW OFFSET
0098 E1         997       POP    H         ;RESTORE ASCIIS
0099 220000  E  998 NEWSCR: SHLD RCVFLA    ;UPDATE ASCIIS
009C EB         999       XCHG             ;
009D 220000  E  1000      SHLD   RCVFLS    ;UPDATTE SCORES
00A0 3EFF       1001      MVI    A,0FFH    ;
00A2 320000  E  1002      STA    RCVLSR    ;SET LOW SCORE FOUND FLAG
                1003 $EJECT
                1004 ;
                1005 ;SCORE HAS BEEN PROCESSED - CHECK FOR BREAKPOINT ADDRESS
                1006 ;
00A5 2A0000  E  1007 RECI05: LHLD RCVCOF   ;<HL> = CURRENT ADDRESS
00A8 EB         1008      XCHG             ;<DE> = ABSOLUTE ADDRESS
00A9 2A0000  E  1009      LHLD   FHAOTF    ;<HL> = OFFSET TO FIRST MASK
00AC 19         1010      DAD    D         ;
00AD EB         1011      XCHG             ;<DE> = CURRENT OFFSET
00AE 2A0000  E  1012      LHLD   RCVBOF    ;<HL> = BREAKPOINT OFFSET
00B1 19         1013      DAD    D         ;
00B2 7C         1014      MOV    A,H       ;
00B3 B5         1015      ORA    L         ;CHECK FOR ZERO
00B4 CADC00  C  1016      JZ     BREAKP    ;JUMP IF END OF SEGMENT
00B7 2A0000  E  1017      LHLD   RCVPOF    ;<HL> = PREVIOUS OFFSET
00BA EB         1018      XCHG             ;<DE> = PREVIOUS OFFSET
                1019                       ;<HL> = CURRENT OFFSET
00BB 220000  E  1020      SHLD   RCVPOF    ;SAVE PREVIOUS OFFSET
00BE 7C         1021      MOV    A,H       ;<A> = CURRENT HIGH ORDER BYTE
00BF BA         1022      CMP    D         ;COMPARE WITH PREVIOUS BYTE
00C0 3EC4       1023      MVI    A,ERRCUI  ;
00C2 DC0000  E  1024      CC     SYSERR    ;CRASH IF WRAP-AROUND OCCURED
00C5 C22404  C  1025      JNZ    RECEOI    ;JUMP TO END OF INTERRUPT
00C8 7B         1026      MOV    A,E       ;<A> = PREVIOUS LOW ORDER BYTE
00C9 BD         1027      CMP    L         ;COMPARE WITH CURRENT BYTE
00CA DA2404  C  1028      JC     RECEOI    ;
00CD 3EC4       1029      MVI    A,ERRCUI  ;
00CF CD0000  E  1030      CALL   SYSERR    ;
00D2 AF         1031      XRA    A         ;
00D3 3242FF     1032      STA    BUSRLA    ;RESET HARDWARE
00D6 CD0000  E  1033      CALL   RUNFNT    ;
00D9 C32404  C  1034      JMP    RECEOI    ;RESTART RECOGNITION
                1035 $EJECT
                1036 ;
                1037 ;BREAKPOINT ADDRESS FOUND
                1038 ;
00DC AF         1039 BREAKP: XRA A         ;<A> = 0
00DD 3242FF     1040      STA    BUSRLA    ;MASTER RESET
00E0 E5         1041      PUSH   H         ;
00E1 E1         1042      POP    H         ;
00E2 FB         1043      EI               ;ENABLE INTERRUPTS
00E3 3A0000  E  1044      LDA    RCVLSR    ;
00E6 3C         1045      INR    A         ;
00E7 C29601  C  1046      JNZ    NXTSEG    ;JUMP IF NO SCORE REPORTED
00EA 2A0000  E  1047      LHLD   RCVFLS    ;<L> = LOW SCORE
                1048                       ;<H> = NEXT SCORE
00ED 44         1049      MOV    B,H       ;<B> = NEXT SCORE
00EE 4D         1050      MOV    C,L       ;<C> = LOW SCORE
00EF 2A0A80     1051      LHLD   RECPTR    ;<HL> = BUFFER ADDRESS
00F2 110800     1052      LXI    D,RECLCH  ;
00F5 19         1053      DAD    D         ;<HL> = LOW ASCII ADDRESS
00F6 EB         1054      XCHG             ;<DE> = LOW ASCII ADDRESS
00F7 2A0000  E  1055      LHLD   RCVFLA    ;<L> = LOW ASCII
                1056                       ;<H> = NEXT ASCII
00FA EB         1057      XCHG             ;<E> = LOW ASCII
                1058                       ;<D> = NEXT ASCII
                1059                       ;<HL> = LOW ASCII ADDRESS
00FB 04         1060      INR    B         ;CHECK FOR NO NEXT SCORE
```

```
00FC C20701   C  1061           JNZ     RBSTBF          ;JUMP IF NEXT SCORE IS VALID
00FF 3A0000   E  1062           LDA     SEGMAS          ;<A> = MAX SCORE
0102 320100   E  1063           STA     RCVFLS+1        ;SET NEXT SCORE TO MAX SCORE
0105 47          1064           MOV     B,A             ;
0106 04          1065           INR     B               ;
0107 05          1066  RBSTBF:  DCR     B               ;
0108 73          1067           MOV     M,E             ;SAVE LOW ASCII
0109 23          1068           INX     H               ;
010A 71          1069           MOV     M,C             ;SAVE LOW SCORE
010B 23          1070           INX     H               ;
010C 72          1071           MOV     M,D             ;SAVE NEXT ASCII
010D 23          1072           INX     H               ;
010E 78          1073           MOV     A,B             ;<A> = NEXT SCORE
010F 91          1074           SUB     C               ;<A> = SEPARATION
0110 47          1075           MOV     B,A             ;<B> = SEPARATION
0111 70          1076           MOV     M,B             ;SAVE SEPARATION
0112 23          1077           INX     H               ;POINT TO BURN LEVEL
0113 23          1078           INX     H               ;POINT TO ISO STATUS
0114 23          1079           INX     H               ;POINT TO TAC
0115 23          1080           INX     H               ;POINT TO SAC
0116 23          1081           INX     H               ;POINT TO ADDRESSES
0117 EB          1082           XCHG                    ;
0118 2A0000   E  1083           LHLD    RCVLOF          ;<HL> = LOW MASK ADDRESS
011B EB          1084           XCHG                    ;
011C 73          1085           MOV     M,E             ;SAVE LOW BYTE OF
011D C5          1086           PUSH    B               ;SAVE SCORE AND SEPARATION
011E 4B          1087           MOV     C,E             ;
011F 23          1088           INX     H               ;LOW MASK ADDRESS
0120 72          1089           MOV     M,D             ;SAVE HIGH BYTE OF
0121 42          1090           MOV     B,D             ;<BD> = LOW ADDRESS
0122 23          1091           INX     H               ;HIGH MASK ADDRESS
0123 EB          1092           XCHG                    ;
0124 2A0000   E  1093           LHLD    RCVNOF          ;<HL> = NEXT MASK ADDRESS
0127 EB          1094           XCHG                    ;
0128 73          1095           MOV     M,E             ;SAVE LOW BYTE OF
0129 23          1096           INX     H               ;NEXT MASK ADDRESS
012A 72          1097           MOV     M,D             ;SAVE HIGH BYTE OF
                 1098                                   ;NEXT MASK ADDRESS
                 1099  $EJECT
                 1100  ;
                 1101  ;CALCULATE CHARACTER THRESHOLD AND SEPARATION
                 1102  ;
012B 2A0000   E  1103           LHLD    FHAOTF          ;<HL> = OFFSET TO FIRST MASK
012E 09          1104           DAD     B               ;<HL> = RELATIVE OFFSET
012F C1          1105           POP     B               ;RESTORE SCORE AND SEPARATION
0130 110099      1106           LXI     D,SYSFTT        ;<DE> = THRESHOLD TABLE ADDRESS
0133 19          1107           DAD     D               ;
0134 56          1108           MOV     D,M             ;<D> = THRESHOLD/SEPERATION FOR THIS CHAR
0135 211800   E  1109           LXI     H,FRAHDR+FONTTH ;POINT TO BASE THRESHOLD
0138 7A          1110           MOV     A,D             ;<A> = CHAR THRESHOLD/SEPARATION
0139 E6F0        1111           ANI     0F0H            ;
013B 0F          1112           RRC                     ;
013C 0F          1113           RRC                     ;
013D 0F          1114           RRC                     ;
013E 0F          1115           RRC                     ;<A> = CHAR THRESHOLD INCREMENT
013F 86          1116           ADD     M               ;ADD BASE THRESHOLD
0140 5F          1117           MOV     E,A             ;<E> = CHAR THRESHOLD
0141 320000   E  1118           STA     RCVTHS          ;
0144 7A          1119           MOV     A,D             ;<A> = CHAR THRESHOLD/SEPARATION
0145 E60F        1120           ANI     0FH             ;<A> = CHAR SEPARATION INCREMENT
0147 23          1121           INX     H               ;POINT TO BASE SEPARATION
0148 86          1122           ADD     M               ;ADD BASE SEPARATION
0149 57          1123           MOV     D,A             ;<D> = CHAR SEPARATION
014A 320000   E  1124           STA     RCVSEP          ;SAVE
                 1125  $EJECT
                 1126  ;
                 1127  ;TEST FOR SCORE ACCEPTANCE
                 1128  ;<B> = SEPARATION
                 1129  ;<C> = LOW SCORE
```

```
                    1130 ;<D> = REQUIRED SEPARATION
                    1131 ;<E> = REQUIRED THRESHOLD
                    1132 ;
014D 2A0A80         1133 TSTEST: LHLD    RECPTR          ;
0150 D5             1134         PUSH    D               ;SAVE REQUIREMENTS
0151 110C00         1135         LXI     D,RECBLI        ;
0154 19             1136         DAD     D               ;POINT TO RETRY LEVEL
0155 7E             1137         MOV     A,M             ;
0156 B7             1138         ORA     A               ;CHECK RETRY LEVEL
0157 CA6D01    C    1139         JZ      NOBIAS          ;JUMP IF RETRY = 0
015A F25F01    C    1140         JP      POSTIV          ;
015D 2F             1141         CMA                     ;
015E 3C             1142         INR     A               ;
015F 07             1143 POSTIV: RLC                     ;MULTIPLY BY 2
0160 5F             1144         MOV     E,A             ;<E> = RETRY LEVEL X 2
0161 3A0E88         1145         LDA     SYSLHB+RECTAC   ;<A> = LAST TAC
0164 B7             1146         ORA     A               ;CHECK LAST TAC
0165 C26D01    C    1147         JNZ     NOBIAS          ;JUMP IF LAST TAC > 0
0168 7B             1148         MOV     A,E             ;<A> = RETRY LEVEL X 2
0169 D1             1149         POP     D               ;RESTORE REQUIREMENTS
016A 82             1150         ADD     D               ;BIAS SEPARATION CRITERIA
016B 57             1151         MOV     D,A             ;SAVE NEW SEPARATION CRITERIA
016C D5             1152         PUSH    D               ;
016D 23             1153 NOBIAS: INX     H               ;
016E 23             1154         INX     H               ;POINT TO CURRENT TAC
016F D1             1155         POP     D               ;RESTORE REQUIREMENTS
0170 7B             1156         MOV     A,E             ;<A> = THRESHOLD
0171 B9             1157         CMP     C               ;COMPARE AGAINST LOW SCORE
0172 DA7D01    C    1158         JC      CHKSEP          ;JUMP IF LOW SCORE > THRESHOLD
0175 35             1159         DCR     M               ;DECREMENT TAC
0176 B7             1160         ORA     A               ;CLEAR CARRY
0177 1F             1161         RAR                     ;<A> = THRESHOLD/2
0178 B9             1162         CMP     C               ;COMPARE AGAINST LOW SCORE
0179 DA7D01    C    1163         JC      CHKSEP          ;JUMP IF LOW SCORE > THRESHOLD/2
017C 35             1164         DCR     M               ;DECREMENT TAC
017D 23             1165 CHKSEP: INX     H               ;POINT TO SAC IN BUFFER
017E 7A             1166         MOV     A,D             ;<A> = REQUIRED SEP
017F B8             1167         CMP     B               ;COMPARE AGAINST SEPARATION
0180 D29001    C    1168         JNC     PRCESS          ;JUMP IF SEP <= REQUIRED SEP
0183 35             1169         DCR     M               ;DECREMENT SAC
0184 79             1170         MOV     A,C             ;<A> = LOW SCORE
0185 1F             1171         RAR                     ;
0186 1F             1172         RAR                     ;
0187 1F             1173         RAR                     ;
0188 E61F           1174         ANI     1FH             ;<A> = LOW SCORE/8
018A 82             1175         ADD     D               ;<A> = REQUIRED SEP + 1/8 OF LOW SCORE
018B B8             1176         CMP     B               ;COMPARE AGAINST SEPARATION
018C D29001    C    1177         JNC     PRCESS          ;JUMP IF SEP <= REQUIRED SEP + 1/8 LOW SCORE
018F 35             1178         DCR     M               ;DECREMENT SAC
0190 7E             1179 PRCESS: MOV     A,M             ;<A> = SAC
0191 2B             1180         DCX     H               ;
0192 B6             1181         ORA     M               ;OR WITH TAC
0193 CA8503    C    1182         JZ      CHDONE          ;
                    1183 $EJECT
                    1184 ;
                    1185 ;CHARACTER HAS FAILED TIGHT ACCEPTANCE
                    1186 ; 1) ATTEMPT TO RUN NEXT SEGMENT
                    1187 ;
                    1188 NULREC:
0196 2A0A80         1189 NXTSEG: LHLD    RECPTR          ;
0199 110700         1190         LXI     D,RECVSZ        ;
019C 19             1191         DAD     D               ;
019D 7E             1192         MOV     A,M             ;<A> = CHARACTER HEIGHT
019E 2A0000    E    1193 CHKNSG: LHLD    SEGPTR          ;
01A1 111000         1194         LXI     D,SGTLEN        ;OFFSET TO NEXT SEGMENT TABLE
01A4 19             1195         DAD     D               ;INCREMENT AND
01A5 220000    E    1196         SHLD    SEGPTR          ;SAVE
01A8 56             1197         MOV     D,M             ;<D> = MIN HEIGHT REQUIREMENT
```

```
01A9 14            1198         INR    D               ;
01AA CACB01  C     1199         JZ     LSTSEG          ;JUMP IF END OF SEGMENT TABLE
01AD BE            1200         CMP    M               ;COMPARE
01AE DA9E01  C     1201         JC     CHKNSG          ;JUMP IF SIZE < MINIMUM HEIGHT
01B1 23            1202         INX    H               ;POINT TO MAX HEIGHT
01B2 57            1203         MOV    D,A             ;<D> = SIZE
01B3 7E            1204         MOV    A,M             ;<A> = MAXIMUM HEIGHT
01B4 BA            1205         CMP    D               ;COMPARE
01B5 7A            1206         MOV    A,D             ;<A> = SIZE
01B6 DA9E01  C     1207         JC     CHKNSG          ;JUMP IF SIZE > MAXIMUM HEIGHT
01B9 2A0A80        1208         LHLD   RECPTR          ;
01BC 110E00        1209         LXI    D,RECTAC        ;
01BF 19            1210         DAD    D               ;
01C0 3E02          1211         MVI    A,2             ;
01C2 77            1212         MOV    M,A             ;SET NEW TAC
01C3 23            1213         INX    H               ;
01C4 77            1214         MOV    M,A             ;SET NEW SAC
01C5 CD0000  E     1215         CALL   RUNSEG          ;
01C8 C32404  C     1216         JMP    RECEDI          ;RUN NEXT SEGMENT
                   1217 ;
                   1218 ;ALL SEGMENTS IN CURRENT FONT ATTEMPTED
                   1219 ; 2) CHECK SCORES TO DETERMINE TYPE OF RETRY
                   1220 ;<A> = CHARACTER HEIGHT
                   1221 ;<B> = SEPARATION
                   1222 ;<C> = LOW SCORE
                   1223 ;
01CB 2A0A80        1224 LSTSEG: LHLD   RECPTR          ;
01CE 110990        1225         LXI    D,RECLSC        ;
01D1 19            1226         DAD    D               ;
01D2 7E            1227         MOV    A,M             ;<A> = LOW SCORE
01D3 23            1228         INX    H               ;
01D4 23            1229         INX    H               ;POINT TO SEPARATION
01D5 86            1230         ADD    M               ;<A> = LOW SCORE + SEPARATION
01D6 FE07          1231         CPI    7               ;
01D8 DA4402  C     1232         JC     ONETO1          ;JUMP IF LOW SCORE + SEP < 7
                   1233 ;
                   1234 ;EXECUTE NORMAL RETRIES
                   1235 ;
01DB 3A0000  E     1236         LDA    FNTNUM          ;<A> = FONT NUMBER
01DE B7            1237         ORA    A               ;
01DF C20F02  C     1238         JNZ    CHKLNF          ;JUMP IF NOT PRIMARY FONT
01E2 CD0000  E     1239         CALL   RECNTR          ;ATTEMPT TO RE-CENTER CHARACTER
01E5 CA3D02  C     1240         JZ     RERUNR          ;RERUN IF CHAR WAS OFF-CENTERED (CC.Z)
01E8 F2EE01  C     1241         JP     CHKSNF          ;CONTINUE IF CHAR WAS CENTERED (CC.P)
01EB C3F701  C     1242         JMP    BERASE          ;JUMP IF BUFFER IS BLANK (CC.M)
01EE CD0000  E     1243 CHKSNF: CALL   SNFLTR          ;ATTEMPT TO FILTER SMALL NOISE
01F1 CA3D02  C     1244         JZ     RERUNR          ;RERUN IF SMALL NOISE FOUND (CC.Z)
01F4 F2FF01  C     1245         JP     SAVBUF          ;CONTINUE IF NO NOISE FOUND (CC.P)
01F7 2A0A80        1246 BERASE: LHLD   RECPTR          ;PROCESS BLANK CHARACTER (CC.M)
01FA AF            1247         XRA    A               ;
01FB 77            1248         MOV    M,A             ;IDLE BUFFER
01FC C31804  C     1249         JMP    RECEND          ;
01FF 3A0000  E     1250 SAVBUF: LDA    RTFLNF          ;CHECK FOR LARGE NOISE ALREADY TRIED
0202 B7            1251         ORA    A               ;
0203 C20F02  C     1252         JNZ    CHKLNF          ;JUMP IF ALREADY TRIED
0206 2A0A80        1253         LHLD   RECPTR          ;
0209 110087        1254         LXI    D,SYSRHB        ;SAVE IN RUNNING REC HOLDING BUFFER
020C CD0000  E     1255         CALL   BUFMOV          ;
020F CD0000  E     1256 CHKLNF: CALL   LNFLTR          ;ATTEMPT TO FILTER LARGE NOISE
0212 CA3D02  C     1257         JZ     RERUNR          ;
0215 3A0000  E     1258         LDA    RCVNML          ;<A> = NORMALIZER COUNT
0218 B7            1259         ORA    A               ;
0219 F22802  C     1260         JP     LIGHTR          ;JUMP IF LIGHTER COPY EXPECTED
021C CD0000  E     1261 DARKER: CALL   SWBURN          ;ATTEMPT TO BURN CHARACTER
021F CA3D02  C     1262         JZ     RERUNR          ;
0222 CD0000  E     1263         CALL   SWGROW          ;ATTEMPT TO REGROW CHARACTER
0225 CA3D02  C     1264         JZ     RERUNR          ;
0228 C33702  C     1265         JMP    CHKUL0          ;
022B CD0000  E     1266 LIGHTR: CALL   SWGROW          ;
```

```
022E CA3D02  C  1267           JZ    RERUNR    ;
0231 CD0000  E  1268           CALL  SWBURN    ;
0234 CA3D02  C  1269           JZ    RERUNR    ;
0237 CD0000  E  1270 CHKUL0:   CALL  UDLRT0    ;ATTEMPT TO FILTER UNDERLINE
023A C2DF02  C  1271           JNZ   POSTPR    ;
023D AF        1272 RERUNR:    XRA   A         ;
023E CD0000  E  1273           CALL  RRFONT    ;
0241 C32404  C  1274           JMP   RECEOI    ;
                1275 $EJECT
                1276 ;
                1277 ;ONE-TO-ONE CORRELATOR
                1278 ;
0244 2A0A80     1279 ONETO1:   LHLD  RECPTR    ;
0247 111200     1280           LXI   D,RECNMA  ;
024A CD8602  C  1281           CALL  RDCRLT    ;READ AND CORRELATE
024D C2DF02  C  1282           JNZ   POSTPR    ;JUMP IF COUNTER OVERFLOWED
0250 79         1283           MOV   A,C       ;
0251 320100  E  1284           STA   RCVFLS+1  ;
0254 2A0A80     1285           LHLD  RECPTR    ;
0257 111000     1286           LXI   D,RECLMA  ;
025A CD8602  C  1287           CALL  RDCRLT    ;
025D C2DF02  C  1288           JNZ   POSTPR    ;JUMP IF COUNTER OVERFLOWED
0260 3A0100  E  1289           LDA   RCVFLS+1  ;<A> = NEXT SCORE
0263 91         1290           SUB   C         ;
0264 DADF02  C  1291           JC    POSTPR    ;JUMP IF LOW SCORE > NEXT SCORE
0267 47         1292           MOV   B,A       ;<B> = SEPARATION
0268 3A0000  E  1293           LDA   RCVTHS    ;
026B 0F         1294           RRC             ;DIVIDE BY 2
026C B9         1295           CMP   C         ;COMPARE AGAINST LOW SCORE
026D DADF02  C  1296           JC    POSTPR    ;JUMP IF LOW SCORE > THRESHOLD/2
0270 3A0000  E  1297           LDA   RCVSEP    ;
0273 B8         1298           CMP   B         ;
0274 D2DF02  C  1299           JNC   POSTPR    ;JUMP IF SEPARATION <= REQUIRED SEP
0277 2A0A80     1300           LHLD  RECPTR    ;
027A 110E00     1301           LXI   D,RECTAC  ;
027D 19         1302           DAD   D         ;
027E 3E01       1303           MVI   A,1       ;
0280 77         1304           MOV   M,A       ;SET TAC
0281 23         1305           INX   H         ;
0282 77         1306           MOV   M,A       ;SET SAC
0283 C38503  C  1307           JMP   CHDONE    ;JUMP WITH LOOSE ACCEPTANCE
                1308 ;
                1309 ;READ AND CORRELATE
                1310 ;
0286 19         1311 RDCRLT:   DAD   D         ;POINT TO MASK ADDRESS
0287 5E         1312           MOV   E,M       ;
0288 23         1313           INX   H         ;
0289 56         1314           MOV   D,M       ;<DE> = MASK ADDRESS
028A 7B         1315           MOV   A,E       ;<E> = LOW BYTE OF ADDRESS
028B A2         1316           ANA   D         ;<A> = LOW AND HIGH
028C 3C         1317           INR   A         ;CHECK FOR 0FFFFH
028D CA0000  E  1318           JZ    RETCNZ    ;RETURN (CC.NZ) IF 0FFFFH
0290 2A0000  E  1319           LHLD  FHA0TF    ;
0293 19         1320           DAD   D         ;
0294 010098     1321           LXI   B,SYSFAM  ;
0297 09         1322           DAD   B         ;
0298 2B         1323           DCX   H         ;
0299 7E         1324           MOV   A,M       ;
029A 3C         1325           INR   A         ;
029B 0E08       1326           MVI   C,8       ;
029D C2A202  C  1327           JNZ   NOTOFF    ;
02A0 0E00       1328           MVI   C,0       ;
02A2 EB         1329 NOTOFF:   XCHG            ;
02A3 29         1330           DAD   H         ;
02A4 29         1331           DAD   H         ;
02A5 29         1332           DAD   H         ;
02A6 29         1333           DAD   H         ;
02A7 7D         1334           MOV   A,L       ;
02A8 B1         1335           ORA   C         ;
```

```
02A9 6F            1336          MOV   L,A         ;
02AA 11E8FF        1337          LXI   D,-24       ;
02AD 19            1338          DAD   D           ;SUBTRACT 96
02AE EB            1339          XCHG              ;
02AF 2141FF        1340          LXI   H,BUSRHA    ;<HL> = HIGH ADDRESS PORT
02B2 72            1341          MOV   M,D         ;LOAD HIGH ADDRESS
02B3 E5            1342          PUSH  H           ;
02B4 E1            1343          POP   H           ;
02B5 23            1344          INX   H           ;
02B6 73            1345          MOV   M,E         ;LOAD LOW ADDRESS
02B7 E1            1346          POP   H           ;
02B8 E5            1347          PUSH  H           ;
02B9 0660          1348          MVI   B,96        ;<B> = NUMBER OF BYTES
02BB 0E00          1349          MVI   C,0         ;<C> = COUNT
02BD 2A0A00        1350          LHLD  RECPTR      ;
02C0 112000        1351          LXI   D,RECCHB    ;
02C3 19            1352          DAD   D           ;<HL> = CHARACTER
02C4 1147FF        1353          LXI   D,BUSRRR    ;<HL> = MASK READ PORT
02C7 1A            1354 RCLOOP:  LDAX  D           ;
02C8 AE            1355          XRA   M           ;
02C9 CAD902     C  1356          JZ    MATCH       ;
02CC E5            1357          PUSH  H           ;
02CD 210006        1358          LXI   H,BCTORG    ;
02D0 85            1359          ADD   L           ;
02D1 6F            1360          MOV   L,A         ;
02D2 7E            1361          MOV   A,M         ;
02D3 E1            1362          POP   H           ;
02D4 81            1363          ADD   C           ;
02D5 DA0000     E  1364          JC    RETCNZ      ;RETURN IF COUNTER OVERFLOW
02D8 4F            1365          MOV   C,A         ;
02D9 23            1366 MATCH:   INX   H           ;
02DA 05            1367          DCR   B           ;
02DB C2C702     C  1368          JNZ   RCLOOP      ;
02DE C9            1369          RET               ;
                   1370 $EJECT
                   1371 ;
                   1372 ;RECOGNITION POST PROCESSING
                   1373 ;
02DF 3A0000     E  1374 POSTPR:  LDA   ITSROF      ;<A> = DEBUG FLAG
02E2 E680          1375          ANI   EFGRPP      ;CHECK FOR POST PROCESSING ENABLED
02E4 CAB503     C  1376          JZ    CHDONE      ;JUMP IF DISABLED
02E7 2A0900     E  1377          LHLD  FRAHDR+9    ;
02EA 7E            1378          MOV   A,M         ;<A> = FONT VERSION
02EB FE20          1379          CPI   32          ;
02ED DAB503     C  1380          JC    CHDONE      ;JUMP IF FONT VERSION < 2
02F0 2A0C00     E  1381          LHLD  FRAHDR+FONTRP ;GET ADDRESS OF RECOGNITION
                   1382                            ;POST PROCESSING ROUTINES
02F3 EB            1383          XCHG              ;
02F4 2A0000     E  1384          LHLD  FHAORG      ;
02F7 19            1385          DAD   D           ;
02F8 220000     E  1386          SHLD  PPTADR      ;INITIALIZE POST PROCS TABLE ADDRESS
02FB 7C            1387 CHKFPP:  MOV   A,H         ;
02FC 3241FF        1388          STA   BUSRHA      ;SET HIGH ADDRESS
02FF 7D            1389          MOV   A,L         ;
0300 2A0A00        1390          LHLD  RECPTR      ;
0303 110800        1391          LXI   D,RECLCH    ;
0306 3242FF        1392          STA   BUSRLA      ;SET LOW ADDRESS
0309 19            1393          DAD   D           ;
030A 5E            1394          MOV   E,M         ;<E> = LOW ASCII
030B 23            1395          INX   H           ;
030C 23            1396          INX   H           ;
030D 56            1397          MOV   D,M         ;<D> = NEXT ASCII
030E 2147FF        1398          LXI   H,BUSRRR    ;<HL> = FONT READ BUS
0311 7E            1399          MOV   A,M         ;READ TABLE
0312 47            1400          MOV   B,A         ;<B> = FIRST ASCII
0313 3C            1401          INR   A           ;
0314 CAB503     C  1402          JZ    CHDONE      ;
0317 4E            1403          MOV   C,M         ;<C> = SECOND ASCII
0318 78            1404          MOV   A,B         ;<A> = FIRST ASCII
```

```
0319 BB              1405          CMP    E         ;CHECK FOR LOW ASCII
031A CA3103   C      1406          JZ     FOUND1    ;
031D BA              1407          CMP    D         ;CHECK FOR NEXT ASCII
031E C22603   C      1408          JNZ    NOMTCH    ;JUMP IF NO MATCH
0321 79              1409          MOV    A,C       ;<A> = SECOND ASCII
0322 BB              1410          CMP    E         ;CHECK FOR MATCHING PAIR
0323 CA3A03   C      1411          JZ     RUNPST    ;JUMP IF MATCHES SECOND
0326 2A0000   E      1412 NOMTCH:  LHLD   PPTADR    ;<HL> = TABLE ADDRESS
0329 23              1413          INX    H         ;
032A 23              1414          INX    H         ;POINT TO NEXT TABLE
032B 220000   E      1415          SHLD   PPTADR    ;
032E C3FB02   C      1416          JMP    CHKFPP    ;
0331 79              1417 FOUND1:  MOV    A,C       ;<A> = SECOND ASCII
0332 0C              1418          INR    C         ;CHECK FOR NO SECOND ASCII REQUIRED
0333 CA3A03   C      1419          JZ     RUNPST    ;
0336 BA              1420          CMP    D         ;CHECK FOR MATCHED SET
0337 C22603   C      1421          JNZ    NOMTCH    ;POINT TO LOW ADDRESS
033A 4E              1422 RUNPST:  MOV    C,M       ;<C> = LOW ADDRESS
033B E5              1423          PUSH   H         ;DELAY
033C E1              1424          POP    H         ;
033D 46              1425          MOV    B,M       ;<B> = HIGH ADDRESS OF CODE
033E E5              1426          PUSH   H         ;DELAY
033F E1              1427          POP    H         ;
0340 56              1428          MOV    D,M       ;<D> = LENGTH
0341 2A0000   E      1429          LHLD   FHAORG    ;
0344 09              1430          DAD    B         ;
0345 7C              1431          MOV    A,H       ;
0346 3241FF          1432          STA    BUSRHA    ;SET HIGH ADDRESS IN HARDWARE
0349 E5              1433          PUSH   H         ;
034A E1              1434          POP    H         ;
034B 7D              1435          MOV    A,L       ;
034C 3242FF          1436          STA    BUSRLA    ;SET LOW ADDRESS
034F 010081          1437          LXI    B,SYSREB  ;POINT TO EXECUTION BUFFER
0352 AF              1438          XRA    A         ;
0353 5F              1439          MOV    E,A       ;INITIALIZE CHKSUM
0354 2147FF          1440          LXI    H,BUSRRR  ;
0357 7E              1441 CODELP:  MOV    A,M       ;READ BYTE
0358 02              1442          STAX   B         ;SAVE IN BUFFER
0359 03              1443          INX    B         ;
035A 83              1444          ADD    E         ;
035B 5F              1445          MOV    E,A       ;UPDATE CHECKSUM
035C 15              1446          DCR    D         ;
035D C25703   C      1447          JNZ    CODELP    ;LOAD CODE
0360 7E              1448          MOV    A,M       ;<A> = CHECKSUM
0361 3C              1449          INR    A         ;
0362 CA7203   C      1450          JZ     CKSMOK    ;
0365 3D              1451          DCR    A         ;
0366 83              1452          ADD    E         ;
0367 CA7203   C      1453          JZ     CKSMOK    ;JUMP IF CHECKSUM OK
036A 3E61            1454          MVI    A,ERFFCK  ;
036C CD0000   E      1455          CALL   SYSERR    ;REPORT BAD CHECKSUM
036F C32603   C      1456          JMP    NOMTCH    ;
0372 2A0A80          1457 CKSMOK:  LHLD   RECPTR    ;<HL> = CURRENT BUFFER
0375 CD0081          1458          CALL   SYSREB    ;EXECUTE CODE
0378 2A0A80          1459          LHLD   RECPTR    ;POINT TO BUFFER
037B 110E00          1460          LXI    D,RECTAC  ;
037E 19              1461          DAD    D         ;POINT TO TAC
037F 7E              1462          MOV    A,M       ;<A> = TAC
0380 23              1463          INX    H         ;POINT TO SAC
0381 B6              1464          ORA    M         ;OR SAC WITH TAC
0382 C22603   C      1465          JNZ    NOMTCH    ;JUMP IF STILL NOT DONE
                     1466          $EJECT
                     1467 ;
                     1468 ;CHARACTER PROCESSING DONE FOR THIS FONT
                     1469 ;
0385 2A0A80          1470 CHDONE:  LHLD   RECPTR    ;
0388 110F00          1471          LXI    D,RECSAC  ;
038B EB              1472          XCHG             ;
```

```
038C 19        1473         DAD    D              ;<HL> = POINTER TO SAC
038D 7E        1474         MOV    A,M            ;<A> = SAC
038E 2B        1475         DCX    H              ;
038F B6        1476         ORA    M              ;<A> = TAC 'OR' SAC
0390 1F        1477         RAR                   ;
0391 1F        1478         RAR                   ;
0392 3E20      1479         MVI    A,RECERR       ;
0394 DABB03  C 1480         JC     SETSTA         ;PASS WITH TAC = 0 OR 1, SAC = 0 OR 1
0397 2B        1481         DCX    H              ;POINT TO ISO
0398 2B        1482         DCX    H              ;POINT TO BURN LEVEL
0399 2B        1483         DCX    H              ;POINT TO SEPARATION
039A 4E        1484         MOV    C,M            ;<C> = SEPARATION
039B 2B        1485         DCX    H              ;POINT TO NEXT ASCII
039C 2B        1486         DCX    H              ;POINT TO LOW SCORE
039D 2B        1487         DCX    H              ;POINT LOW ASCII
039E 7E        1488         MOV    A,M            ;<A> = LOW ASCII
039F 210005    1489         LXI    H,PATORG       ;
03A2 85        1490         ADD    L              ;INDEX INTO
03A3 6F        1491         MOV    L,A            ;POST PROCESSING TABLE
03A4 7E        1492         MOV    A,M            ;<A> = ADDITIONAL SEPARATION REQUIREMENT
03A5 E607      1493         ANI    7H             ;
03A7 FE07      1494         CPI    7              ;CHECK FOR REJECT CODE
03A9 CAB703  C 1495         JZ     CREJCT         ;JUMP IF UNIVERSAL REJECT SET
03AC 47        1496         MOV    B,A            ;<B> = ADDITIONAL SEPARATION
03AD 3A0000  E 1497         LDA    RCVSEP         ;<A> = SEPARATION REQUIREMENT
03B0 80        1498         ADD    B              ;<A> = PP SEP REQUIREMENT
03B1 B9        1499         CMP    C              ;COMPARE WITH SEPARATION
03B2 3E00      1500         MVI    A,0            ;SET FOR ACCEPTANCE
03B4 DABB03  C 1501         JC     SETSTA         ;JUMP IF ABSOLUTE ACCEPTANCE
03B7 3E04      1502 CREJCT: MVI    A,RECPPR       ;SET PP REJECT FLAG
03B9 F620      1503         ORI    RECERR         ;SET REJECT FLAG
03BB EB        1504 SETSTA: XCHG                  ;POINT TO STATUS BYTE
03BC 47        1505         MOV    B,A            ;<B> = ERROR/PP FLAG
03BD B6        1506         ORA    M              ;SET ERROR/POST PROCESSING FLAG
03BE 77        1507         MOV    M,A            ;SET STATUS
03BF 3A0000  E 1508         LDA    RCVPFK         ;<A> = FONT KNOWN
03C2 B7        1509         ORA    A              ;
03C3 CA0000  E 1510         JZ     FSERCH         ;
03C6 3A0000  E 1511         LDA    FNTNUM         ;
03C9 B7        1512         ORA    A              ;
03CA C20000  E 1513         JNZ    FSWTCH         ;
03CD 78        1514         MOV    A,B            ;
03CE FE20      1515         CPI    RECERR         ;
03D0 C2F403  C 1516         JNZ    RCPASS         ;JUMP IF NOT A REJECT
               1517 ;
               1518 ;CHARACTER IS REJECTED IN THE FIRST FONT
               1519 ;
03D3 3A0000  E 1520         LDA    SYSOPT         ;
03D6 0F        1521         RRC                   ;
03D7 D20804  C 1522         JNC    RECRSM         ;JUMP IF MODEL 201
03DA 3A0000  E 1523         LDA    FNTCNT         ;
03DD 3D        1524         DCR    A              ;
03DE CA0804  C 1525         JZ     RECRSM         ;JUMP IF ONLY ONE FONT
03E1 2A0A00    1526         LHLD   RECPTR         ;
03E4 110900    1527         LXI    D,RECLSC       ;
03E7 19        1528         DAD    D              ;
03E8 7E        1529         MOV    A,M            ;
03E9 23        1530         INX    H              ;
03EA 23        1531         INX    H              ;
03EB 86        1532         ADD    M              ;
03EC FE07      1533         CPI    7              ;
03EE DA0804  C 1534         JC     RECRSM         ;JUMP IF LOW SCORE + SEP < .7
03F1 C30000  E 1535         JMP    FSWTCH         ;INITIATE FONT SWITCH
               1536 ;
               1537 ;RECOGNITION PASSES
               1538 ;
03F4 110C00    1539 RCPASS: LXI    D,RECBLI       ;
03F7 19        1540         DAD    D              ;POINT TO BURN LEVEL INDICATOR
```

```
03F8 7E            1541           MOV    A,M           ;
03F9 210000   E    1542           LXI    H,RCVNML      ;POINT TO NORMALIZATION LEVEL
03FC 86            1543           ADD    M             ;
03FD FEF6          1544           CPI    0F6H          ;
03FF D20704   C    1545           JNC    NEWNRM        ;
0402 FE0A          1546           CPI    10            ;
0404 D20804   C    1547           JNC    RECRSM        ;JUMP IF BEYOND BOUNDS
0407 77            1548 NEWNRM:   MOV    M,A           ;SET NEW NORM
                   1549 ;
                   1550 ;RESUME RECOGNITION (END CURRENT CHARACTER PROCESSING)
                   1551 ;
0408 2A0A80        1552 RECRSM:   LHLD   RECPTR        ;
040B 7E            1553           MOV    A,M           ;
040C E63F          1554           ANI    3FH           ;CLEAR STATUS BITS
040E F640          1555           ORI    RECSWP        ;SET WAITING FOR PAGE IMAGE
0410 77            1556           MOV    M,A           ;
0411 EB            1557           XCHG                 ;<DE> = REC BUFFER
0412 217200        1558           LXI    H,TMDRCC      ;
0415 CD0000   E    1559           CALL   TSTLNK        ;INFORM MDS OF COMPLETE RECOGNITION
0418 010000        1560 RECEND:   LXI    B,0           ;
041B 110000   E    1561           LXI    D,TIMER2      ;
041E CD0000   E    1562           CALL   TIMOUT        ;RESET RECOGNITION TIMEOUT
0421 CD0000   E    1563           CALL   ISORGO        ;START NEXT CHARACTER, IF ANY
0424 E1            1564 RECEOI:   POP    H             ;RESTORE REGISTERS
0425 D1            1565           POP    D             ;
0426 C1            1566           POP    B             ;
0427 F1            1567           POP    PSW           ;
0428 FB            1568           EI                   ;
0429 C9            1569           RET                  ;
                   1570 ;
                   1571 ;RESTART RECOGNITION
                   1572 ;
042A 2A0A80        1573 RESTRR:   LHLD   RECPTR        ;<HL> = REC BUFFER ADDRESS
042D 110087        1574           LXI    D,SYSRHB      ;<DE> = RUNNING REC BUFFER
0430 EB            1575           XCHG                 ;
0431 CD0000   E    1576           CALL   BUFMOV        ;RESTORE RUNNING CHARACTER
0434 2A0A80        1577           LHLD   RECPTR        ;
0437 AF            1578           XRA    A             ;
0438 CD0000   E    1579           CALL   RUNFNT        ;RESTART NEXT FONT
043B C32404   C    1580           JMP    RECEOI        ;
                   1581           END
```

ASSEMBLY COMPLETE,   NO ERRORS

02/14/83-DESTREADER ISOLATION CARD SOFTWARE - DEFINITION MODULE

```
LOC  OBJ          LINE    SOURCE STATEMENT

1 $NOLIST
                   698 $LIST
                   699 $TITLE ('FONT DETERMINATION MODULE')
                   700 ;                  **************
                   701 ;                  *            *
                   702 ;                  *   ISOFNT   *
                   703 ;                  *            *
                   704 ;                  **************
                   705 ;
                   706 ;PUBLIC PROCEDURE DEFINITIONS
                   707 ;
                   708         PUBLIC  FSERCH         ;FONT SEARCH
                   709         PUBLIC  FSWTCH         ;FONT SWITCH
                   710         PUBLIC  PRGAFS         ;PURGE BUFFERS OF
                   711                                ;CHARACTER AWAITING FONT SELECT
                   712         PUBLIC  RECFSL         ;INITIALIZE FONT SELECT
                   713 ;
                   714 ;EXTERNAL PROCEDURE REFERENCES
                   715 ;
                   716         EXTRN   FONTLD         ;FONT LOAD
                   717         EXTRN   RESTRR         ;RESTART REC WITH NEW FONT
```

```
                        718         EXTRN   BUFMOV          ;MOVE BUFFER <HL> => <DE>
                        719         EXTRN   RECRSM          ;GO ON TO NEXT CHARACTER
                        720         EXTRN   RBINIT          ;INITIALIZE REC BUFFER
                        721         EXTRN   RETCZ           ;
                        722         EXTRN   SYSOPT          ;
                        723         EXTRN   RECEND          ;
                        724 ;
                        725 ;EXTERNAL VARIABLE REFERENCES
                        726 ;
                        727         EXTRN   RCVNML          ;NORMALIZATION LEVEL
                        728         EXTRN   RCVPFK          ;PRIMARY FONT KNOWN
                        729
                        730         EXTRN   RCVFST          ;FONT SCORE TABLE
                        731
                        732         EXTRN   RCVWBC          ;AWAITING BUFFER COUNT
                        733         EXTRN   RCVDFN          ;DEFAULT FONT NUMBER
                        734         EXTRN   RTFLNF          ;LARGE NOISE FILTER
                        735         EXTRN   FNTNUM          ;FONT NUMBER
                        736         EXTRN   FHAORG          ;FONT HARDWARE ORIGIN
                        737         EXTRN   FRAFOT          ;FONT ORIGIN ADDRESS TABLE
                        738
                        739         EXTRN   FNTCNT          ;FONT COUNT
                        740
                        741         EXTRN   BSTASC          ;BEST ASCII
                        742         EXTRN   BSTFNT          ;BEST FONT
                        743         EXTRN   BSTTAC          ;BEST TAC
                        744         EXTRN   BSTSAC          ;BEST SAC
                        745         EXTRN   BSTSCR          ;BEST SCORE
                        746
                        747         EXTRN   FSRMCC          ;FONT SEARCH CHARACTER COUNT
                        748         EXTRN   FSRACC          ;FONT SEARCH ACCEPTANCE
                        749         EXTRN   FSRSCC          ;FONT SEARCH SCORING CHARACTER COUNT
                        750
                        751         EXTRN   FRAHDR          ;
                        752         EXTRN   FNTIST          ;SCRATCH ISOLATION TABLE
                        753         EXTRN   FSEPHB          ;ACTUAL ISOLATION TABLE
                        754         EXTRN   FCPPTB          ;CONTEXTUAL POST PROCESSING TABLE
                        755                 CSEG            ;RELOC CODE FOLLOWS
                        756 $EJECT
                        757 ;
                        758 ;DETERMINE WHETHER TO GO INTO FONT SEARCH
                        759 ;
0000 CDBC01     C       760 FSWTCH: CALL    FPRCSS          ;
0003 CA0000     E       761         JZ      RESTRR          ;
0006 218387             762         LXI     H,SYSFHB+RECHSZ ;
0009 7E                 763         MOV     A,M             ;<A> = CURRENT FONT WIDTH
000A FE08               764         CPI     8               ;
000C DA2300     C       765         JC      NOCHNG          ;
000F FE18               766         CPI     24              ;
0011 D22300     C       767         JNC     NOCHNG          ;
0014 23                 768         INX     H               ;
0015 23                 769         INX     H               ;
0016 23                 770         INX     H               ;
0017 23                 771         INX     H               ;
0018 7E                 772         MOV     A,M             ;<A> = CHARACTER HEIGHT
0019 FE20               773         CPI     32              ;
001B CA2300     C       774         JZ      NOCHNG          ;
001E FE0E               775         CPI     0EH             ;
0020 D23500     C       776         JNC     SIZEOK          ;
0023 2A0A80             777 NOCHNG: LHLD    RECPTR          ;
0026 118087             778         LXI     D,SYSFHB        ;
0029 CD7B02     C       779         CALL    FDMOVE          ;
002C 010000             780         LXI     B,0             ;
002F CD0000     E       781         CALL    FONTLD          ;
0032 C30000     E       782         JMP     RECRSM          ;
                        783 ;
                        784 ;VALID CHARACTER SIZE
                        785 ;
```

```
0035 3A0000   E   786 SIZEOK: LDA     BSTFNT                  ;
0038 B7           787         ORA     A                       ;
0039 CA2300   C   788         JZ      NOCHNG                  ;
003C 3A0000   E   789         LDA     BSTTAC                  ;
003F B7           790         ORA     A                       ;
0040 C22300   C   791         JNZ     NOCHNG                  ;
0043 CD9202   C   792 INITFS: CALL    RECFSL                  ;
0046 C34F00   C   793         JMP     FSREN1                  ;
                  794 $EJECT
                  795 ;
                 7796 ;SEARCH THROUGH FONTS
                  797 ;
0049 CDBC01   C   798 FSERCH: CALL    FPRCSS                  ;
004C CA0000   E   799         JZ      RESTRR                  ;
004F 3A0000   E   800 FSREN1: LDA     BSTTAC                  ;<A> = BEST TAC
0052 47          801         MOV     B,A                     ;
0053 3A0000   E   802         LDA     BSTSAC                  ;<A> = BEST TAC
0056 B0          803         ORA     B                       ;<A> = BEST ACCEPTANCE
0057 0F          804         RRC                             ;
0058 0F          805         RRC                             ;
0059 DA3801   C   806         JC      NOSELC                  ;JUMP IF UNRECOGNIZABLE
                  807 ;
                  808 ;CHARACTER IS RECOGNIZABLE
                  809 ;
005C 3A0000   E   810         LDA     FSRACC                  ;<A> = ASCII ACCEPTANCE STATUS
005F B7          811         ORA     A                       ;
0060 CA8700   C   812         JZ      ACCCHR                  ;JUMP IF ACCEPTABLE
0063 2A0A80      813         LHLD    RECPTR                  ;
0066 3E10        814         MVI     A,RECAFS                ;
0068 B6          815         ORA     M                       ;
0069 77          816         MOV     M,A                     ;SET AWAITING FONT SELECT
006A 210000   E   817         LXI     H,RCVWBC                ;
006D 34          818         INR     M                       ;INC BUFFERS AWAITING FONT SELECT COUNT
006E 7E          819         MOV     A,M                     ;
006F FE06        820         CPI     6                       ;
0071 D24101   C   821         JNC     DFAULT                  ;JUMP IF COUNT >= 6
0074 2A0A80      822         LHLD    RECPTR                  ;
0077 EB          823         XCHG                            ;
0078 218087      824         LXI     H,SYSFHB                ;
007B CD0000   E   825         CALL    BUFMOV                  ;SAVE FONT SELECT DATA
007E 010000      826         LXI     B,0                     ;
0081 CD0000   E   827         CALL    FONTLD                  ;LOAD ORIGINAL FONT
0084 C30000   E   828         JMP     RECEND                  ;
                  829 ;
                  830 ;CHARACTER IS IDENTIFIABLE
                  831 ;
0087 3A0000   E   832 ACCCHR: LDA     BSTFNT                  ;<A> = BEST FONT NUMBER
008A 07          833         RLC                             ;
008B 07          834         RLC                             ;
008C 07          835         RLC                             ;
008D 07          836         RLC                             ;
008E 118087      837         LXI     D,SYSFHB                ;
0091 83          838         ADD     E                       ;
0092 5F          839         MOV     E,A                     ;
0093 2A0A80      840         LHLD    RECPTR                  ;
0096 CD7B02   C   841         CALL    FDMOVE                  ;
                  842 $EJECT
                  843 ;
                  844 ;CHECK CHARACTER SIZE TO DETERMINE WHETHER THIS CHARACTER
                  845 ;CAN BE USED FOR SELECTING FONT
                  846 ;
0099 2A0A80      847 CHKSIZ: LHLD    RECPTR                  ;
009C 110700      848         LXI     D,RECVSZ                ;
009F 19          849         DAD     D                       ;POINT TTO HEIGHT
00A0 3E0A        850         MVI     A,0AH                   ;
00A2 BE          851         CMP     M                       ;CHECK HEIGHT
00A3 D23801   C   852         JNC     NOSELC                  ;JUMP IF HEIGHT < 10
00A6 3E1F        853         MVI     A,31                    ;
```

```
00A8 BE            854         CMP     M       ;
00A9 DA3801  C     855         JC      NOSELC  ;JUMP IF HEIGHT >= 32
00AC 2B            856         DCX     H       ;
00AD 2B            857         DCX     H       ;
00AE 2B            858         DCX     H       ;
00AF 2B            859         DCX     H       ;POINT TO WIDTH
00B0 3E08          860         MVI     A,8     ;
00B2 BE            861         CMP     M       ;
00B3 D23801  C     862         JNC     NOSELC  ;JUMP IF WIDTH < 8
00B6 3E17          863         MVI     A,23    ;
00B8 BE            864         CMP     M       ;
00B9 DA3801  C     865         JC      NOSELC  ;JUMP IF WIDHT >= 24
                   866 ;
                   867 ;CHARACTER IS SUITABLE FOR FONT SELECT DATA
                   868 ;ADD SCORE TO CURRENT TABLE
                   869 ;
00BC 3A0000  E     870         LDA     BSTTAC  ;
00BF B7            871         ORA     A       ;
00C0 CAD000  C     872         JZ      ADDSCR  ;JUMP IF BEST TAC = 0
00C3 210000  E     873         LXI     H,FSRMCC ;
00C6 34            874         INR     M       ;INCREMENT MARIGNAL CHARACTER COUNT
00C7 7E            875         MOV     A,M     ;
00C8 FE0A          876         CPI     10      ;
00CA D24101  C     877         JNC     DFAULT  ;SELECT DEFAULT IF 10 MARGINAL
                   878                         ;CHARACTERS PROCESSED
00CD C33801  C     879         JMP     NOSELC  ;
                   880 ;
                   881 ;PRE-ELIMINATION PROCESS - IF BEST TAC = 0
                   882 ;DISABLE ALL FONTS WITH TAC = 2
                   883 ;
00D0 210000  E     884 ADDSCR: LXI     H,RCVFST ;POINT TO SCORE TABLE
00D3 3A0000  E     885         LDA     FNTNUM  ;
00D6 47            886         MOV     B,A     ;<B> = FONT COUNTER
00D7 118E87        887         LXI     D,SYSFHB+RECTAC ;POINT TO TAC
00DA 1A            888 PELOOP: LDAX    D       ;<A> = TAC
00DB FE02          889         CPI     2       ;CHECK FOR 02
00DD C2E200  C     890         JNZ     NOTOUT  ;JUMP IF EITHER 1 OR 0
00E0 36FF          891         MVI     M,0FFH  ;MAX SCORE COUNTER
00E2 23            892 NOTOUT: INX     H       ;POINT TO NEXT SCORE COUNTER
00E3 3E10          893         MVI     A,16    ;
00E5 83            894         ADD     E       ;
00E6 5F            895         MOV     E,A     ;
00E7 05            896         DCR     B       ;
00E8 C2DA00  C     897         JNZ     PELOOP  ;
                   898 $EJECT
                   899 ;
                   900 ;INCREMENT SCORE REGISTERS
                   901 ;
00EB 210000  E     902 DOIT:   LXI     H,FSRSCC ;
00EE 34            903         INR     M       ;INCREMENT NUMBER OF CHARACTERS IN SCORE
00EF 118987        904         LXI     D,SYSFHB+RECLSC ;POINT TO FIRST FONT'S LOW SCORE
00F2 210000  E     905         LXI     H,RCVFST ;POINT TO CUMULATIVE SCORE TABLE
00F5 3A0000  E     906         LDA     FNTNUM  ;
00F8 47            907         MOV     B,A     ;
00F9 4F            908         MOV     C,A     ;<D> = FONT COUNTER
00FA 7E            909 UPSCOR: MOV     A,M     ;<A> = FIRST CUMULATIVE SCORE
00FB 3C            910         INR     A       ;CHECK FOR ALREADY MAX-ED OUT
00FC CA0401  C     911         JZ      OVFLOW  ;JUMP IF THIS FONT IS FULL
00FF 1A            912         LDAX    D       ;<A> = SCORE
0100 86            913         ADD     M       ;ADD SCORE TO RUNNING TOTAL
0101 F20701  C     914         JP      SCOROK  ;JUMP IF CUMULATIVE SCORE DOESN'T MAX OUT
0104 3EFF          915 OVFLOW: MVI     A,0FFH  ;FORCE OVERFLOW IF SCORE EXCEEDS 7FH
0106 05            916         DCR     B       ;
0107 77            917 SCOROK: MOV     M,A     ;UPDATE SCORE
0108 23            918         INX     H       ;POINT TO NEXT FONT'S CUMULATIVE SCORE
0109 3E10          919         MVI     A,16    ;
010B 83            920         ADD     E       ;
```

```
010C 5F          921          MOV    E,A              ;POINT TO NEXT FONT
010D 0D          922          DCR    C                ;DECREMENT FONT COUNTER
010E C2FA00  C   923          JNZ    UPSCOR           ;
0111 78          924          MOV    A,B              ;<A> = NUMBER OF ACTIVE FONTS
0112 B7          925          ORA    A                ;
0113 CA4101  C   926          JZ     DFAULT           ;JUMP IF NO ACTIVE FONTS
0116 F5          927          PUSH   PSW              ;SAVE NUMBER OF ACTIVE FONTS
                 928  ;
                 929  ;DETERMINE DEFAULT FONT NUMBER
                 930  ;
0117 210000  E   931          LXI    H,RCVFST         ;POINT TO SCORE TABLE
011A 3A0000  E   932          LDA    FNTNUM           ;<A> = NUMBER OF FONTS
011D 5F          933          MOV    E,A              ;
011E 47          934          MOV    B,A              ;<B> = FONT COUNTER
011F 4F          935          MOV    C,A              ;<C> = LOW FONT NUMBER
0120 05          936          DCR    B                ;
0121 56          937          MOV    D,M              ;<D> = FIRST FONT'S SCORE
0122 23          938  FLOWER: INX    H                ;
0123 7E          939          MOV    A,M              ;<A> = SCORE
0124 BA          940          CMP    D                ;COMPARE AGAINST CURRENT LOW
0125 D22A01  CC  941          JNC    TWOLF2           ;
0128 56          942          MOV    D,M              ;SET CURRENT LOW
0129 48          943          MOV    C,B              ;
012A 05          944  TWOLF2: DCR    B                ;
012B C22201  C   945          JNZ    FLOWER           ;
012E 7B          946          MOV    A,E              ;
012F 91          947          SUB    C                ;
0130 320000  E   948          STA    RCVDFN           ;SAVE AS DEFAULT NUMBER
0133 F1          949          POP    PSW              ;
0134 3D          950          DCR    A                ;
0135 CA4E01  C   951          JZ     NEWFNT           ;JUMP IF ONLY ONE ACTIVE FONT
0138 010000      952  NOSELC: LXI    B,0              ;
013B CD0000  E   953          CALL   FONTLD           ;LOAD FIRST FONT
013E C30000  E   954          JMP    RECRSM           ;
                 955  $EJECT
                 956  ;
                 957  ;SELECT DEFAULT FONT
                 958  ;
0141 3A0000  E   959  DFAULT: LDA    FSRSCC           ;<A> = NUMBER OF CHARACTERS SCORED
0144 FE04        960          CPI    4                ;
0146 D24E01  C   961          JNC    NEWFNT           ;JUMP IF > 3 CHARACTERS SCORED
0149 3E00        962          MVI    A,0              ;
014B 320000  E   963          STA    RCVDFN           ;
                 964  ;
                 965  ;ESTABLISH PRIMARY FONT
                 966  ;
014E 3A0000  E   967  NEWFNT: LDA    RCVDFN           ;<A> = FONT NUMBER
0151 4F          968          MOV    C,A              ;
0152 0600        969          MVI    B,0              ;
0154 CD0000  E   970          CALL   FONTLD           ;SELECT NEW PRIMARY FONT
0157 3A0000  E   971          LDA    RCVDFN           ;
015A B7          972          ORA    A                ;
015B CA7D01  C   973          JZ     READY            ;
                 974  ;
                 975  ;UPDATE FONT ORIGIN ADDRESS TABLE
                 976  ;
015E 07          977          RLC                     ;<A> = FONT NUMBER X 2
015F 47          978          MOV    B,A              ;<B> = COUNTER
0160 5F          979          MOV    E,A              ;
0161 1600        980          MVI    D,0              ;<DE> = OFFSET
0163 210100  E   981          LXI    H,FRAFOT+1       ;
0166 19          982          DAD    D                ;POINT TO NEW FONT ORIGIN ADDRESS
0167 54          983          MOV    D,H              ;
0168 5D          984          MOV    E,L              ;<DE> = POINTER
0169 1B          985          DCX    D                ;
016A 1B          986          DCX    D                ;<DE> = OLD POINTER
016B 1A          987  FSRCH4: LDAX   D                ;
016C 77          988          MOV    M,A              ;
016D 1B          989          DCX    D                ;
```

```
016E 28            990          DCX    H           ;
016F 05            991          DCR    B           ;
0170 C26801  C     992          JNZ    FSRCH4      ;SHIFT FONTT ORIGIN TABLE
0173 2A0000  E     993          LHLD   FHAORG      ;
0176 220000  E     994          SHLD   FRAFOT      ;SAVE NEW OFFSET
0179 AF            995          XRA    A           ;
017A 320000  E     996          STA    RCVNML      ;RESET NORMALIZATION LEVEL
                   997                             ;FOR NEW FONT
                   998  ;
                   999  ;INITIALIZE FOR NEW FONT
                  1000  ;
017D AF           1001  READY:  XRA    A           ;
017E 210000  E    1002          LXI    H,RCVFST    ;CLEAR FONT SCORE TABLES
                  1003          REPT   8           ;
                  1004          MOV    M,A         ;
                  1005          INX    H           ;
                  1006          ENDM                ;
0191 320000  E    1023          STA    FNTNUM      ;RESET FONT NUMBER
0194 2F           1024          CMA                ;
0195 320000  E    1025          STA    RCVPFK      ;RESET PRIMARY FONT KNOWN FLAG
0198 210000  E    1026          LXI    H,FNTIST    ;<HL> = SCRATCH ISOLATION TABLE
019B 110000  E    1027          LXI    D,FSEPHB    ;<DE> = ISOLATION TABLE
019E 0608         1028          MVI    B,8         ;
01A0              1029  LDISPM: MOV    A,M         ;
01A0 7E
01A1 12           1030          STAX   D           ;LOAD ISO TABLE
01A2 23           1031          INX    H           ;
01A3 13           1032          INX    D           ;
01A4 05           1033          DCR    B           ;
01A5 C2A001  C    1034          JNZ    LDISPM      ;
01A8 210A00  E    1035          LXI    H,FRAHDR+0AH ;<HL> = CONTEXTUAL POST PROCESSING BYTES
01AB 5E           1036          MOV    E,M         ;
01AC 23           1037          INX    H           ;
01AD 56           1038          MOV    D,M         ;
01AE EB           1039          XCHG               ;
01AF 220000  E    1040          SHLD   FCPPTB      ;
01B2 3A0000  E    1041          LDA    RCVDFN      ;<A> = FONT'S OLD NUMBER
01B5 4F           1042          MOV    C,A         ;
01B6 CDE402  C    1043          CALL   PRGAFS      ;PURGE BUFFER OF CHARACTERS
                  1044                             ;AWAITING FONT SELECT
01B9 C30000  E    1045          JMP    RECRSM      ;GO ON TO NEXT CHARACTER
                  1046  $EJECT
                  1047  ;
                  1048  ;PROCESS CURRENT FONT DATA
                  1049  ;
01BC 2A0A80       1050  FPRCSS: LHLD   RECPTR      ;
01BF 118087       1051          LXI    D,SYSFHB    ;
01C2 3A0000  E    1052          LDA    FNTNUM      ;<A> = FONT NUMBER
01C5 07           1053          RLC                ;
01C6 07           1054          RLC                ;
01C7 07           1055          RLC                ;
01C8 07           1056          RLC                ;MULTIPLY BY 16
01C9 83           1057          ADD    E           ;
01CA 5F           1058          MOV    E,A         ;
01CB EB           1059          XCHG               ;
01CC CD7802  C    1060          CALL   FDMOVE      ;
01CF 2A0A80       1061          LHLD   RECPTR      ;
01D2 EB           1062          XCHG               ;<DE> = REC BUFFER
01D3 3A0000  E    1063          LDA    FNTNUM      ;<A> = CURRENT FONT NUMBER
01D6 B7           1064          ORA    A           ;
01D7 C2F201  C    1065          JNZ    TESTNW      ;JUMP IF NOT FIRST FONT
                  1066  ;
                  1067  ;FIRST FONT DATA - INITIALIZE BEST FONT VARIABLES
                  1068  ;
01DA 320000  E    1069          STA    FSRACC      ;ACCEPTANCE = 0
01DD 3A0000  E    1070          LDA    RTFLNF      ;CHECK LARGE NOISE FLAG
01E0 B7           1071          ORA    A           ;
01E1 C22902  C    1072          JNZ    NEWBST      ;JUMP IF CHARACTER ALREADY SAVED
01E4 EB           1073          XCHG               ;<HL> = REC BUFFER
```

```
01E5 110087      1074           LXI    D,SYSRHB      ;
01E8 CD0000  E   1075           CALL   BUFMOV        ;SAVE ORIGINAL CHARACTER
01EB 2A0A80      1076           LHLD   RECPTR        ;
01EE EB          1077           XCHG                 ;<DE> = BUFFER
01EF C32902  C   1078           JMP    NEWBST        ;
                 1079  $EJECT
                 1080  ;
                 1081  ;CURRENT FONT IS NOT FIRST FONT - TEST FOR NEW BEST FONT
                 1082  ;
01F2 210E00      1083  TESTNW:  LXI    H,RECTAC      ;
01F5 19          1084           DAD    D             ;POINT TO TAC
01F6 46          1085           MOV    B,M           ;<B> = NEW TAC
01F7 3A0000  E   1086           LDA    BSTTAC        ;<A> = BEST TAC
01FA B8          1087           CMP    B             ;COMPARE
01FB D04A02  C   1088           JC     TRYNXT        ;JUMP IF NEW TAC > BEST TAC
01FE C22902  C   1089           JNZ    NEWBST        ;JUMP IF NEW TAC < BEST TAC
                 1090  ;
                 1091  ;EQUAL TAC'S - TEST SAC'S
                 1092  ;
0201 23          1093           INX    H             ;POINT TO SAC
0202 46          1094           MOV    B,M           ;<B> = NEW SAC
0203 3A0000  E   1095           LDA    BSTSAC        ;<A> = BEST SAC
0206 B8          1096           CMP    B             ;
0207 DA4A02  C   1097           JC     TRYNXT        ;JUMP IF NEW SAC > BEST SAC
020A C22902  C   1098           JNZ    NEWBST        ;JUMP IF NEW SAC < BEST SAC
                 1099  ;
                 1100  ;EQUAL TAC'S AND SAC'S
                 1101  ;TEST ASCII'S
                 1102  ;
020D 210800      1103           LXI    H,RECLCH      ;
0210 19          1104           DAD    D             ;POINT TO LOW ASCII
0211 46          1105           MOV    B,M           ;<B> = NEW ASCII
0212 3A0000  E   1106           LDA    BSTASC        ;<A> = BEST ASCII
0215 B8          1107           CMP    B             ;COMPARE
0216 CA1F02  C   1108           JZ     TESTSC        ;JUMP IF ALL EQUAL
0219 E5          1109           PUSH   H             ;
021A 210000  E   1110           LXI    H,FSRACC      ;POINT TO FONT SEARCH ACCEPTANCE
021D 34          1111           INR    M             ;INCREMENT ACCEPTANCE - CHARACTER SCORED
                 1112                                ;AS TWO DIFFERENT ASCII'S IN DIFFERENT FONTS
021E E1          1113           POP    H             ;
021F 23          1114  TESTSC:  INX    H             ;POINT TO LOW SCORE
0220 3A0000  E   1115           LDA    BSTSCR        ;<A> = BEST SCORE
0223 47          1116           MOV    B,A           ;<B> = BEST SCORE
0224 7E          1117           MOV    A,M           ;<A> = CURRENT LOW SCORE
0225 B8          1118           CMP    B             ;COMPARE
0226 D24A02  C   1119           JNC    TRYNXT        ;JUMP IF BEST SCORE < LOW SCORE
                 1120  $EJECT
                 1121  ;
                 1122  ;NEW BEST GUESS
                 1123  ;
0229 210800      1124  NEWBST:  LXI    H,RECLCH      ;
022C 19          1125           DAD    D             ;POINT TO LOW ASCII
022D 7E          1126           MOV    A,M           ;<A> = LOW ASCII
022E 320000  E   1127           STA    BSTASC        ;SAVE AS BEST ASCII
0231 23          1128           INX    H             ;
0232 7E          1129           MOV    A,M           ;<A> = LOW SCORE
0233 320000  E   1130           STA    BSTSCR        ;SAVE AS BEST SCORE
0236 23          1131           INX    H             ;POINT TO NEXT ASCII
0237 23          1132           INX    H             ;POINT TO SEP
0238 23          1133           INX    H             ;POINT TO BURN LEVEL
0239 23          1134           INX    H             ;POINT TO ISOLATION
023A 23          1135           INX    H             ;POINT TO TAC
023B 7E          1136           MOV    A,M           ;
023C 320000  E   1137           STA    BSTTAC        ;SAVE AS BEST TAC
023F 23          1138           INX    H             ;POINT TO SAC
0240 7E          1139           MOV    A,M           ;<A> = SAC
0241 320000  E   1140           STA    BSTSAC        ;SAVE AS BEST SAC
0244 3A0000  E   1141           LDA    FNTNUM        ;<A> = CURRENT FONT NUMBER
```

```
0247 320000   E  1142          STA     BSTFNT       ;UPDATE NEW BEST FONT NUMBER
                 1143 ;
                 1144 ;ATTEMPT TO LOAD NEXT FONT
                 1145 ;
024A 3A0000   E  1146 TRYNXT:  LDA     FNTNUM       ;<A> = CURRENT FONT NUMBER
024D 3C          1147          INR     A            ;
024E 4F          1148          MOV     C,A          ;<C> = NEXT FONT NUMBER
024F 0600        1149          MVI     B,0          ;
0251 CD0000   E  1150          CALL    FONTLD       ;ATTEMPT TO LOAD NEXT FONT
0254 C0          1151          RNZ                  ;JUMP IF NO NEXT FONT FOUND
0255 CD0000   E  1152          CALL    RBINIT       ;INITIALIZE REC BUFFER
0258 210000   E  1153          LXI     H,RCVFST     ;POINT TO SCORE TABLE
025B 3A0000   E  1154          LDA     FNTNUM       ;
025E 5F          1155          MOV     E,A          ;
025F 1600        1156          MVI     D,0          ;<DE> = FONT NUMBER
0261 19          1157          DAD     D            ;POINT TO FONT SCORE
0262 7E          1158          MOV     A,M          ;<A> = SCORE
0263 3C          1159          INR     A            ;CHECK FOR ACTIVE
0264 C20000   E  1160          JNZ     RETCZ        ;RERUN WITH NEW FONT
0267 2A0A80      1161          LHLD    RECPTR       ;
026A 7B          1162          MOV     A,E          ;<A> = FONT NUMBER
026B 07          1163          RLC                  ;
026C 07          1164          RLC                  ;
026D 07          1165          RLC                  ;
026E 07          1166          RLC                  ;
026F 118087      1167          LXI     D,SYSFHB     ;
0272 83          1168          ADD     E            ;
0273 5F          1169          MOV     E,A          ;
0274 EB          1170          XCHG                 ;
0275 CD7B02   C  1171          CALL    FDMOVE       ;
0278 C34A02   C  1172          JMP     TRYNXT       ;CHECK FOR NEXT FONT
                 1173 $EJECT
                 1174 ;
                 1175 ;FONT DATA MOVE
                 1176 ;FROM <DE> TO <HL>
                 1177 ;
027B 0604        1178 FDMOVE:  MVI     B,4          ;
                 1179 FDLOOP:  REPT    4            ;
    -            1180          LDAX    D            ;
    -            1181          MOV     M,A          ;
    -            1182          INX     H            ;
    -            1183          INX     D            ;
                 1184          ENDM                 ;
028D 05          1201          DCR     B            ;
028E C27D02   C  1202          JNZ     FDLOOP       ;
0291 C9          1203          RET                  ;
                 1204 $EJECT
                 1205 ;
                 1206 ;INITIALIZE FOR FONT SELECT
                 1207 ;
0292 3A0000   E  1208 RECFSL:  LDA     SYSOPT       ;
0295 0F          1209          RRC                  ;
0296 D2C402   C  1210          JNC     RCI201       ;JUMP IF 201
0299 3A0000   E  1211          LDA     FNTCNT       ;
029C 3D          1212          DCR     A            ;
029D CAC402   C  1213          JZ      RCI201       ;JUMP IF ONLY ONE FONT
02A0 AF          1214          XRA     A            ;<A> = 0
02A1 320000   E  1215          STA     RCVWBC       ;INIT AWAITING BUFFER COUNT
02A4 320000   E  1216          STA     RCVPFK       ; "   PRIMARY FONT KNOWN
02A7 320000   E  1217          STA     RCVDFN       ; "   DEFAULT FONT NUMBER
02AA 320000   E  1218          STA     FSRMCC       ; "   MARGINAL CHARACTER COUNT
02AD 320000   E  1219          STA     FSRSCC       ; "   SCORED CHARACTERS COUNT
02B0 210000   E  1220          LXI     H,RCVFST     ;<DE> = FONT SCORE TABLE
                 1221 FSLINI:  REPT    8            ;
    -            1222          MOV     M,A          ;INITIALIZE FONT SCORE
    -            1223          INX     H            ;
                 1224          ENDM                 ;
02C3 C9          1241          RET                  ;
```

```
02C4 3EFF           1242 RCI201: MVI   A,0FFH          ;
02C6 320000  E      1243         STA   RCVPFK          ;
02C9 210000  E      1244         LXI   H,FNTIST        ;
02CC 110000  E      1245         LXI   D,FSEPHB        ;
02CF 0608           1246         MVI   B,8             ;
02D1 7E             1247 RCI2LP: MOV   A,M             ;
02D2 12             1248         STAX  D               ;INITIALIZE ISO PARAMETER TABLE
02D3 23             1249         INX   H               ;
02D4 13             1250         INX   D               ;
02D5 05             1251         DCR   B               ;
02D6 C2D102  C      1252         JNZ   RCI2LP          ;
02D9 210A00  E      1253         LXI   H,FRAHDR+0AH    ;
02DC 5E             1254         MOV   E,M             ;
02DD 23             1255         INX   H               ;
02DE 56             1256         MOV   D,M             ;
02DF EB             1257         XCHG                  ;
02E0 220000  E      1258         SHLD  FCPPTB          ;INITIALIZE CPP TABLE
02E3 C9             1259         RET                   ;
                    1260 $EJECT
                    1261 ;
                    1262 ;PURGE BUFFERS AWAITING FONT SELECT
                    1263 ;<C> = FONT NUMBER
                    1264 ;
02E4 210089         1265 PRGAFS: LXI   H,SYSCHB        ;
02E7 060C           1266         MVI   B,SYSCHC        ;
02E9 79             1267         MOV   A,C             ;
02EA B7             1268         ORA   A               ;
02EB CA1303  C      1269         JZ    SFONT0          ;JUMP TO SELECT FONT ZERO
02EE 07             1270         RLC                   ;
02EF 07             1271         RLC                   ;
02F0 07             1272         RLC                   ;
02F1 07             1273         RLC                   ;
02F2 4F             1274         MOV   C,A             ;
02F3 7E             1275 PGLOOP: MOV   A,M             ;
02F4 E610           1276         ANI   RECAFS          ;
02F6 CA0A03  C      1277         JZ    CNTPRG          ;JUMP IF NOT AWAITING FONT SELECT
02F9 C5             1278         PUSH  B               ;
02FA E5             1279         PUSH  H               ;SAVE <HL>
02FB 7D             1280         MOV   A,L             ;
02FC 81             1281         ADD   C               ;
02FD 5F             1282         MOV   E,A             ;
02FE 54             1283         MOV   D,H             ;<DE> = SELECTED FONT STATUS LINE
02FF CD7802  C      1284         CALL  FDMOVE          ;
0302 E1             1285         POP   H               ;RESTORE BUFFER STATUS POINTER
0303 C1             1286         POP   B               ;
0304 3E2F           1287         MVI   A,00101111B     ;
0306 A6             1288         ANA   M               ;
0307 F640           1289         ORI   RECSWP          ;
0309 77             1290         MOV   M,A             ;
030A 118000         1291 CNTPRG: LXI   D,SYSCHL        ;
030D 19             1292         DAD   D               ;
030E 05             1293         DCR   B               ;
030F C2F302  C      1294         JNZ   PGLOOP          ;
0312 C9             1295         RET                   ;
0313 118000         1296 SFONT0: LXI   D,SYSCHL        ;
0316 7E             1297 SF0LOP: MOV   A,M             ;<A> = STATUS
0317 E610           1298         ANI   RECAFS          ;
0319 CA2203  C      1299         JZ    NOTAFS          ;
031C 3E2F           1300         MVI   A,00101111B     ;
031E A6             1301         ANA   M               ;
031F F640           1302         ORI   RECSWP          ;
0321 77             1303         MOV   M,A             ;
0322 19             1304 NOTAFS: DAD   D               ;
0323 05             1305         DCR   B               ;
0324 C21603  C      1306         JNZ   SF0LOP          ;
                    1307         END
```

ASSEMBLY COMPLETE, NO ERRORS

02/14/83-DESTREADER ISOLATION CARD SOFTWARE - DEFINITION MODULE

```
LOC  OBJ           LINE     SOURCE STATEMENT

1 $NOLIST
                    796 $LIST
                    797 $TITLE ('RECOGNITION UTILITY MODULE')
                    798
                    799 ;                ***********
                    800 ;                *         *
                    801 ;                * RECUTL  *
                    802 ;                *         *
                    803 ;                ***********
                    804
                    805 ;
                    806 ;PUBLIC PROCEDURE DEFINITIONS
                    807 ;
                    808        PUBLIC   CHBSCH        ;CHARACTER BUFFER SEARCH
                    809        PUBLIC   RBINIT        ;INITIALIZE RECOGNITION BUFFER
                    810        PUBLIC   RECEOP        ;END OF PAGE PROCESSING
                    811        PUBLIC   BUFMOV        ;
                    812 ;
                    813 ;EXTERNAL PROCEDURE DECLARATIONS
                    814 ;
                    815        EXTRN    PRGAFS        ;
                    816 $EJECT
                    817        CSEG
                    818 ;
                    819 ;SEARCH RECOGNITION CHARACTER BUFFERS, STARTING WITH BUFFER AFTER HL,
                    820 ;FOR BUFFER WITH STATUS IN (C). RETURNS STATUS=0 IF FOUND, WITH
                    821 ;HL=>BUFFER.
                    822 ;
0000 118000         823 CHBSCH: LXI     D,SYSCHL      ;GET BUFFER SIZE
0003 060C           824        MVI      B,SYSCHC      ;GET # OF BUFFERS
0005 19             825 CHBSL1: DAD     D             ;ADVANCE TO NEXT BUFFER
0006 7C             826        MOV      A,H           ;END OF BUFFERS?
0007 FE8F           827        CPI      HIGH SYSCHE   ;
0009 C20F90    C    828        JNZ      CHBS02        ;NO, CONTINUE
000C 210089         829        LXI      H,SYSCHB      ;YES, WRAP AROUND
000F 7E             830 CHBS02: MOV     A,M           ;GET BUFFER STATUS
0010 E6C0           831        ANI      RECSMK        ;GET BUFFER STATE
0012 B9             832        CMP      C             ;TARGET STATE?
0013 C8             833        RZ                     ;YES, BUFFER FOUND
0014 05             834        DCR      B             ;NO, ANY LEFT TO TRY?
0015 C20500    C    835        JNZ      CHBSL1        ;YES, TRY NEXT BUFFER
0018 04             836        INR      B             ;NO, RETURN STATUS <> 0,
0019 C9             837        RET                    ;NO BUFFER FOUND
                    838 $EJECT
                    839 ;
                    840 ;INITIALIZE RECOGNITION BUFFER
                    841 ;
001A 2A0A80         842 RBINIT: LHLD    RECPTR        ;
001D 3EDF           843        MVI      A,NOT RECERR  ;
001F A6             844        ANA      M             ;
0020 77             845        MOV      M,A           ;
0021 110800         846        LXI      D,RECLCH      ;
0024 19             847        DAD      D             ;POINT TO LOW ASCII
0025 3E3F           848        MVI      A,'?'         ;
0027 77             849        MOV      M,A           ;SET LOW ASCII = '?'
0028 23             850        INX      H             ;
0029 36FF           851        MVI      M,0FFH        ;SET LOW SCORE = 0FFH
002B 23             852        INX      H             ;
002C 77             853        MOV      M,A           ;SET NEXT ASCII '?'
002D 23             854        INX      H             ;
002E AF             855        XRA      A             ;<A> = 0
002F 77             856        MOV      M,A           ;SET SEPARATION = 0
0030 23             857        INX      H             ;POINT TO ISO BYTE
0031 23             858        INX      H             ;POINT TO BURN LEVEL
```

```
0032 23          059         INX     H               ;POINT TO TAC
0033 3E02        860         MVI     A,02            ;
0035 77          861         MOV     M,A             ;SET TAC = 2
0036 23          862         INX     H               ;
0037 77          863         MOV     M,A             ;SET SAC = 2
0038 23          864         INX     H               ;POINT TO MASK ADDRESSES
0039 3EFF        865         MVI     A,0FFH          ;
003B 77          866         MOV     M,A             ;INITIALIZE MASK ADDRESSES
003C 23          867         INX     H               ;
003D 77          868         MOV     M,A             ;
003E 23          869         INX     H               ;
003F 77          870         MOV     M,A             ;
0040 23          871         INX     H               ;
0041 77          872         MOV     M,A             ;
0042 C9          873         RET                     ;
                 874 ;
                 875 ;END OF PAGE PROCESSING
                 876 ;
0043 AF          877 RECEOP: XRA     A               ;<A> = 0
0044 4F          878         MOV     C,A             ;
0045 CD0000 E    879         CALL    PRGAFS          ;PURGE REC BUFFERS OF CHARACTERS
                 880                                 ;AWAITING FONT SELECT
0048 C9          881         RET                     ;
                 882 $EJECT
                 883 ;
                 884 ;FOR MOVING A BUFFER
                 885 ;<HL> = SOURCE ADDRESS
                 886 ;<DE> = DESTINATION ADDRESS
                 887 ;
0049 0610        888 BUFMOV: MVI     B,16            ;
                 889 BMLOOP: REPT    8               ;
   -             890         MOV     A,M             ;
   -             891         STAX    D               ;
   -             892         INX     H               ;
   -             893         INX     D               ;
                 894         ENDM                    ;
006B 05          927         DCR     B               ;
006C C24B00 C    928         JNZ     BMLOOP          ;
006F C9          929         RET                     ;
                 930         END
```

ASSEMBLY COMPLETE,   NO ERRORS

ISIS-II 8080/8085 MACRO ASSEMBLER, V3.0        MODULE   PAGE   1
02/14/83-DESTREADER ISOLATION CARD SOFTWARE - DEFINITION MODULE

LOC  OBJ         LINE        SOURCE STATEMENT

1 $NOLIST
                 698 $LIST
                 699 $TITLE('RECOGNITION DATA BASE')
                 700 ;           ******************
                 701 ;           *                *
                 702 ;           *  RECOGNITION DATA  *
                 703 ;           *                *
                 704 ;           ******************
                 705 ;
                 706 ;ISOLATION DATA
                 707 ;
                 708         PUBLIC  FNTIST          ;ISOLATION SCRATCH TABLE
                 709         PUBLIC  FSEPHB          ;MAX HOR BLACK SEG ORIGIN POINT
                 710         PUBLIC  FSEPHW          ;MAX HOR WHITE SEG SIZE
                 711         PUBLIC  FSEPVW          ;MAX VER DROP FROM WORD TOP TO CHAR TOP
                 712         PUBLIC  FSEPVX          ;
                 713         PUBLIC  FSEPVN          ;
                 714         PUBLIC  FCPPTB          ;CONTEXTUAL POST PROCESSING TABLE
                 715 ;
                 716 ;FONT HARDWARE ADDRESS (FHA) DEFINITIONS
                 717 ;

```
718         PUBLIC  FHAORG          ;FONT ORIGIN
719         PUBLIC  FHATMA          ;TEST MASK ADDRESS
720         PUBLIC  FHAOTF          ;OFFSET TO FIRST.MASK
721 ;
722 ;FONT RAM ADDRESS (FRA) DEFINITIONS
723 ;
724         PUBLIC  FRAFOT          ;FONT ORIGIN TABLE
725         PUBLIC  FRAFTE          ;END OF FONT ORIGIN TABLE
726         PUBLIC  FRAHDR          ;HEADER TABLE ORIGIN
727         PUBLIC  FRASEG          ;SEGMENT TABLE ORIGIN
728 ;
729 ;FONT AND SEGMENT DEFINITIONS
730 ;
731         PUBLIC  FNTNUM          ;FONT NUMBER
732         PUBLIC  FNTCNT          ;NUMBER OF FONTS IN SYSTEM
733         PUBLIC  FNTSGC          ;NUMBER OF SEGMENTS IN FONT
734         PUBLIC  SEGPTR          ;CURRENT SEGMENT POINTER
735         PUBLIC  SEGMAS          ;MAXIMUM ALLOWABLE SCORE
736 ;
737 ;FONT SCRATCH DATA
738 ;
739         PUBLIC  FNTPTR          ;
740         PUBLIC  FNTSIZ          ;
741         PUBLIC  FNTCKS          ;
742         PUBLIC  FNTADR          ;
743 ;
744 ;RECOGNITION VARIABLES
745 ;
746         PUBLIC  RCVLOF          ;LOW OFFSET
747         PUBLIC  RCVCOF          ;CURRENT OFFSET
748         PUBLIC  RCVPOF          ;PREVIOUS OFFSET
749         PUBLIC  RCVNOF          ;NEXT OFFSET
750         PUBLIC  RCVBOF          ;BREAKPOINT OFFSET
751
752         PUBLIC  RCVFLS          ;FONT LOW SCORE
753         PUBLIC  RCVFLA          ;FONT LOW ASCII
754
755         PUBLIC  RCVCZN          ;CURRENT ZONE
756         PUBLIC  RCVLZN          ;LOW ZONE
757         PUBLIC  RCVZSP          ;ZONE SCORE POINTER
758
759         PUBLIC  RCVWBC          ;AWAITING BUFFER COUNT
760         PUBLIC  RCVPFK          ;PRIMARY FONT KNOWN
761         PUBLIC  RCVFST          ;FONT SCORE TABLES
762         PUBLIC  RCVDFN          ;DEFAULT FONT NUMBER
763
764         PUBLIC  RCVLSR          ;LOW SCORE REPORTED
765
766         PUBLIC  RCVSEP          ;SEPARATION REQUIREMENT
767         PUBLIC  RCVTHS          ;THRESHOLD REQUIREMENT
768
769         PUBLIC  RCVNML          ;NORMALIZER LEVEL
770
771         PUBLIC  FSRACC          ;FONT SEARCH ACCEPTANCE
772         PUBLIC  FSRMCC          ;FONT MARGINAL CHARACTER COUNT
773         PUBLIC  FSRSCC          ;FONT SCORING CHARACTER COUNT
774
775         PUBLIC  PPTADR          ;POST PROCESSING TABLE ADDRESS
776 ;
777 ;RECOGNITION VARIABLES
778 ;
779         PUBLIC  RLBYTE          ;LEFT COMPRESSED BYTE
780         PUBLIC  RCBYTE          ;CENTER COMPRESSED BYTE
781         PUBLIC  RRBYTE          ;RIGHT COMPRESSED BYTE
782         PUBLIC  RTBYTE          ;TOP COMPRESSED BYTE
783         PUBLIC  RTCBYT          ;TOP CENTER COMPRESSED BYTE
784         PUBLIC  RCBBYT          ;CENTER BOTTOM COMPRESSED BYTE
785         PUBLIC  RBBYTE          ;BOTTOM COMPRESSED BYTE
```

```
              786        PUBLIC   RLSHDW          ;
              787        PUBLIC   RRSHDW          ;
              788        PUBLIC   RHMARG          ;HORIZONTAL MARGIN
              789        PUBLIC   RVMARG          ;VERTICAL MARGIN
              790        PUBLIC   HMRCNT          ;HORZ MASK ROW COUNT
              791        PUBLIC   HMBCNT          ;HORZ MASK BLACK COUNT
              792        PUBLIC   HMMBLK          ;HORZ MASK MINIMUM BLACK
              793        PUBLIC   HMMBTP          ;TEMP
              794        PUBLIC   NSEFLG          ;NOISE FLAG
              795        PUBLIC   NSMODE          ;
              796        PUBLIC   VMMBLK          ;VERT MASK MINIMUM BLACK
              797        PUBLIC   RSHCNT          ;ROW SHIFT COUNT
              798        PUBLIC   HMBADR          ;HORIZONTAL MASK BUFFER ADDRESS
              799        PUBLIC   NSFBBS          ;NOISE FILTER BIT SAVER
              800        PUBLIC   HSHFTS          ;
              801        PUBLIC   VSHFTS          ;
              802        PUBLIC   RLPTST          ;REC LOOP TEST FLAG
              803 ;
              804 ;FONT SELECT VARIABLES
              805 ;
              806        PUBLIC   BSTFNT          ;
              807        PUBLIC   BSTTAC          ;
              808        PUBLIC   BSTSAC          ;
              809        PUBLIC   BSTASC          ;
              810        PUBLIC   BSTSCR          ;
              811 ;
              812 ;RETRY FLAGS
              813 ;
              814        PUBLIC   RTFBRN          ;
              815        PUBLIC   RTFGRW          ;
              816        PUBLIC   RTFCTR          ;
              817        PUBLIC   RTFSNF          ;
              818        PUBLIC   RTFLNF          ;
              819        PUBLIC   RTFUL0          ;
              820        PUBLIC   RTYCNT          ;RETRY COUNT
              821
              822        DSEG
              823 ;
              824 ;FONT HARDWARE ADDRESS (FHA) VARIABLES
              825 ;
 0000         826 FHAORG: DS     2                ;ORIGIN
 0002         827 FHATMA: DS     2                ;FIRST MASK ADDRESS
 0004         828 FHAOTF: DS     2                ;OFFSET TO FIRST MASK ADDRESS
              829 ;
              830 ;FONT RAM ADDRESS (FRA) VARIABLES
              831 ;
 0006         832 FRAFOT: DS     FNTMXF*2         ;FONT ORIGIN ADDRESS/4 TABLE
              833 FRAFTE:                         ;END OF REFTAB
 0016         834 FRAHDR: DS     32               ;HEADER TABLE ORIGIN
 0036         835 FRASEG: DS     3*16+1   ;SEGMENT TABLE ORIGIN
              836 ;
              837 ;FONT AND SEGMENT VARIABLES
              838 ;
 0067         839 FNTNUM: DS     1                ;FONT NUMBER
 0068         840 FNTCNT: DS     1                ;NUMBER OF FONTS IN SYSTEM
 0069         841 FNTSGC: DS     1                ;NUMBER OF SEGMENTS IN FONT
 006A         842 SEGPTR: DS     2                ;CURRENT SEGMENT POINTER
 006C         843 SEGMAS: DS     1                ;MAXIMUM ALLOWABLE SCORE
              844 ;
              845 ;FONT SCRATCH VARIABLES
              846 ;
 006D         847 FNTPTR: DS     2                ;=>CURRENT ENTRY IN FONT TABLE
 006F         848 FNTADR: DS     2                ;MASK ADDRESS/4 OF START OF CURRENT FONT
 0071         849 FNTSIZ: DS     2                ;SIZE/4 OF CURRENT FONT
 0073         850 FNTCKS: DS     2                ;CURRENT FONT CHECKSUM
              851 ;
              852 ;RECOGNITION VARIABLES
              853 ;
```

```
0075        854 RCVLOF: DS    2       ;LOW OFFSET
0077        855 RCVNOF: DS    2       ;NEXT OFFSET
0079        856 RCVCOF: DS    2       ;CURRENT OFFSET
007B        857 RCVPOF: DS    2       ;PREVIOUS OFFSET
007D        858 RCVBOF: DS    2       ;BREAKPOINT ADDRESS
007F        859 RCVCZN: DS    1       ;CURRENT ZONE
0080        860 RCVLZN: DS    1       ;LOW ZONE
0081        861 RCVFLS: DS    2       ;FONT LOW SCORE
0083        862 RCVFLA: DS    2       ;FONT LOW ASCII
0085        863 RCVZSP: DS    2       ;ZONE SCORE POINTER
0087        864 RCVWBC: DS    1       ;WAITING BUFFER COUNT
0088        865 RCVPFK: DS    1       ;PRIMARY FONT KNOWN
0089        866 RCVDFN: DS    1       ;DEFAULT FONT NUMBER
008A        867 RCVLSR: DS    1       ;LOW SCORE REPORTED
008B        868 RCVNML: DS    1       ;NORMALIZER LEVEL
008C        869 RCVTHS: DS    1       ;THRESHOLD REQUIREMENT
008D        870 RCVSEP: DS    1       ;SEPARATION REQUIREMENT
008E        871 FSRMCC: DS    1       ;FONT MARGINAL CHARACTER COUNT
008F        872 FSRSCC: DS    1       ;FONT SCORING CHARACTER COUNT
0090        873 FSRACC: DS    1       ;FONT SEARCH ACCEPTANCE
0091        874 PPTADR: DS    2       ;POST PROCESSING TABLE ADDRESS
            875 ;
            876 ;RECOGNITION RETRY FLAGS
            877 ;
0093        878 RTFBRN: DS    1       ;BURN
0094        879 RTFGRW: DS    1       ;REGROW
0095        880 RTFCTR: DS    1       ;RE-CENTER
0096        881 RTFSNF: DS    1       ;NOISE FILTER
0097        882 RTFLNF: DS    1       ;
0098        883 RTFUL0: DS    1       ;
0099        884 RTYCNT: DS    2       ;RETRY COUNT
            885 ;
            886 ;ISOLATION CONTROL TABLE
            887 ;
009B        888 FSEPHB: DS    1       ;MAX HOR BLACK SEG ORIGIN POINT
009C        889 FSEPHW: DS    1       ;MAX HOR WHITE SEG SIZE
009D        890 FSEPVW: DS    1       ;MIN VER UNDERLAYING WHITE SIZE
009E        891 FSEPVX: DS    1       ;MAX VER CHAR SIZE IF NO UNDERLAYMENT
009F        892 FSEPVN: DS    1       ;MIN VER CHAR SIZE IF NO UNDERLAYMENT
00A0        893 FSEPX1: DS    1       ;
00A1        894 FSEPX0: DS    1       ;
00A2        895 FNTIST: DS    8       ;SCRATCH TABLE
00AA        896 FCPPTB: DS    2       ;CONTEXTUAL POST PROCESSING FLAGS
            897 ;
            898 ;NOISE FILTER AND CENTERING DATA
            899 ;
00AC        900 RLBYTE: DS    1       ;
00AD        901 RCBYTE: DS    1       ;
00AE        902 RRBYTE: DS    1       ;
00AF        903 RTBYTE: DS    1       ;
00B0        904 RTCBYT: DS    1       ;
00B1        905 RCBBYT: DS    1       ;
00B2        906 RBBYTE: DS    1       ;
00B3        907 RLSHDW: DS    1       ;
00B4        908 RCSHDW: DS    1       ;
00B5        909 RRSHDW: DS    1       ;
00B6        910 RHMARG: DS    1       ;HORIZONTAL MARGIN
00B7        911 RVMARG: DS    1       ;VERTICAL MARGIN
00B8        912 HMRCNT: DS    1       ;
00B9        913 HMBCNT: DS    1       ;
00BA        914 HMMBLK: DS    1       ;MINIMUM BLACK IN A COMPRESSED MASK
00BB        915 HMMBTP: DS    1       ;
00BC        916 VMMBLK: DS    1       ;MINIMUM BLACK
00BD        917 NSEFLG: DS    1       ;NOISE FLAG
00BE        918 NSMODE: DS    1       ;
00BF        919 HMBADR: DS    2       ;
00C1        920 NSFB8S: DS    1       ;
```

```
00C2        921 RSHCNT: DS    1            ;SHIFT COUNTER
00C3        922 HSHFTS: DS    1            ;
00C4        923 VSHFTS: DS    1            ;
            924
00C5        925 RLFTST: DS    1            ;REC LOOP TEST FLAG
            926
00C6        927 BSTFNT: DS    1            ;
00C7        928 BSTASC: DS    1            ;
00C8        929 BSTSAC: DS    1            ;
00C9        930 BSTTAC: DS    1            ;
00CA        931 BSTSCR: DS    1            ;
            932
00CB        933 RCVFST: DS    8            ;FONT SCORE TABLES
            934         END

ASSEMBLY COMPLETE,  NO ERRORS
02/14/83-DESTREADER ISOLATION CARD SOFTWARE - DEFINITION MODULE

LOC  OBJ       LINE        SOURCE STATEMENT

1 $NOLIST
            796 $LIST
            797 $TITLE('RECOGNITION RETRY ROUTINES')
            798 ;
            799 ;               ********************
            800 ;               *                  *
            801 ;               *     RRETRY       *
            802 ;               *                  *
            803 ;               ********************
            804 ;
            805         PUBLIC  RECNTR       ;RE-CENTER
            806         PUBLIC  SNFLTR       ;SMALL NOISE FILTER
            807         PUBLIC  LNFLTR       ;LARGE NOISE FILTER
            808         PUBLIC  SWBURN       ;SOFTWARE BURN
            809         PUBLIC  SWGROW       ;SOFTWARE REGROW
            810         PUBLIC  UDLRT0       ;UNDERLINE LEVEL 0
            811 ;
            812 ;EXTERNAL PROCEDURE DECLARATIONS
            813 ;
            814         EXTRN   CENTER       ;
            815         EXTRN   NSDECT       ;
            816         EXTRN   RETCZ        ;
            817         EXTRN   RETCNZ       ;
            818         EXTRN   RETCP        ;
            819         EXTRN   BUFMOV       ;
            820 ;
            821 ;RECOGNITION RETRY FLAGS
            822 ;
            823         EXTRN   NSEFLG       ;
            824         EXTRN   RTFCTR       ;RE-CENTER
            825         EXTRN   RTFSNF       ;SMALL NOISE FILTER
            826         EXTRN   RTFLNF       ;LARGE NOISE FILTER
            827         EXTRN   RTFBRN       ;BURN
            828         EXTRN   RTFGRW       ;REGROW
            829         EXTRN   RTFUL0       ;UNDERLINE LEVEL 0
            830 ;
            831 ;RECOGNITION VARIABLES
            832 ;
            833         EXTRN   RCVFLA       ;FONT LOW ASCIIS
            834         EXTRN   RCVFLS       ;FONT LOW SCORES
            835         EXTRN   VMMBLK       ;VERTICAL MINIMUM BLACK COUNT
            836         EXTRN   HMMBLK       ;
            837         EXTRN   SEGMAS       ;SEGMENT SCORE THRESHOLD
            838         EXTRN   RCVNML       ;NORMALIZATION LEVEL
            839         EXTRN   RCVPFK       ;PRIMARY FONT KNOWN
            840         EXTRN   FNTNUM       ;FONT NUMBER
            841
            842         EXTRN   ITSROF       ;DEBUG FLAG
            843 $EJECT
```

```
                    844         CSEG
                    845 ;
                    846 ;ATTEMPT TO RE-REGISTER CHARACTER
                    847 ;
0000 3A0000  E      848 RECNTR: LDA     ITSROF      ;<A> = DEBUG FLAG
0003 E601           849         ANI     EFGCTR      ;ENABLE FLAG CENTER
0005 C20C00  C      850         JNZ     CNTROK      ;JUMP IF OK TO CENTER
0008 3E01           851         MVI     A,1         ;
000A B7             852         ORA     A           ;
000B C9             853         RET                 ;RETURN (CC.NZ,CC.P)
000C 3A0000  E      854 CNTROK: LDA     RTFCTR      ;<A> = RE-CENTER FLAG
000F B7             855         ORA     A           ;
0010 C0             856         RNZ                 ;RETURN IF ALREADY ATTEMPTED
0011 3E01           857         MVI     A,1         ;
0013 320000  E      858         STA     RTFCTR      ;SET FLAG
0016 CD0000  E      859         CALL    CENTER      ;ATTEMPT TO CENTER CHARACTER
0019 C9             860         RET                 ;RETURN (CC.M) IF BLANK
                    861 $EJECT
                    862 ;
                    863 ;ATTEMPT TO FILTER SMALL NOISE
                    864 ;
001A 3A0000  E      865 SNFLTR: LDA     ITSROF      ;<A> = DEBUG FLAG
001D E602           866         ANI     EFGSNF      ;ENABLE FLAG SMALL NOISE
001F C22600  C      867         JNZ     SNFLOK      ;JUMP IF OK TO FILTER
0022 3E01           868         MVI     A,1         ;
0024 B7             869         ORA     A           ;
0025 C9             870         RET                 ;RETURN (CC.NZ, CC.P)
0026 3A0000  E      871 SNFLOK: LDA     RTFSNF      ;<A> = SMALL NOISE FLAG
0029 B7             872         ORA     A           ;
002A C0             873         RNZ                 ;RETURN IF ALREADY ATTEMPTED
002B 3E01           874         MVI     A,1         ;
002D 320000  E      875         STA     RTFSNF      ;SET FLAG
0030 3E03           876         MVI     A,3         ;SET SMALL NOISE PARAMETER
0032 320000  E      877         STA     VMMBLK      ;
0035 320000  E      878         STA     HMMBLK      ;
0038 CD0000  E      879         CALL    NSDECT      ;
003B 3A0000  E      880         LDA     NSEFLG      ;
003E B7             881         ORA     A           ;
003F C0             882         RNZ                 ;RETURN (CC.NZ) IF NO FILTERING DONE
0040 CD0000  E      883         CALL    CENTER      ;RE-CENTER CHARACTER AFTER NOISE FILTERING
0043 F20000  E      884         JP      RETCZ       ;RETURN (CC.Z) IF FILTERING DONE
0046 C9             885         RET                 ;RETURN (CC.M) IF CHAR IS BLANK
                    886 $EJECT
                    887 ;
                    888 ;ATTEMPT TO FILTER LARGE NOISE
                    889 ;
0047 3A0000  E      890 LNFLTR: LDA     ITSROF      ;<A> = DEBUG FLAG
004A E604           891         ANI     EFGLNF      ;ENABLE FLAG LARGE NOISE FILTER
004C CA0000  E      892         JZ      RETCNZ      ;DO NOT FILTER IF SET
004F 3A0000  E      893         LDA     RTFLNF      ;<A> = LARGE NOISE FILTER FLAG
0052 B7             894         ORA     A           ;
0053 CA5B00  C      895         JZ      LNFFPS      ;JUMP IF ON FIRST PASS
0056 3D             896         DCR     A           ;CHECK FOR SECOND PASS
0057 CA8000  C      897         JZ      LNFAIL      ;JUMP IF SECOND PASS
005A C9             898         RET                 ;RETURN (CC.NZ) IF ALREADY ATTEMPTED
005B 3C             899 LNFFPS: INR     A           ;
005C 320000  E      900         STA     RTFLNF      ;SET FLAG FOR FIRST PASS
005F 3E06           901         MVI     A,6         ;
0061 320000  E      902         STA     VMMBLK      ;SET LARGE NOISE PARAMETER
0064 320000  E      903         STA     HMMBLK      ;
0067 2A0A80        904         LHLD    RECPTR      ;
006A 110088        905         LXI     D,SYSLHB    ;
006D CD0000  E      906         CALL    BUFMOV      ;SAVE LATEST BUFFER BEFORE FILTER
0070 CD0000  E      907         CALL    NSDECT      ;ATTEMPT TO FILTER NOISE
0073 3A0000  E      908         LDA     NSEFLG      ;
0076 B7             909         ORA     A           ;CHECK FOR ANY NOISE FILTERED
0077 C28000  C      910         JNZ     LNFAIL      ;JUMP IF NO NOISE DETECTED
007A CD0000  E      911 LNDETC: CALL    CENTER      ;CENTER FILTERED CHARACTER
007D F20000  E      912         JP      RETCZ       ;RUN RECOGNITION IF DID NOT ERASE CHARACTER
```

```
0080 3EFF           913 LNFAIL: MVI   A,0FFH          ;LARGE NOISE FAILED
0082 320000    E    914         STA   RTFLNF          ;SET END OF LARGE NOISE BURN
0085 2A0A80         915         LHLD  RECPTR          ;
0088 EB             916         XCHG                  ;
0089 210088         917         LXI   H,SYSLHB        ;
008C CD0000    E    918         CALL  BUFMOV          ;RESTORE LAST KNOWN BUFFER
008F C30000    E    919         JMP   RETCNZ          ;
                    920 $EJECT
                    921 ;
                    922 ;SOFTWARE BURN -
                    923 ;PASS I: REMOVE ONE BIT FROM BOTTOM AND ONE BIT FROM RIGHT
                    924 ;PASS II: REMOVE ONE BIT FROM TOP AND ONE BIT FROM LEFT
                    925 ;
0092 3A0000    E    926 SWBURN: LDA   ITSROF          ;<A> = DEBUG FLAG
0095 E608           927         ANI   EFGBRN          ;ENABLE FLAG BURN
0097 CA0000    E    928         JZ    RETCNZ          ;DO NOT BURN IF DEBUG FLAG IS OFF
009A 3A0000    E    929         LDA   RTFBRN          ;GET BURN RETRY FLAG
009D B7             930         ORA   A               ;FIRST ITERATION?
009E C0             931         RNZ                   ;RETURN IF BURN ALREADY ATTEMPTED
009F 2A0A80         932         LHLD  RECPTR          ;
00A2 110C00         933         LXI   D,RECBLI        ;
00A5 19             934         DAD   D               ;<HL> = RETRY LEVEL
00A6 7E             935         MOV   A,M             ;<A> = RETRY LEVEL
00A7 B7             936         ORA   A               ;
00A8 CAC400    C    937         JZ    BRNSAV          ;JUMP IF FIRST PASS
00AB F0             938         RP                    ;RETURN (CC.NZ) IF LEVEL > 0
00AC CD0F00    C    939         CALL  BRNCHK          ;CHECK IF RECOGNITION IMPROVED
00AF CAC400    C    940         JZ    BRNSAV          ;JUMP IF LAST BURN IMPROVED REC
00B2 3E01           941 BNFAIL: MVI   A,01            ;
00B4 320000    E    942         STA   RTFBRN          ;TURN OFF BURN
00B7 2A0A80         943         LHLD  RECPTR          ;
00BA 110088         944         LXI   D,SYSLHB        ;
00BD EB             945         XCHG                  ;
00BE CD0000    E    946         CALL  BUFMOV          ;RESTORE LAST KNOWN GOOD BUFFER
00C1 C30000    E    947         JMP   RETCNZ          ;RETURN (CC.NZ) IF BURN FAILED
                    948 ;
                    949 ;BURN CHARACTER
                    950 ;
00C4 2A0A80         951 BRNSAV: LHLD  RECPTR          ;
00C7 110088         952         LXI   D,SYSLHB        ;
00CA CD0000    E    953         CALL  BUFMOV          ;SAVE THE LATEST BUFFER
00CD 2A0A80         954         LHLD  RECPTR          ;
00D0 110C00         955         LXI   D,RECBLI        ;
00D3 EB             956         XCHG                  ;
00D4 19             957         DAD   D               ;<HL> = RETRY LEVEL
00D5 35             958         DCR   M               ;INCREMENT RETRY LEVEL
00D6 7E             959         MOV   A,M             ;
00D7 EB             960         XCHG                  ;<HL> = BUFFER
00D8 1F             961         RAR                   ;
00D9 DA3201    C    962         JC    BRNBAL          ;BURN BOTTOM AND LEFT
00DC C36D01    C    963         JMP   BRNTAR          ;BURN TOP AND RIGHT
                    964 $EJECT
                    965 ;
                    966 ;CHECK IF BURN RETRY IMPROVED RECOGNITION
                    967 ;LOW SCORE MUST IMPROVE
                    968 ;RETURNS CC.NZ IF FAILED
                    969 ;RETURNS CC.Z IF CONTINUE BURN
                    970 ;
00DF 2A0A80         971 BRNCHK: LHLD  RECPTR          ;
00E2 EB             972         XCHG                  ;
00E3 210E00         973         LXI   H,RECTAC        ;
00E6 19             974         DAD   D               ;
00E7 7E             975         MOV   A,M             ;<A> = NEW TAC
00E8 47             976         MOV   B,A             ;<B> = NEW TAC
00E9 FE02           977         CPI   2               ;
00EB DA0601    C    978         JC    BRNCK1          ;JUMP IF RECOGNIZABLE
00EE 3A0E88         979         LDA   SYSLHB+RECTAC   ;
00F1 FE02           980         CPI   2               ;
```

```
00F3 C0              981       RNZ                         ;RETURN FAIL IF NEW TAC = 2
                     982                                   ;AND OLD TAC < 2
00F4 3A0000   E      983       LDA    RCVNML               ;
00F7 B7              984       ORA    A                    ;
00F8 F20000   E      985       JP     RETCNZ               ;RETURN FAIL IF LIGHT PAGE
00FB FEF0            986       CPI    0FDH                 ;
00FD D20000   E      987       JNC    RETCNZ               ;RETURN FAIL IF NOT VERY DARK PAGE
0100 2B              988       DCX    H                    ;
0101 2B              989       DCX    H                    ;
0102 7E              990       MOV    A,M                  ;
0103 FEFF            991       CPI    0FFH                 ;
0105 C9              992       RET                         ;ALLOW SECOND BURN ON VERY DARK PAGE
                     993                                   ;RETURN FAIL IF NOT RECOGNIZABLE AFTER
                     994                                   ;TWO BURNS
0106 3A0988          995 BRNCK1: LDA  SYSLHB+RECLSC        ;<A> = OLD LOW SCORE
0109 210900          996       LXI    H,RECLSC             ;
010C 19              997       DAD    D                    ;POINT TO NEW LOW SCORE
010D BE              998       CMP    M                    ;
010E DA0000   E      999       JC     RETCNZ               ;RETURN FAIL IF OLD LOW < NEW LOW
0111 3A0E88         1000       LDA    SYSLHB+RECTAC        ;<A> = OLD TAC
0114 4F             1001       MOV    C,A                  ;
0115 FE01           1002       CPI    1                    ;
0117 D20000   E     1003       JNC    RETCZ                ;RETURN OK IF OLD TAC > 0
011A 3A0B88         1004       LDA    SYSLHB+RECLCH        ;<A> = OLD ASCII
011D 210800         1005       LXI    H,RECLCH             ;
0120 19             1006       DAD    D                    ;POINT TO NEW ASCII
0121 BE             1007       CMP    M                    ;
0122 C20000   E     1008       JNZ    RETCZ                ;RETURN FAIL IF ASCIIS ARE UNEQUAL
0125 3A0B88         1009       LDA    SYSLHB+RECNSC        ;<A> = OLD SEP
0128 23             1010       INX    H                    ;POINT TO LOW SCORE
0129 23             1011       INX    H                    ;POINT TO NEXT ASCII
012A 23             1012       INX    H                    ;POINT TO NEW SEP
012B BE             1013       CMP    M                    ;
012C DA0000   E     1014       JC     RETCZ                ;RETURN OK IF OLD SEP < NEW SEP
012F C30000   E     1015       JMP    RETCNZ               ;RETURN OK IF OLD SEP => NEW SEP
                    1016 $EJECT
                    1017 ;
                    1018 ;BURN ONE BIT OFF BOTTOM AND LEFT OF CHARACTER
                    1019 ;
0132 112000         1020 BRNBAL: LXI  D,RECCHB             ;
0135 19             1021       DAD    D                    ;<HL> = CHARACTER BUFFER
0136 54             1022       MOV    D,H                  ;
0137 5D             1023       MOV    E,L                  ;<DE> = CHARACTER BUFFER
0138 23             1024       INX    H                    ;
0139 23             1025       INX    H                    ;
013A 23             1026       INX    H                    ;<HL> = SECOND ROW
013B 061F           1027       MVI    B,31                 ;<B> = ROW COUNTER
013D 1A             1028 BRNTL1: LDAX D                    ;<A> = LEFT BYTE
013E B7             1029       ORA    A                    ;CLEAR CARRY
013F 4F             1030       MOV    C,A                  ;<C> = ORIGINAL BYTE
0140 1F             1031       RAR                         ;ROTATE RIGHT
0141 F5             1032       PUSH   PSW                  ;SAVE CARRY
0142 A6             1033       ANA    M                    ;AND WITH BYTE FROM BELOW
0143 A1             1034       ANA    C                    ;<A> = LEFT AND ROTATED AND BELOW
0144 12             1035       STAX   D                    ;UPDATE LEFT BYTE
0145 23             1036       INX    H                    ;
0146 13             1037       INX    D                    ;
0147 F1             1038       POP    PSW                  ;RESTORE CARRY
0148 1A             1039       LDAX   D                    ;<A> = CENTER BYTE
0149 4F             1040       MOV    C,A                  ;<C> = CENTER BYTE
014A 1F             1041       RAR                         ;ROTATE WITH CARRY
014B F5             1042       PUSH   PSW                  ;SAVE CARRY
014C A6             1043       ANA    M                    ;AND WITH BYTE FROM BELOW
014D A1             1044       ANA    C                    ;<A> = CENTER AND ROTATED AND BELOW
014E 12             1045       STAX   D                    ;UPDATE CENTER BYTE
014F 23             1046       INX    H                    ;
0150 13             1047       INX    D                    ;
0151 F1             1048       POP    PSW                  ;RESTORE CARRY
```

```
0152 1A          1049            LDAX    D               ;<A> = RIGHT BYTE
0153 4F          1050            MOV     C,A             ;<C> = RIGHT BYTE
0154 1F          1051            RAR                     ;ROTATE RIGHT
0155 A6          1052            ANA     M               ;AND WITH BYTE FROM BELOW
0156 A1          1053            ANA     C               ;<A> = RIGHT AND ROTATED AND BELOW
0157 12          1054            STAX    D               ;UPDATE RIGHT BYTE
0158 23          1055            INX     H               ;
0159 13          1056            INX     D               ;
015A 05          1057            DCR     B               ;
015B C23D01  C   1058            JNZ     BRNTL1          ;REPEAT FOR 31 ROWS
015E AF          1059            XRA     A               ;CLEAR BOTTOM LEFT BYTE
015F 12          1060            STAX    D               ;
0160 13          1061            INX     D               ;CLEAR BOTTOM CENTER BYTE
0161 12          1062            STAX    D               ;
0162 13          1063            INX     D               ;CLEAR BOTTOM RIGHT BYTE
0163 12          1064            STAX    D               ;
0164 CD0000  E   1065            CALL    CENTER          ;
0167 FAB200  C   1066            JM      BNFAIL          ;JUMP IF BURN ERASED CHARACTER
016A C30000  E   1067            JMP     RETCZ           ;
                 1068    $EJECT
                 1069    ;
                 1070    ;BURN ONE BIT OFF TOP AND RIGHT OF CHARACTER
                 1071    ;
016D 117F00      1072    BRNTAR: LXI     D,SYSCHL-1      ;
0170 19          1073            DAD     D               ;<HL> = ADDR OF END OF CHARACTER
0171 54          1074            MOV     D,H             ;
0172 5D          1075            MOV     E,L             ;<DE> = ADDR OF END OF CHARCTER
0173 2B          1076            DCX     H               ;
0174 2B          1077            DCX     H               ;
0175 2B          1078            DCX     H               ;<HL> = SECOND ROW FROM THE BOTTOM
0176 061F        1079            MVI     B,31            ;
0178 1A          1080    BRNLL1: LDAX    D               ;<A> = RIGHT BYTE
0179 B7          1081            ORA     A               ;CLEAR CARRY
017A 4F          1082            MOV     C,A             ;<C> = RIGHT BYTE
017B 17          1083            RAL                     ;ROTATE LEFT
017C F5          1084            PUSH    PSW             ;SAVE CARRY
017D A6          1085            ANA     M               ;
017E A1          1086            ANA     C               ;<A> = RIGHT AND ABOVE AND ROTATED
017F 12          1087            STAX    D               ;UPDATE RIGHT BYTE
0180 2B          1088            DCX     H               ;
0181 1B          1089            DCX     D               ;
0182 F1          1090            POP     PSW             ;RESTORE CARRY
0183 1A          1091            LDAX    D               ;<A> = CENTER BYTE
0184 4F          1092            MOV     C,A             ;<C> = CENTER BYTE
0185 17          1093            RAL                     ;ROTATE LEFT
0186 F5          1094            PUSH    PSW             ;SAVE CARRY
0187 A6          1095            ANA     M               ;
0188 A1          1096            ANA     C               ;<A> = CENTER AND ABOVE AND ROTATED
0189 12          1097            STAX    D               ;UPDATE CENTER BYTE
018A 2B          1098            DCX     H               ;
018B 1B          1099            DCX     D               ;
018C F1          1100            POP     PSW             ;RESTORE CARRY
018D 1A          1101            LDAX    D               ;<A> = LEFT BYTE
018E 4F          1102            MOV     C,A             ;<C> = LEFT BYTE
018F 17          1103            RAL                     ;ROTATE LEFT
0190 A6          1104            ANA     M               ;
0191 A1          1105            ANA     C               ;<A> = LEFT AND ROTATED AND ABOVE
0192 12          1106            STAX    D               ;UPDATE LEFT BYTE
0193 2B          1107            DCX     H               ;
0194 1B          1108            DCX     D               ;
0195 05          1109            DCR     B               ;REPEAT FOR 31 ROWS
0196 C27801  C   1110            JNZ     BRNLL1          ;
0199 AF          1111            XRA     A               ;<A> = 0
019A 12          1112            STAX    D               ;CLEAR TOP RIGHT BYTE
019B 1B          1113            DCX     D               ;
019C 12          1114            STAX    D               ;CLEAR TOP CENTER BYTE
019D 1B          1115            DCX     D               ;
019E 12          1116            STAX    D               ;CLEAR TOP LEFT BYTE
```

```
019F CD0000  E  1117          CALL   CENTER      ;
01A2 FAB200  C  1118          JM     BNFAIL      ;FAILED IF BURN ERASED CHARACTER
01A5 C30000  E  1119          JMP    RETCZ       ;
                1120 $EJECT
                1121 ;
                1122 ;SOFTWARE REGROW
                1123 ;
01A8 3A0000  E  1124 SWGROW:  LDA    ITSROF      ;<A> = DEBUG FLAG
01AB E620       1125          ANI    EFGRGW      ;ENABLE FLAG REGROW
01AD CA0000  E  1126          JZ     RETCNZ      ;DO NOT REGROW IF SET
01B0 3A0000  E  1127          LDA    RTFGRW      ;GET REGROW RETRY FLAG
01B3 B7         1128          ORA    A           ;FIRST ITERATION?
01B4 C0         1129          RNZ                ;RETURN (CC.NZ) IF REGROW ALREADY TRIED
01B5 2A0A80     1130          LHLD   RECPTR      ;
01B8 110C00     1131          LXI    D,RECBLI    ;
01BB 19         1132          DAD    D           ;<HL> = RETRY LEVEL
01BC 7E         1133          MOV    A,M         ;
01BD B7         1134          ORA    A           ;CHECK FOR RETRY LEVEL
01BE CAD901  C  1135          JZ     REGROW      ;
01C1 F8         1136          RM                 ;RETURN (CC.NZ) IF LEVEL < 0
01C2 CDF401  C  1137          CALL   GRWCHK      ;CHECK IF RECOGNITION IMPROVED
01C5 CAD901  C  1138          JZ     REGROW      ;JUMP IF LAST REGROW IMPROVED REC
01C8 2A0A80     1139 RGFAIL:  LHLD   RECPTR      ;
01CB 110088     1140          LXI    D,SYSLHB    ;
01CE EB         1141          XCHG               ;
01CF CD0000  E  1142          CALL   BUFMOV      ;RESTORE LAST KNOWN BUFFER
01D2 3E01       1143          MVI    A,1         ;
01D4 320000  E  1144          STA    RTFGRW      ;DISABLE REGRW
01D7 B7         1145          ORA    A           ;
01D8 C9         1146          RET                ;RETURN (CC.NZ) IF REGROW DONE
                1147 ;
                1148 ;ATTEMPT REGROW
                1149 ;
01D9 2A0A80     1150 REGROW:  LHLD   RECPTR      ;
01DC 110088     1151          LXI    D,SYSLHB    ;
01DF CD0000  E  1152          CALL   BUFMOV      ;SAVE THE LATEST BUFFER
01E2 2A0A80     1153          LHLD   RECPTR      ;
01E5 110C00     1154          LXI    D,RECBLI    ;
01E8 EB         1155          XCHG               ;
01E9 19         1156          DAD    D           ;
01EA 34         1157          INR    M           ;FLAG NEXT ITERATION IN PROGRESS
01EB 7E         1158          MOV    A,M         ;
01EC EB         1159          XCHG               ;
01ED 1F         1160          RAR                ;ROTATE RIGHT
01EE DA4502  C  1161          JC     RGWDAL      ;REGROW DOWN AND LEFT
01F1 C38302  C  1162          JMP    RGWUAR      ;REGROW UP AND RIGHT
                1163 $EJECT
                1164 ;
                1165 ;CHECK IF REGROW RETRY IMPROVED RECOGNITION
                1166 ;LOW SCORE MUST IMPROVE
                1167 ;RETURNS (CC.NZ) IF REGROW FAILED
                1168 ;RETURNS CC.Z FOR CONTINUE
                1169 ;
01F4 2A0A80     1170 GRWCHK:  LHLD   RECPTR      ;
01F7 EB         1171          XCHG               ;
01F8 210E00     1172          LXI    H,RECTAC    ;
01FB 19         1173          DAD    D           ;
01FC 7E         1174          MOV    A,M         ;<A> = NEW TAC
01FD 47         1175          MOV    B,A         ;
01FE FE02       1176          CPI    2           ;
0200 DA1802  C  1177          JC     GRWCK1      ;JUMP IF RECOGNIZABLE
0203 3A0E88     1178          LDA    SYSLHB+RECTAC ;<A> = OLD TAC
0206 FE02       1179          CPI    2           ;
0208 C0         1180          RNZ                ;RETURN FAIL IF OLD CHARACTER
                1181                             ;WAS RECOGNIZABLE
0209 3A0000  E  1182          LDA    RCVNML      ;
020C B7         1183          ORA    A           ;
020D FA0000  E  1184          JM     RETCNZ      ;RETURN FAIL IF ON DARK PAGE
0210 FE03       1185          CPI    3           ;
```

```
0212 DA0000  E  1186          JC    RETCNZ          ;RETURN FAIL IF NOT VERY LIGHT PAGE
0215 23         1187          DCX   H               ;POINT TO ISO BYTE
0216 2B         1188          DCX   H               ;POINT TO BURN LEVEL
0217 7E         1189          MOV   A,M             ;<A> = BURN LEVEL
0218 FE01       1190          CPI   1               ;
021A C9         1191          RET                   ;ALLOW SECOND REGROW ON VERY LIGHT PAGE
                1192                                ;RETURN FAIL IF NOT RECOGNIZABLE
                1193                                ;AFTER TWO REGROWS
021B 3A0988     1194 GRWCK1:  LDA   SYSLHB+RECLSC   ;<A> = OLD LOW SCORE
021E 210900     1195          LXI   H,RECLSC        ;
0221 19         1196          DAD   D               ;<HL> = ADDR OF NEW SCORE
0222 BE         1197          CMP   M               ;COMPARE
0223 DA0000  E  1198          JC    RETCNZ          ;RETURN FAIL IF OLD LOW < NEW LOW
0226 3A0E88     1199          LDA   SYSLHB+RECTAC   ;<A> = OLD TAC
0229 4F         1200          MOV   C,A             ;
022A FE01       1201          CPI   1               ;
022C D20000  E  1202          JNC   RETCZ           ;RETURN OK IF OLD TAC > 0
022F 3A0838     1203          LDA   SYSLHB+RECLCH   ;<A> = OLD ASCII
0232 210800     1204          LXI   H,RECLCH        ;
0235 19         1205          DAD   D               ;<HL> = ADDRESS OF NEW ASCII
0236 BE         1206          CMP   M               ;
0237 C0         1207          RNZ                   ;RETURN FAIL IF ASCII CHANGED
0238 3A0B88     1208          LDA   SYSLHB+RECNSC   ;<A> = OLD SEPARATION
023B 23         1209          INX   H               ;
023C 23         1210          INX   H               ;
023D 23         1211          INX   H               ;
023E BE         1212          CMP   M               ;
023F DA0000  E  1213          JC    RETCZ           ;RETURN OK IF OLD SEP < NEW SEP
0242 C30000  E  1214          JMP   RETCNZ          ;RETURN FAIL IF NEW SEP <= OLD SEP
                1215 $EJECT
                1216 ;
                1217 ;REGROW DOWN AND TO THE LEFT
                1218 ;
0245 117F00     1219 RGWDAL:  LXI   D,SYSCHL-1      ;
0248 19         1220          DAD   D               ;<HL> = LAST ROW OF CHARACTER
0249 54         1221          MOV   D,H             ;
024A 5D         1222          MOV   E,L             ;<DE> = LAST ROW OF CHARACTER
024B 2B         1223          DCX   H               ;
024C 2B         1224          DCX   H               ;
024D 2B         1225          DCX   H               ;<HL> = ONE ROW ABOVE <DE>
024E 061F       1226          MVI   B,31            ;DO FOR 31 ROWS
0250 1A         1227 RGDAL2:  LDAX  D               ;<A> = CHARACTER DATA
0251 4F         1228          MOV   C,A             ;<C> = RIGHT BYTE
0252 B7         1229          ORA   A               ;CLEAR CARRY
0253 17         1230          RAL                   ;ROTATE LEFT
0254 F5         1231          PUSH  PSW             ;SAVE CARRY
0255 B6         1232          ORA   M               ;OR WITH ABOVE BYTE
0256 B1         1233          ORA   C               ;OR WITH ORIGINAL BYTE
0257 12         1234          STAX  D               ;UPDATE RIGHT BYTE
0258 2B         1235          DCX   H               ;DECREMENT ABOVE ROW POINTER
0259 1B         1236          DCX   D               ;DECREMENT CURRENT ROW POINTER
025A F1         1237          POP   PSW             ;RESTORE CARRY
025B 1A         1238          LDAX  D               ;<A> = CHARACTER DATA
025C 4F         1239          MOV   C,A             ;<C> = CENTER BYTE
025D 17         1240          RAL                   ;ROTATE LEFT
025E F5         1241          PUSH  PSW             ;SAVE CARRY
025F B6         1242          ORA   M               ;OR WITH ABOVE BYTE
0260 B1         1243          ORA   C               ;OR WITH ORIGINAL BYTE
0261 12         1244          STAX  D               ;UPDATE CENTER BYTE
0262 2B         1245          DCX   H               ;
0263 1B         1246          DCX   D               ;
0264 F1         1247          POP   PSW             ;RESTORE CARRY
0265 1A         1248          LDAX  D               ;<A> = CHARACTER DATA
0266 4F         1249          MOV   C,A             ;<C> = LEFT BYTE
0267 17         1250          RAL                   ;ROTATE LEFT
0268 B6         1251          ORA   M               ;OR WITH ABOVE BYTE
0269 B1         1252          ORA   C               ;OR WITH ORIGINAL BYTE
026A 12         1253          STAX  D               ;UPDATE LEFT BYTE
026B 2B         1254          DCX   H               ;
```

```
026C 1B        1255        DCX     D
026D 05        1256        DCR     B           ;DECREMENT ROW COUNT
026E C25002 C  1257        JNZ     RGDAL2      ;
0271 1A        1258        LDAX    D           ;<A> = TOP RIGHT BYTE
0272 B7        1259        ORA     A           ;CLEAR CARRY
0273 17        1260        RAL                 ;ROTATE LEFT
0274 12        1261        STAX    D           ;UPDATE BYTE
0275 1B        1262        DCX     D           ;
0276 1A        1263        LDAX    D           ;<A> = TOP CENTER BYTE
0277 17        1264        RAL                 ;ROTATE LEFT
0278 12        1265        STAX    D           ;UPDATE BYTE
0279 1B        1266        DCX     D           ;
027A 1A        1267        LDAX    D           ;<A> = TOP LEFT BYTE
027B 17        1268        RAL                 ;ROTATE LEFT
027C 12        1269        STAX    D           ;
027D CD0000 E  1270        CALL    CENTER      ;
0280 C30000 E  1271        JMP     RETCZ       ;
               1272 $EJECT
               1273 ;
               1274 ;REGROW UP AND TO THE RIGHT
               1275 ;
0283 112000    1276 RGWUAR: LXI    D,RECCHB    ;
0286 19        1277        DAD     D           ;<HL> = FIRST ROW OF CHARACTER
0287 54        1278        MOV     D,H         ;
0288 5D        1279        MOV     E,L         ;<DE> = FIRST ROW OF CHARACTER
0289 23        1280        INX     H           ;
028A 23        1281        INX     H           ;
028B 23        1282        INX     H           ;<HL> = ROW BELOW <DE>
028C 061F      1283        MVI     B,31        ;DO FOR 31 ROWS
028E 1A        1284 RGUAR2: LDAX   D           ;<A> = CHARACTER
028F 4F        1285        MOV     C,A         ;<C> = LEFT BYTE
0290 B7        1286        ORA     A           ;CLEAR CARRY
0291 1F        1287        RAR                 ;ROTATE RIGHT
0292 F5        1288        PUSH    PSW         ;
0293 B6        1289        ORA     M           ;OR WITH BELOW BYTE
0294 B1        1290        ORA     C           ;OR WITH ORIGINAL BYTE
0295 12        1291        STAX    D           ;UPDATE DATA IN BUFFER
0296 23        1292        INX     H           ;
0297 13        1293        INX     D           ;
0298 F1        1294        POP     PSW         ;RESTORE CARRY
0299 1A        1295        LDAX    D           ;<A> = CHARACTER DATA
029A 4F        1296        MOV     C,A         ;<C> = CENTER BYTE
029B 1F        1297        RAR                 ;ROTATE RIGHT
029C F5        1298        PUSH    PSW         ;SAVE CARRY
029D B6        1299        ORA     M           ;OR WITH BYTE FROM BELOW
029E B1        1300        ORA     C           ;OR WITH ORIGINAL BYTE
029F 12        1301        STAX    D           ;UPDATE CENTER BYTE
02A0 23        1302        INX     H           ;
02A1 13        1303        INX     D           ;
02A2 F1        1304        POP     PSW         ;RESTORE CARRY
02A3 1A        1305        LDAX    D           ;<A> = CHARACTER DATA
02A4 4F        1306        MOV     C,A         ;<C> = RIGHT BYTE
02A5 1F        1307        RAR                 ;ROTATE RIGHT
02A6 B6        1308        ORA     M           ;OR WITH BYTE FROM BELOW
02A7 B1        1309        ORA     C           ;OR WITH ORIGINAL BYTE
02A8 12        1310        STAX    D           ;UPDATE RIGHT BYTE
02A9 23        1311        INX     H           ;
02AA 13        1312        INX     D           ;
02AB 05        1313        DCR     B           ;DECREMENT ROW COUNTER
02AC C28E02 C  1314        JNZ     RGUAR2      ;
02AF 1A        1315        LDAX    D           ;<A> = BOTTOM LEFT BYTE
02B0 B7        1316        ORA     A           ;CLEAR CARRY
02B1 1F        1317        RAR                 ;ROTATE RIGHT
02B2 12        1318        STAX    D           ;UPDATE BYTE
02B3 13        1319        INX     D           ;
02B4 1A        1320        LDAX    D           ;<A> = BOTTOM CENTER BYTE
02B5 1F        1321        RAR                 ;ROTATE RIGHT
02B6 12        1322        STAX    D           ;UPDATE BYTE
02B7 13        1323        INX     D           ;
```

```
02B8 1A           1324          LDAX    D           ;<A> =-BOTTOM RIGHT BYTE
02B9 1F           1325          RAR                 ;ROTATE RIGHT
02BA 12           1326          STAX    D           ;UPDATE BYTE
02BB CD0000    E  1327          CALL    CENTER      ;
02BE C30000    E  1328          JMP     RETCZ       ;
                  1329 $EJECT
                  1330 ;
                  1331 ;UNDERLINE RECOGNITION
                  1332 ;
02C1 3A0000    E  1333 UDLRT0:  LDA     ITSROF      ;<A> = DEBUG FLAG
02C4 E610         1334          ANI     EFGUL0      ;ENABLE FLAG UNDERLINE 0
02C6 CA0000    E  1335          JZ      RETCNZ      ;DO NOT PERFORM RETRY IF FLAG IS SET
02C9 2A0A80       1336          LHLD    RECPTR      ;
02CC 7E           1337          MOV     A,M         ;
02CD E608         1338          ANI     08H         ;CHECK FOR UNDERLINE
02CF CA0000    E  1339          JZ      RETCNZ      ;RETURN IF NOT FLAGGED AS UNDERLINE
02D2 210000    E  1340          LXI     H,RTFUL0    ;
02D5 35           1341          DCR     M           ;
02D6 C2D002    C  1342          JNZ     UDL0X0      ;JUMP IF NOT END OF PROCESSING
02D9 34           1343          INR     M           ;
02DA C9           1344          RET                 ;RETURN (CC.NZ) IF DONE
02DB CD1303    C  1345 UDL0X0:  CALL    UDLCHK      ;CHECK
02DE 2A0A80       1346          LHLD    RECPTR      ;
02E1 110088       1347          LXI     D,SYSLHB    ;
02E4 CAF302    C  1348          JZ      ULD0X1      ;JUMP IF OK TO PROCEED

02E7 EB           1349          XCHG                ;
02E8 CD0000    E  1350          CALL    BUFMOV      ;RESTORE LAST KNOWN GOOD CHARACTER
02EB 3E01         1351          MVI     A,1         ;
02ED 320000    E  1352          STA     RTFUL0      ;SET END OF UNDERLINE PROCESSING
02F0 C30000    E  1353          JMP     RETCNZ      ;RETURN (CC.NZ) IF END OF PROCESSING
02F3 CD0000    E  1354 ULD0X1:  CALL    BUFMOV      ;SAVE CHAR AS LAST KNOWN GOOD
02F6 2A0A80       1355          LHLD    RECPTR      ;
02F9 117F00       1356          LXI     D,SYSCHL-1  ;
02FC 19           1357          DAD     D           ;POINT TO LAST BYTE
02FD 7E           1358 ULOLP0:  MOV     A,M         ;<A> = RIGHT BYTE
02FE 2B           1359          DCX     H           ;
02FF B6           1360          ORA     M           ;INCLUDE CENTER BYTE
0300 2B           1361          DCX     H           ;
0301 B6           1362          ORA     M           ;INCLUDE LEFT BYTE
0302 2B           1363          DCX     H           ;
0303 CAFD02    C  1364          JZ      UL0LP0      ;CHECK FOR BLACK
0306 AF           1365          XRA     A           ;<A> = 0
0307 23           1366          INX     H           ;
0308 77           1367          MOV     M,A         ;
0309 23           1368          INX     H           ;
030A 77           1369          MOV     M,A         ;
030B 23           1370          INX     H           ;
030C 77           1371          MOV     M,A         ;ERASE ROW
030D CD0000    E  1372          CALL    CENTER      ;
0310 C30000    E  1373          JMP     RETCZ       ;
                  1374 $EJECT
                  1375 ;
                  1376 ;CHECK IF OK TO PROCESS UNDERLINED CHARACTER
                  1377 ;CASE I: FIRST PASS THROUGH RETRY
                  1378 ;CASE II: RECOGNITION IMPROVED - NEW SEP >= OLD SEP AND
                  1379 ;         NEW SCORE <= OLD SCORE
                  1380 ;
0313 2A0A80       1381 UDLCHK:  LHLD    RECPTR      ;
0316 110E00       1382          LXI     D,RECTAC    ;
0319 EB           1383          XCHG                ;
031A 19           1384          DAD     D           ;<M> = TAC
031B 7E           1385          MOV     A,M         ;
031C FE02         1386          CPI     2           ;
031E C0           1387          RNZ                 ;RETURN (CC.NZ) IF TAC < 2
031F 3A0000    E  1388          LDA     RTFUL0      ;
0322 FE03         1389          CPI     3           ;CHECK FOR FIRST PASS
0324 C8           1390          RZ                  ;RETURN (CC.Z) IF FIRST PASS
0325 210900       1391          LXI     H,RECLSC    ;
```

```
0328 19            1392          DAD    D                 ;<M> = NEW LOW SCORE
0329 110988        1393          LXI    D,SYSLHB+RECLSC   ;<DE> = ADDR OF OLD LOW SCORE
032C 1A            1394          LDAX   D                 ;<A> = OLD LOW SCORE
032D BE            1395          CMP    M                 ;COMPARE
032E DA0000    E   1396          JC     RETCNZ            ;RETURN (CC.NZ) IF NEW SCORE > OLD SCORE
0331 EB            1397          XCHG                     ;
0332 23            1398          INX    H                 ;
0333 23            1399          INX    H                 ;<HL> = ADDR OF OLD SEP
0334 13            1400          INX    D                 ;
0335 13            1401          INX    D                 ;<DE> = ADDR OF NEW SEP
0336 1A            1402          LDAX   D                 ;<A> = NEW SEP
0337 BE            1403          CMP    M                 ;COMPARE
0338 DA0000    E   1404          JC     RETCNZ            ;RETURN (CC.NZ) IF OLD SEP > NEW SEP
033B AF            1405          XRA    A                 ;
033C C9            1406          RET                      ;RETURN (CC.Z) IF OK TO PROCESS
                   1407          END
```

ASSEMBLY COMPLETE,   NO ERRORS
02/14/83-DESTREADER ISOLATION CARD SOFTWARE - DEFINITION MODULE

```
LOC  OBJ           LINE         SOURCE STATEMENT

1 $NOLIST
                   698 $LIST
                   699          CSEG
                   700          PUBLIC CENTER
                   701          PUBLIC CRCSHD
                   702 ;
                   703 ;FOR CENTERING A CHARACTER WITHIN THE RECOGNITION BUFFER
                   704 ;
                   705          EXTRN  RETCNZ            ;
                   706
                   707          EXTRN  RRBYTE            ;RIGHT BYTE MASK
                   708          EXTRN  RCBYTE            ;CENTER BYTE MASK
                   709          EXTRN  RLBYTE            ;LEFT BYTE MASK
                   710          EXTRN  RTBYTE            ;TOP EIGHT ROWS' MASK
                   711          EXTRN  RTCBYT            ;2ND EIGHT ROWS' MASK
                   712          EXTRN  RCBBYT            ;3RD EIGHT ROWS' MASK
                   713          EXTRN  RBBYTE            ;BOTTOM EIGHT ROWS' MASK
                   714
                   715          EXTRN  RSHCNT            ;ROW COUNTER
                   716          EXTRN  RHMARG            ;HORIZONTAL MARGIN
                   717          EXTRN  RVMARG            ;VERTICAL MARGIN
                   718          EXTRN  HSHFTS            ;HORIZONTAL SHIFTS
                   719          EXTRN  VSHFTS            ;VERTICAL SHIFTS
                   720 $EJECT
                   721 ;
                   722 ;CREATE HORIZONTAL AND VERITCAL MASKS OF CHARACTER
                   723 ;
0000 CDE701    C   724 CENTER: CALL   CRCSHD             ;
0003 210000    E   725          LXI    H,RLBYTE          ;
0006 46            726          MOV    B,M               ;<B> = LEFT MASK
0007 23            727          INX    H                 ;
0008 4E            728          MOV    C,M               ;<C> = CENTER MASK
0009 23            729          INX    H                 ;
000A 56            730          MOV    D,M               ;<D> = RIGHT MASK
000B 78            731          MOV    A,B               ;
000C B1            732          ORA    C                 ;
000D B2            733          ORA    D                 ;
000E C21500    C   734          JNZ    FINDMG            ;
                   735 ;
                   736 ;RETURN BLANK FIELD INDICATION
                   737 ;
0011 3EFF          738          MVI    A,0FFH            ;
0013 B7            739          ORA    A                 ;
0014 C9            740          RET                      ;RETURN (CC.NZ, CC.M) IF BLANK
                   741 $EJECT
                   742 ;
```

```
                    743 ;FIND RIGHT MARGIN
                    744 ;
0015 2600           745 FINDMG: MVI    H,0              ;<H> = NUMBER OF SHIFTS TILL BLACK
0017 7A             746         MOV    A,D              ;<A> = RIGHT MASK
0018 CD3302  C      747         CALL   RSHIFT           ;
001B C22900  C      748         JNZ    RFND             ;
001E 79             749         MOV    A,C              ;<A> = CENTER MASK
001F CD3302  C      750         CALL   RSHIFT           ;
0022 C22900  C      751         JNZ    RFND             ;
0025 78             752         MOV    A,B              ;<A> = LEFT MASK
0026 CD3302  C      753         CALL   RSHIFT           ;
0029 7C             754 RFND:   MOV    A,H              ;0 <= RIGHT MARGIN <= 23
002A 320000  E      755         STA    RHMARG           ;
                    756 ;
                    757 ;FIND LEFT MARGIN
                    758 ;
002D 2600           759         MVI    H,0              ;NUMBER OF SHIFTS TILL BLACK
002F 78             760         MOV    A,B              ;<A> = LEFT MASK
0030 CD5D02  C      761         CALL   LSHIFT           ;
0033 C24100  C      762         JNZ    LFND             ;
0036 79             763         MOV    A,C              ;<A> = CENTER MASK
0037 CD5D02  C      764         CALL   LSHIFT           ;
003A C24100  C      765         JNZ    LFND             ;
003D 7A             766         MOV    A,D              ;<A> = RIGHT MASK
003E CD5D02  C      767         CALL   LSHIFT           ;
0041 3A0000  E      768 LFND:   LDA    RHMARG           ;
0044 47             769         MOV    B,A              ;
0045 94             770         SUB    H                ;<A> = RIGHT MARGIN - LEFT MARGIN
0046 320000  E      771         STA    HSHFTS           ;SAVE DELTA
0049 78             772         MOV    A,B              ;
004A 84             773         ADD    H                ;
004B 320000  E      774         STA    RHMARG           ;SAVE TOTAL MARGINS
                    775 ;
                    776 ;FIND BOTTOM MARGIN
                    777 ;
004E 2600           778 CHKVRT: MVI    H,0              ;
0050 3A0000  E      779         LDA    RBBYTE           ;<A> = BOTTOM MASK
0053 CD3302  C      780         CALL   RSHIFT           ;
0056 C27100  C      781         JNZ    BFND             ;
0059 3A0000  E      782         LDA    RCBBYT           ;<A> = CENTER BOTTOM MASK
005C CD3302  C      783         CALL   RSHIFT           ;
005F C27100  C      784         JNZ    BFND             ;
0062 3A0000  E      785         LDA    RTCBYT           ;<A> = TOP CENTER MASK
0065 CD3302  C      786         CALL   RSHIFT           ;
0068 C27100  C      787         JNZ    BFND             ;
006B 3A0000  E      788         LDA    RTBYTE           ;<A> = TOP MASK
006E CD3302  C      789         CALL   RSHIFT           ;

0071 7C             790 BFND:   MOV    A,H              ;
0072 320000  E      791         STA    RVMARG           ;0 <= BOTTOM MARGIN <= 31
                    792 ;
                    793 ;FIND TOP MARGIN
                    794 ;
0075 2600           795         MVI    H,0              ;
0077 3A0000  E      796         LDA    RTBYTE           ;<A> = TOP MASK
007A CD5D02  C      797         CALL   LSHIFT           ;
007D C29800  C      798         JNZ    TFND             ;
0080 3A0000  E      799         LDA    RTCBYT           ;<A> = TOP CENTER MASK
0083 CD5D02  C      800         CALL   LSHIFT           ;
0086 C29800  C      801         JNZ    TFND             ;
0089 3A0000  E      802         LDA    RCBBYT           ;<A> = CENTER BOTTOM MASK
008C CD5D02  C      803         CALL   LSHIFT           ;
008F C29800  C      804         JNZ    TFND             ;
0092 3A0000  E      805         LDA    RBBYTE           ;<A> = BOTTOM MASK
0095 CD5D02  C      806         CALL   LSHIFT           ;
0098 3A0000  E      807 TFND:   LDA    RVMARG           ;
009B 47             808         MOV    B,A              ;
009C 94             809         SUB    H                ;<A> = BOTTOM MARGIN - TOP MARGIN
```

```
009D 320000   E   810            STA    VSHFTS        ;SAVE DELTA
00A0 78           811            MOV    A,B           ;
00A1 84           812            ADD    H             ;
00A2 320000   E   813            STA    RVMARG        ;SAVE TOTAL MARGIN
                  814  $EJECT
                  815  ;
                  816  ;ADJUST HORIZONTAL VARIABLES
                  817  ;
00A5 2A0A80       818            LHLD   RECPTR        ;POINT TO BUFFER
00A8 23           819            INX    H             ;
00A9 5E           820            MOV    E,M           ;
00AA 23           821            INX    H             ;
00AB 56           822            MOV    D,M           ;<DE> = HORIZONTAL OFFSET
00AC 23           823            INX    H             ;
00AD 3A0000   E   824            LDA    RHMARG        ;<B> = HORIZONTAL MARGINS
00B0 47           825            MOV    B,A           ;<A> = BUFFER WIDTH
00B1 3E18         826            MVI    A,24          ;<A> = CHARACTER WIDTH
00B3 90           827            SUB    B             ;<B> = NEW WIDTH
00B4 47           828            MOV    B,A           ;<A> = OLD WIDTH
00B5 7E           829            MOV    A,M           ;SET NEW WIDTH
00B6 70           830            MOV    M,B           ;<A> = OLD WIDTH - NEW WIDTH
00B7 90           831            SUB    B             ;<C> = DELTA WIDTH
00B8 4F           832            MOV    C,A           ;
00B9 0600         833            MVI    B,0           ;<A> = DELTA MARGINS
00BB 3A0000   E   834            LDA    HSHFTS        ;
00BE B7           835            ORA    A             ;JUMP IF DELTA > 0
00BF F2C500   C   836            JP     ADJ001        ;
00C2 2F           837            CMA                  ;<A> = ABSOLUTE VALUE OF DELTA MARGINS
00C3 3C           838            INR    A             ;<B> = DELTA MARGINS
00C4 47           839            MMOV   B,A           
00C5 E5           840  ADJ001:   PUSH   H             ;SAVE ADDRESS
00C6 6F           841            MOV    L,A           ;<L> = DELTA MARGIN
00C7 79           842            MOV    A,C           ;<A> = DELTA WIDTH
00C8 95           843            SUB    L             ;SUBTRACT DELTA MARGIN
00C9 37           844            STC                  ;
00CA FACE00   C   845            JM     ADJ002        ;
00CD 3F           846            CMC                  ;DIVIDE BY 2
00CE 1F           847  ADJ002:   RAR                  ;ADD 0 IF DELTA MARGIN >= 0
00CF 80           848            ADD    B             ;ADD DELTA MARGIN IF DELTA MARGIN < 0
                  849
00D0 4F           850            MOV    C,A           ;
00D1 0600         851            MVI    B,0           ;
00D3 F2D800   C   852            JP     ADJ003        ;JUMP IF POSITIVE
00D6 06FF         853            MVI    B,0FFH        ;
00D8 E1           854  ADJ003:   POP    H             ;RESTORE ADDRESS
00D9 EB           855            XCHG                 ;
00DA 09           856            DAD    B             ;ADD TO OFFSET
00DB EB           857            XCHG                 ;
00DC 2B           858            DCX    H             ;
00DD 72           859            MOV    M,D           ;
00DE 2B           860            DCX    H             ;
00DF 73           861            MOV    M,E           ;SET NEW HORIZONTAL OFFSET
00E0 23           862            INX    H             ;
00E1 23           863            INX    H             ;
00E2 23           864            INX    H             ;
00E3 23           865            INX    H             ;
00E4 23           866            INX    H             ;
                  867  $EJECT
                  868  ;
                  869  ;ADJUST VERTICAL VARIABLES
                  870  ;
00E5 5E           871            MOV    E,M           ;<E> = VERTICAL DROP
00E6 23           872            INX    H             ;POINT TO HEIGHT
00E7 3A0000   E   873            LDA    RVMARG        ;
00EA 47           874            MOV    B,A           ;<B> = VERTICAL MARGIN
00EB 3E20         875            MVI    A,32          ;
00ED 90           876            SUB    B             ;<A> = HEIGHT
00EE 47           877            MOV    B,A           ;<B> = NEW HEIGHT
00EF 7E           878            MOV    A,M           ;<A> = OLD HEIGHT
```

```
00F0 70              879         MOV     M,B                 ;SET NEW HEIGHT
00F1 90              880         SUB     B                   ;<A> = DELTA HEIGHT
00F2 4F              881         MOV     C,A                 ;<C> = DELTA HEIGHT
00F3 0600            882         MVI     B,0                 ;
00F5 3A0000    E     883         LDA     VSHFTS              ;<A> = DELTA MARGIN
00F8 B7              884         ORA     A                   ;
00F9 F2FF00    C     885         JP      ADJ004              ;JUMP IF POSITIVE
00FC 2F              886         CMA                         ;
00FD 3C              887         INR     A                   ;
00FE 47              888         MOV     B,A                 ;<B> = ABSOLUTE VALUE OF DELTA
00FF E5              889 ADJ004: PUSH    H                   ;SAVE ADDRESS
0100 6F              890         MOV     L,A                 ;<L> = DELTA MARGIN
0101 79              891         MOV     A,C                 ;<A> = DELTA HEIGHT
0102 95              892         SUB     L                   ;SUBTRACT DELTA MARGIN
0103 37              893         STC                         ;
0104 FA0801    C     894         JM      ADJ005              ;
0107 3F              895         CMC                         ;
0108 1F              896 ADJ005: RAR                         ;DIVIDE BY 2
0109 80              897         ADD     B                   ;ADD 0 IF DELTA MARGIN >= 0
                     898                                     ;ADD DELTA MARGIN IF DELTA MARGIN < 0
010A E1              899         POP     H                   ;RESTORE ADDRESS
010B 2B              900         DCX     H                   ;POINT TO DROP
010C 86              901         ADD     M                   ;ADD DROP
010D F21F01    C     902         JP      ADJ006              ;JUMP IF NEW DROP >= 0
0110 4F              903         MOV     C,A                 ;<BC> = -DROP
0111 06FF            904         MVI     B,0FFH              ;DROP = 0
0113 2B              905         DCX     H                   ;
0114 56              906         MOV     D,M                 ;
0115 2B              907         DCX     H                   ;<DE> = OFFSET
0116 5E              908         MOV     E,M                 ;
0117 EB              909         XCHG                        ;
0118 09              910         DAD     B                   ;ADD 0 IF DROP >= 0
                     911                                     ;ADD -DROP IF DROP < 0
0119 EB              912         XCHG                        ;
011A 73              913         MOV     M,E                 ;
011B 23              914         INX     H                   ;
011C 72              915         MOV     M,D                 ;UPDATE OFFSET
011D 23              916         INX     H                   ;POINT TO DROP
011E AF              917         XRA     A                   ;SET DROP = 0
011F 77              918 ADJ006: MOV     M,A                 ;UPDATE DROP
                     919 $EJECT
                     920 ;
                     921 ;CHECK IF ALREADY CENTERED
                     922 ;
0120 3A0000    E     923         LDA     VSHFTS              ;<A> = VERTICAL DELTA
0123 B7              924         ORA     A                   ;
0124 F22801    C     925         JP      CHK001              ;
0127 37              926         STC                         ;
0128 1F              927 CHK001: RAR                         ;DIVIDE BY 2
0129 320000    E     928         STA     VSHFTS              ;SAVE SHIFT COUNT
012C 4F              929         MOV     C,A                 ;
012D 3A0000    E     930         LDA     HSHFTS              ;<A> = HORIZONTAL DELTA
0130 B7              931         ORA     A                   ;
0131 F23501    C     932         JP      CHK002              ;
0134 37              933         STC                         ;
0135 1F              934 CHK002: RAR                         ;DIVIDE BY 2
0136 320000    E     935         STA     HSHFTS              ;SAVE SHIFT COUNT
0139 B1              936         ORA     C                   ;
013A C24101    C     937         JNZ     ADJUST              ;JUMP IF NOT CENTERED
013D 3E01            938         MVI     A,1                 ;
013F B7              939         ORA     A                   ;
0140 C9              940         RET                         ;RETURN (CC.NZ, CC.P) IF ALREADY CENTERED
                     941 $EJECT
                     942 ;
                     943 ;CENTER THE CHARACTER FIELD
                     944 ;
0141 79              945 ADJUST: MOV     A,C                 ;<A> = VERTICAL SHIFTS
0142 B7              946         ORA     A                   ;
```

```
0143 CA9301  C  947        JZ    HORIZ       ;
0146 2A0A80     948        LHLD  RECPTR      ;
0149 F27101  C  949        JP    DOWN        ;
014C 112000     950 UP:    LXI   D,RECCHB    ;
014F 19         951        DAD   D           ;<HL> = START OF BUFFER
0150 2F         952        CMA               ;
0151 3C         953        INR   A           ;<A> IS NOW POSITIVE
0152 5F         954        MOV   E,A         ;
0153 07         955        RLC               ;MULTIPLY BY 2
0154 83         956        ADD   E           ;MULTIPLY BY 3
0155 5F         957        MOV   E,A         ;
0156 47         958        MOV   B,A         ;<B> = NUMBER OF BYTES TO FILL
0157 1600       959        MVI   D,0         ;<DE> = OFFSET
0159 EB         960        XCHG              ;
015A 19         961        DAD   D           ;<DE> = START OF BUFFER
                962                          ;<HL> = START OF NEW DATA
015B 3E60       963        MVI   A,96        ;
015D 90         964        SUB   B           ;
015E 4F         965        MOV   C,A         ;<C> = NUMBER OF BYTES TO SHIFT
015F 7E         966 ULOOP: MOV   A,M         ;
0160 12         967        STAX  D           ;
0161 23         968        INX   H           ;
0162 13         969        INX   D           ;
0163 0D         970        DCR   C           ;
0164 C25F01  C  971        JNZ   ULOOP       ;
0167 AF         972        XRA   A           ;
0168 12         973 UFILL: STAX  D           ;FILL IN WHITE BOTTOM
0169 13         974        INX   D           ;
016A 05         975        DCR   B           ;
016B C26801  C  976        JNZ   UFILL       ;
016E C39301  C  977        JMP   HORIZ       ;
                978 ;
                979 ;SHIFT DOWN
                980 ;
0171 117F00     981 DOWN:  LXI   D,7FH       ;
0174 19         982        DAD   D           ;<HL> = END OF BUFFER
0175 5F         983        MOV   E,A         ;<E> = NUMBER OF ROWS TO SHIFT
0176 07         984        RLC               ;MULTIPLY BY 2
0177 83         985        ADD   E           ;MULTIPLY BY THREE
0178 47         986        MOV   B,A         ;<B> = NUMBER OF BYTES TO FILL
0179 2F         987        CMA               ;
017A 3C         988        INR   A           ;<A> = - 3 X NUMBER OF ROWS TO SHIFT
017B 5F         989        MOV   E,A         ;
017C 16FF       990        MVI   D,0FFH      ;<DE> = - OFFSET
017E EB         991        XCHG              ;
017F 19         992        DAD   D           ;<DE> = END OF BUFFER
                993                          ;<HL> = END OF LAST DATA
0180 3E60       994        MVI   A,96        ;
0182 90         995        SUB   B           ;          BYTES
0183 4F         996        MOV   C,A         ;<C> = NUMBER OF BYTES TO SHIFT
0184 7E         997 DLOOP: MOV   A,M         ;
0185 12         998        STAX  D           ;
0186 2B         999        DCX   H           ;
0187 1B        1000        DCX   D           ;
0188 0D        1001        DCR   C           ;
0189 C28401  C 1002        JNZ   DLOOP       ;
018C AF        1003        XRA   A           ;
018D 12        1004 DFILL: STAX  D           ;FILL IN WHITE TOP
018E 1B        1005        DCX   D           ;
018F 05       1006        DCR   B           ;
0190 C28D01  C 1007        JNZ   DFILL       ;
               1008 ;
               1009 ;CHECK FOR HORIZONTAL CENTERING
               1010 ;
0193 3A0000  E 1011 HORIZ: LDA   HSHFTS      ;
0196 87        1012        ORA   A           ;
0197 C8        1013        RZ                ;RETURN (CC.Z) IF DONE
0198 2A0A80    1014        LHLD  RECPTR      ;
```

```
019B 112000      1015         LXI     D,RECCHB     ;<HL> = CHARACTER
019E 19          1016         DAD     D            ;
019F 3E20        1017         MVI     A,32         ;
01A1 320000  E   1018         STA     RSHCNT       ;INITIALIZE ROW COUNTER
01A4 46          1019 HLOOP:  MOV     B,M          ;<B> = LEFT BYTE
01A5 23          1020         INX     H            ;
01A6 4E          1021         MOV     C,M          ;<C> = CENTER BYTE
01A7 23          1022         INX     H            ;
01A8 56          1023         MOV     D,M          ;<D> = RIGHT BYTE
01A9 3A0000  E   1024         LDA     HSHFTS       ;<A> = NUMBER OF SHIFTS
01AC B7          1025         ORA     A            ;SET CONDITION FLAGS
01AD F2C401  C   1026         JP      RREADY       ;JUMP IF SHIFT TO RIGHT
01B0 2F          1027         CMA                  ;
01B1 3C          1028         INR     A            ;
01B2 5F          1029         MOV     E,A          ;
01B3 B7          1030 LEFT:   ORA     A            ;CLEAR CARRY
01B4 7A          1031         MOV     A,D          ;
01B5 17          10332        RAL                  ;
01B6 57          1033         MOV     D,A          ;
01B7 79          1034         MOV     A,C          ;
01B8 17          1035         RAL                  ;
01B9 4F          1036         MOV     C,A          ;
01BA 78          1037         MOV     A,B          ;
01BB 17          1038         RAL                  ;
01BC 47          1039         MOV     B,A          ;
01BD 1D          1040         DCR     E            ;
01BE C2B301  C   1041         JNZ     LEFT         ;
01C1 C3D301  C   1042         JMP     HCHECK       ;
                 1043 ;
                 1044 ;SHIFT RIGHT
                 1045 ;
01C4 5F          1046 RREADY: MOV     E,A          ;
01C5 B7          1047 RIGHT:  ORA     A            ;CLEAR CARRY
01C6 78          1048         MOV     A,B          ;
01C7 1F          1049         RAR                  ;
01C8 47          1050         MOV     B,A          ;
01C9 79          1051         MOV     A,C          ;
01CA 1F          1052         RAR                  ;
01CB 4F          1053         MOV     C,A          ;
01CC 7A          1054         MOV     A,D          ;
01CD 1F          1055         RAR                  ;
01CE 57          1056         MOV     D,A          ;
01CF 1D          1057         DCR     E            ;
01D0 C2C501  C   1058         JNZ     RIGHT        ;
01D3 72          1059 HCHECK: MOV     M,D          ;UPDATE RIGHT BYTE
01D4 2B          1060         DCX     H            ;
01D5 71          1061         MOV     M,C          ;UPDATE CENTER BYTE
01D6 2B          1062         DCX     H            ;
01D7 70          1063         MOV     M,B          ;UPDATE LEFT BYTE
01D8 110300      1064         LXI     D,3          ;
01DB 19          1065         DAD     D            ;POINT TO NEXT ROW
01DC 3A0000  E   1066         LDA     RSHCNT       ;
01DF 3D          1067         DCR     A            ;DECREMENT ROW COUNTER
01E0 320000  E   1068         STA     RSHCNT       ;
01E3 C2A401  C   1069         JNZ     HLOOP        ;
01E6 C9          1070         RET                  ;RETURN (CC.Z) IF DONE
                 1071 ;
                 1072 ;CREATE CHARACTER SHADOWS
                 1073 ;
01E7 210000  E   1074 CRCSHD: LXI     H,RLBYTE     ;
01EA AF          1075         XRA     A            ;<A> = 0
01EB 77          1076         MOV     M,A          ;CLEAR LEFT MASK
01EC 23          1077         INX     H            ;
01ED 77          1078         MOV     M,A          ;CLEAR CENTER MASK
01EE 23          1079         INX     H            ;
01EF 77          1080         MOV     M,A          ;CLEAR RIGHT MASK
01F0 23          1081         INX     H            ;
01F1 E5          1082         PUSH    H            ;SAVE VERTICAL MASK ADDRESS
```

```
01F2 2A0A80       1083           LHLD    RECPTR          ;
01F5 112000       1084           LXI     D,RECCHB        ;
01F8 19           1085           DAD     D               ;<HL> = CHARACTER BUFFER
001F9 0E04        1086           MVI     C,4             ;<C> = VERTICAL MASK COUNTER
                  1087 ;
                  1088 ;WORK ON EIGHT ROWS AT A TIME
                  1089 ;
01FB 110800       1090 CLOOP1:   LXI     D,8             ;<D> = 0 = INITIAL VERTICAL MASK
                  1091                                   ;<E> = 8 = VERTICAL BIT COUNTER
01FE 46           1092 CLOOP2:   MOV     B,M             ;<B> = LEFT BYTE
01FF 3A0000  E    1093           LDA     RLBYTE          ;
0202 B0           1094           ORA     B               ;
0203 320000  E    1095           STA     RLBYTE          ;
0206 23           1096           INX     H               ;
0207 3A0000  E    1097           LDA     RCBYTE          ;
020A B6           1098           ORA     M               ;
020B 320000  E    1099           STA     RCBYTE          ;
020E 78           1100           MOV     A,B             ;
020F B6           1101           ORA     M               ;
0210 47           1102           MOV     B,A             ;<B> = ROW COMPOSITE
0211 23           1103           INX     H               ;
0212 3A0000  E    1104           LDA     RRBYTE          ;
0215 B6           1105           ORA     M               ;
0216 320000  E    1106           STA     RRBYTE          ;
0219 78           1107           MOV     A,B             ;
021A B6           1108           ORA     M               ;
021B 23           1109           INX     H               ;
021C B7           1110           ORA     A               ;CHECK FOR BLACK
021D 37           1111           STC                     ;
021E C22202  C    1112           JNZ     CSKIP1          ;
0221 3F           1113           CMC                     ;
0222 7A           1114 CSKIP1:   MOV     A,D             ;<D> = VERTICAL COMPOSITE
0223 17           1115           RAL                     ;
0224 57           1116           MOV     D,A             ;
0225 1D           1117           DCR     E               ;
0226 C2FE01  C    1118           JNZ     CLOOP2          ;
0229 E3           1119           XTHL                    ;POINT TO VERTICAL MASK BYTES
022A 77           1120           MOV     M,A             ;SAVE IT
022B 23           1121           INX     H               ;
022C E3           1122           XTHL                    ;
022D 0D           1123           DCR     C               ;
022E C2FB01  C    1124           JNZ     CLOOP1          ;
0231 E1           1125           POP     H               ;CLEAR STACK
0232 C9           1126           RET                     ;
                  1127 $EJECT
                  1128 ;
                  1129 ;SHIFT RIGHT UNTIL BLACK FOUND
                  1130 ;
                  1131 RSHIFT:   REPT    8               ;SET BIT COUNTER
                  1132           RRC                     ;
                  1133           JC      RETCNZ          ;RETURN CC.NZ IF BLACK
                  1134           INR     H               ;INCREMENT SHIFTS REQUIRED
                  1135           ENDM                    ;
025B AF           1160           XRA     A               ;
025C C9           1161           RET                     ;RETURN CC.Z IF NO BLACK
                  1162 ;
                  1163 ;SHIFT LEFT UNTIL BLACK FOUND
                  1164 ;
                  1165 LSHIFT:   REPT    8               ;
                  1166           RLC                     ;
                  1167           JC      RETCNZ          ;RETURN CC.NZ IF BLACK
                  1168           INR     H               ;INCREMENT SHIFTS REQUIRED
                  1169           ENDM                    ;
0285 AF           1194           XRA     A               ;
0286 C9           1195           RET                     ;RETURN CC.Z IF NO BLACK
                  1196           END
```

ASSEMBLY COMPLETE,   NO ERRORS

02/14/83-DESTREADER ISOLATION CARD SOFTWARE - DEFINITION MODULE

```
LOC  OBJ          LINE        SOURCE STATEMENT

1 $NOLIST
                  698 $LIST
                  699 $TITLE('RECOGNITION NOISE FILTERING')
                  700
                  701         PUBLIC  NSDECT
                  702 ;
                  703 ;FOR DETECTING AND ELIMINATING NOISE IN A CHARACTER BUFFER
                  704 ;
                  705         EXTRN   CRCSHD          ;
                  706 ;
                  707         EXTRN   RLBYTE          ;
                  708         EXTRN   RLSHDW          ;LEFT SHADOW
                  709         EXTRN   RRSHDW          ;RIGHT SHADOW
                  710         EXTRN   RTBYTE          ;
                  711         EXTRN   VMMBLK          ;VERTICAL MASK MINIMUM BLACK
                  712         EXTRN   HMMBLK          ;HORIZONTAL MASK MINIMUM BLACK
                  713         EXTRN   HMMBTP          ;TEMPORARY
                  714         EXTRN   HMRCNT          ;
                  715         EXTRN   HMBADR          ;BUFFER ADDRESS
                  716         EXTRN   HMBCNT          ;HORIZONTAL MASK BLACK COUNT
                  717         EXTRN   NSEFLG          ;NOISE DETECTED FLAG
                  718         EXTRN   NSMODE          ;NOISE MODE
                  719         EXTRN   NSFBBS          ;
                  720         CSEG
                  721 $EJECT
                  722 ;
                  723 ;DETECT AND REMOVE NOISE FROM THE CHARACTER BUFFER
                  724 ;FIRST, SCAN THE VERTICAL SHADOW FOR VERTICAL RUN LENGTHS
                  725 ;LESS THAN VMMBLK. IF A RUN LENGTH < VMMBLK IS FOUND, CREATE
                  726 ;A TEMPORARY HORIZONTAL SHADOW OF ISOLATED REGION.
                  727 ;SCAN THE TEMPORARY SHADOW FOR HORIZONTAL RUN LENGTHS LESS
                  728 ;THAN HMMBLK. IF FOUND, MEASURE BLACK AND ERASE.
                  729 ;AFTER COMPLETING VERTICAL SCAN, CREATE NEW HORIZONTAL SHADOW AND
                  730 ;SCAN COMPLETE BUFFER USING HORIZONTAL SHADOW.
                  731 ;
0000 CD0000    E  732 NSDECT: CALL    CRCSHD          ;
0003 3E01         733         MVI     A,1H            ;
0005 320000    E  734         STA     NSEFLG          ;SET FOR NO NOISE FOUND
0008 AF           735         XRA     A               ;
0009 320000    E  736         STA     NSMODE          ;SET FOR VERTICAL
000C 210000    E  737         LXI     H,RTBYTE        ;POINT TO TOP SHADOW
000F 0E04         738         MVI     C,4             ;SET FOR FOUR BYTES
0011 CD4D00    C  739         CALL    NSEISO          ;CALL NOISE ISOLATION
0014 210000    E  740         LXI     H,RLBYTE        ;
0017 110000    E  741         LXI     D,RLSHDW        ;
                  742         REPT    3               ;
  -               743         MOV     A,M             ;
  -               744         STAX    D               ;
  -               745         INX     H               ;
  -               746         INX     D               ;
                  747         ENDM                    ;
0026 3A0000    E  760         LDA     HMMBLK          ;
0029 320000    E  761         STA     HMMBTP          ;
002C 2A0080       762         LHLD    RECPTR          ;
002F 112000       763         LXI     D,RECCHB        ;
0032 19           764         DAD     D               ;
0033 220000    E  765         SHLD    HMBADR          ;
0036 3E20         766         MVI     A,32            ;
0038 5F           767         MOV     E,A             ;
0039 320000    E  768         STA     HMRCNT          ;
003C 3A0000    E  769         LDA     NSEFLG          ;
003F B7           770         ORA     A               ;
0040 CC3801   -C  771         CZ      CRHSHD          ;RE-INITIALIZE SHADOWS
0043 3EFF         772         MVI     A,0FFH          ;
```

```
0045 320000  E  773        STA    NSMODE       ;SET FOR FULL HORIZONTAL
0048 0E03       774        MVI    C,3          ;SET FOR THREE BYTES
004A 210000  E  775        LXI    H,RLSHDW     ;
                776 ;
                777 ;NOISE ISOLATION
                778 ;
004D 0608       779 NSEISO: MVI   B,8          ;
004F 7E         780        MOV    A,M          ;
                781        REPT   8            ;
                782        RLC                 ;
                783        JC     BLKFND       ;
                784        DCR    B            ;
                785        ENDM                ;
0078 23         810 BLOOP2: INX   H            ;
0079 0D         811        DCR    C            ;
007A C24D00  C  812        JI     NSEISO       ;
007D C9         813        RET                 ;
                814 ;
                815 ;BLACK FOUND - SEARCH FOR WHITE
                816 ;<B> = BITS LEFT IN BYTE (8 - 1)
                817 ;<C> = BYTE WHERE BLACK WAS FOUND (3 - 1)
                818 ;
007E 57         819 BLKFND: MOV   D,A          ;SAVE CURRENT MASK
007F 78         820        MOV    A,B          ;
0080 320000  E  821        STA    NSFBBS       ;
0083 7A         822        MOV    A,D          ;
0084 1E01       823        MVI    E,1          ;<E> = BLACK LENGTH
0086 51         824        MOV    D,C          ;<D> = BYTE START OF BLACK
0087 05         825 WLOOP0: DCR   B            ;
0088 CAC600  C  826        JZ     WLOOP2       ;CHECK FOR WHITE
008B 07         827        RLC                 ;JUMP IF WHITE
008C D2CD00  C  828        JNC    BLKISO       ;INCREMENT RUN COUNT
008F 1C         829        INR    E            ;
0090 C38700  C  830        JMP    WLOOP0       ;FINISH CURRENT BYTE
0093 0608       831 WLOOP1: MVI   B,8          ;SET BIT COUNT
0095 7E         832        MOV    A,M          ;LOAD MASK
                833        REPT   8            ;REPEAT FOR ALL BITS
                834        RLC                 ;
                835        JNC    BLKISO       ;
                836        INR    E            ;INCREMENT RUN LENGTH
                837        DCR    B            ;DECREMENT BIT COUNT
                838        ENDM                ;
00C6 23         871 WLOOP2: INX   H            ;INCREMENT MASK POINTER
00C7 0D         872        DCR    C            ;DECREMENT MASK COUNT
00C8 C29300  C  873        JNZ    WLOOP1       ;CONTINUE THROUGH MASKS
00CB 0C         874        INR    C            ;SET BACK TO 1
00CC 04         875        INR    B            ;
                876 ;
                877 ;BLACK REGION ISOLATED
                878 ;BIT START OF BLACK IN NSFBBS
                879 ;<D> = BYTE START OF BLACK
                880 ;<E> = RUN LENGTH
                881 ;
00CD F5         882 BLKISO: PUSH  PSW          ;SAVE CURRENT MASK BYTE
00CE C5         883        PUSH   B            ;SAVE CURRENT BIT AND MASK COUNT
00CF E5         884        PUSH   H            ;SAVE CURRENT MASK POINTER
00D0 3A0000  E  885        LDA    NSMODE       ;
00D3 B7         886        ORA    A            ;
00D4 CAE100  C  887        JZ     VMODE        ;
00D7 3A0000  E  888        LDA    HMMBTP       ;<A> = MAX LENGTH FOR BLACK NOISE
00DA BB         889        CMP    E            ;
00DB D25801  C  890        JNC    HSERCH       ;JUMP IF NOISE < MAX LENGTH
00DE C3E800  C  891        JMP    BLOOP0       ;
00E1 3A0000  E  892 VMODE: LDA    VMMBLK       ;
00E4 BB         893        CMP    E            ;
00E5 D2F600  C  894        JNC    VSERCH       ;
                895 ;
                896 ;RESTART BLACK SCAN
```

```
                897 ;
00E8 E1         898 BLOOP0: POP    H              ;RESTORE MASK POINTER
00E9 C1         899         POP    B              ;RESTORE BIT AND BYTE COUNT
00EA F1         900         POP    PSW            ;RESTORE CURRENT MASK BYTE
00EB 05         901 BLOOP1: DCR    B              ;
00EC CA7800  C  902         JZ     BLOOP2         ;
00EF 07         903         RLC                   ;
00F0 DA7E00  C  904         JC     BLKFND         ;JUMP IF BLACK FOUND
00F3 C3EB00  C  905         JMP    BLOOP1         ;
                906 $EJECT
                907 ;
                908 ;VERTICAL SEARCH FOR NOISE
                909 ;<D> = BYTE NUMBER (4 = TOP, 3 = TOP CENTER, 2 = BOTTOM CENTER
                910 ;                   1 = BOTTOM)
                911 ;<E> = RUN LENGTH
                912 ;
00F6 7B         913 VSERCH: MOV    A,E            ;<A> = RUN LENGTH
00F7 320000  E  914         STA    HMRCNT         ;SAVE AS ROW COUNTER
00FA 2A0A80     915         LHLD   RECPTR         ;
00FD 012000     916         LXI    B,RECCHB       ;
0100 09         917         DAD    B              ;<HL> = CHARACTER ADDRESS
0101 3E04       918         MVI    A,4            ;
0103 92         919         SUB    D              ;
0104 4F         920         MOV    C,A            ;
0105 B7         921         ORA    A              ;
0106 07         922         RLC                   ;
0107 81         923         ADD    C              ;
0108 07         924         RLC                   ;
0109 07         925         RLC                   ;
010A 07         926         RLC                   ;MULTIPLY BY 8
010B 85         927         ADD    L              ;
010C 6F         928         MOV    L,A            ;
010D 3A0000  E  929         LDA    NSFBBS         ;
0110 4F         930         MOV    C,A            ;
0111 3E08       931         MVI    A,8            ;
0113 91         932         SUB    C              ;
0114 4F         933         MOV    C,A            ;
0115 B7         934         ORA    A              ;
0116 07         935         RLC                   ;
0117 81         936         ADD    C              ;
0118 85         937         ADD    L              ;
0119 6F         938         MOV    L,A            ;
011A 220000  E  939         SHLD   HMBADR         ;SAVE STARTING ADDRESS
011D CD3801  C  940         CALL   CRHSHD         ;CREATE HORIZONTAL SHADOW
0120 3A0000  E  941         LDA    VMMBLK         ;
0123 C602       942         ADI    2              ;
0125 320000  E  943         STA    HMMBTP         ;
0128 210000  E  944         LXI    H,RLSHDW       ;
012B 0E03       945         MVI    C,3            ;NUMBER OF MASKS
012D 3E01       946         MVI    A,1            ;
012F 320000  E  947         STA    NSMODE         ;SET FOR REDUCED HORIZONTAL SCAN
0132 CD4D00  C  948         CALL   NSEISO         ;
0135 C3E800  C  949         JMP    BLOOP0         ;CONTINUE WITH VERTICAL SCAN
                950 $EJECT
                951 ;
                952 ;CREATE NEW HORIZONTAL MASKS OF THE ROWS IN QUESTION
                953 ;
0138 AF         954 CRHSHD: XRA    A              ;<A> = 0
0139 010000  E  955         LXI    B,RLSHOW       ;
013C 02         956         STAX   B              ;
013D 03         957         INX    B              ;
013E 02         958         STAX   B              ;
013F 03         959         INX    B              ;
0140 02         960         STAX   B              ;
0141 010000  E  961 NSHDLP: LXI    B,RLSHOW       ;
0144 0A         962         LDAX   B              ;<A> = TEMPORARY LEFT SHADOW
0145 B6         963         ORA    M              ;OR WITH LEFT BYTE OF BUFFER
0146 02         964         STAX   B              ;SAVE
0147 23         965         INX    H              ;
```

```
0148 03           966        INX    B              ;
0149 0A           967        LDAX   B              ;<A> = TEMPORARY CENTER SHADOW
014A B6           968        ORA    M              ;OR WITH CENTER BYTE OF BUFFER
014B 02           969        STAX   B              ;SAVE
014C 23           970        INX    H              ;
014D 03           971        INX    B              ;
014E 0A           972        LDAX   B              ;<A> = TEMPORARY RIGHT SHADOW
014F B6           973        ORA    M              ;OR WITH RIGHT BYTE OF BUFFER
0150 02           974        STAX   B              ;SAVE
0151 23           975        INX    H              ;
0152 03           976        INX    B              ;
0153 1D           977        DCR    E              ;
0154 C24101   C   978        JNZ    NSHDLP         ;
0157 C9           979        RET                   ;
                  980  $EJECT
                  981  ;
                  982  ;HORIZONTAL SEARCH
                  983  ;<D> = BYTE COUNT (3 = LEFT, 2 = CENTER, 1 = RIGHT)
                  984  ;<E> = RUN LENGTH IN PIXELS
                  985  ;STARTING PIXEL IN NSFBBS (FAR LEFT = 8, FAR RIGHT = 1)
                  986  ;
0158 3A0000   E   987  HSERCH: LDA   NSFBBS        ;<A> = PIXEL START
015B 47           988        MOV    B,A            ;
015C 93           989        SUB    E              ;SUBTRACT RUN LENGTH
015D FAE101   C   990        JM     MTOBYT         ;JUMP IF MORE THAN ONE BYTE AREA
0160 217302   C   991        LXI    H,NBTBLE       ;
0163 7B           992        MOV    A,E            ;<A> = RUN LENGTH
0164 85           993        ADD    L              ;
0165 D26901   C   994        JNC    SHINDX         ;
0168 24           995        INR    H              ;
0169 6F           996  SHINDX: MOV   L,A           ;
016A 4E           997        MOV    C,M            ;<C> = SHADOW MASK
016B 3E08         998        MVI    A,8            ;
016D 90           999        SUB    B              ;<A> = NUMBER OF SHIFTS (LEFT) TO MOVE
                  1000                             ;SHADOW INTO POSITION
016E CA7901   C   1001       JZ     SHDCOM         ;JMP IF NO SHIFTS REQUIRED
0171 47           1002       MOV    B,A            ;<B> = NUMBER OF SHIFTS
0172 79           1003       MOV    A,C            ;<C> = STARTING SHADOW
0173 0F           1004 ROTSHD: RRC                 ;ROTATE SHADOW LEFT
0174 05           1005       DCR    B              ;
0175 C27301   C   1006       JNZ    ROTSHD         ;
0178 4F           1007       MOV    C,A            ;<C> = SHADOW
0179 3A0000   E   1008 SHDCOM: LDA   HMRCNT        ;
017C 47           1009       MOV    B,A            ;<B> = NUMBER OF ROWS TO CHECK
017D 1E00         1010       MVI    E,0            ;<E> = CONSECUTIVE BLACK ROW COUNT
017F 210000   E   1011       LXI    H,HMBCNT       ;
0182 73           1012       MOV    M,E            ;INITIALIZE BLACK COUNT
0183 2A0000   E   1013       LHLD   HMBADR         ;<HL> = START OF BUFFER
0186 3E03         1014       MVI    A,3            ;
0188 92           1015       SUB    D              ;
0189 85           1016       ADD    L              ;
018A 6F           1017       MOV    L,A            ;
018B D28F01   C   1018       JNC    BLOOP4         ;
018E 24           1019       INR    H              ;
018F 7E           1020 BLOOP4: MOV   A,M           ;<A> = CHARACTER BYTE
0190 A1           1021       ANA    C              ;AND WITH SHADOW
0191 C2A601   C   1022       JNZ    BFND2          ;JUMP IF SHADOW AREA CONTAINS BLACKK
0194 23           1023       INX    H              ;
0195 23           1024       INX    H              ;
0196 23           1025       INX    H              ;
0197 05           1026 BLOOP5: DCR   B             ;DECREMENT BUFFER ROW COUNT
0198 C28F01   C   1027       JNZ    BLOOP4         ;
019B C3E800   C   1028       JMP    BLOOP0         ;JUMP IF DONE
                  1029 ;
                  1030 ;BLACK AREA FOUND
                  1031 ;
019E 23           1032 BFNDX: INX    H             ;
019F 23           1033       INX    H              ;
01A0 23           1034       INX    H              ;
01A1 7E           1035       MOV    A,M            ;
```

```
01A2 A1              1036           ANA     C            ;
01A3 CABC01    C     1037           JZ      WFND2        ;
01A6 E5              1038 BFND2:    PUSH    H            ;SAVE CURRENT BUFFER ADDRESS
01A7 210006          1039           LXI     H,BCTORG     ;
01AA 85              1040           ADD     L            ;INDEX INTO BIT COUNTER
01AB 6F              1041           MOV     L,A          ;
01AC 7E              1042           MOV     A,M          ;<A> = NUMBER OF BLACK BITS
01AD 210000    E     1043           LXI     H,HMBCNT     ;POINT TO CURRENT BLACK COUNT
01B0 86              1044           ADD     M            ;ADD AND
01B1 77              1045           MOV     M,A          ;UPDATE BLACK COUNT
01B2 1C              1046           INR     E            ;INCREMENT CONSECUTIVE BLACK ROW COUNT
01B3 E1              1047           POP     H            ;RESTORE BUFFER ADDRESS
01B4 05              1048           DCR     B            ;DECREMENT ROW COUNT
01B5 C29E01    C     1049           JNZ     BFNDX        ;JUMP IF NOT END OF BUFFER
01B8 23              1050           INX     H            ;
01B9 23              1051           INX     H            ;
01BA 23              1052           INX     H            ;
01BB 04              1053           INR     B            ;
                     1054 ;
                     1055 ;BLACK ISOLATED
                     1056 ;<HL> POINTS TO WHITE BYTE
                     1057 ;
01BC 3A0000    E     1058 WFND2:    LDA     HMMBLK       ;
01BF E5              1059           PUSH    H            ;SAVE ADDRESS
01C0 210000    E     1060           LXI     H,HMBCNT     ;BLACK COUNT
01C3 BE              1061           CMP     M            ;COMPARE WITH BLACK COUNT
01C4 3600            1062           MVI     M,0          ;RESET BLACK COUNT
01C6 E1              1063           POP     H            ;RESTORE ADDRESS
01C7 DA9701    C     1064           JC      BLOOP5       ;
                     1065 $EJECT
                     1066 ;
                     1067 ;ERASE ISOLATED NOISE IN ONE BYTE
                     1068 ;
01CA E5              1069 HERASE:   PUSH    H            ;SAVE CURRENT BUFFER ADDRESS
01CB 2B              1070           DCX     H            ;
01CC 2B              1071           DCX     H            ;
01CD 2B              1072           DCX     H            ;POINT TO LAST BLACK BYTE
01CE 79              1073 HELOOP:   MOV     A,C          ;
01CF 2F              1074           CMA                  ;<A> = COMPLEMENTED SHADOW
01D0 A6              1075           ANA     M            ;ERASE NOISE
01D1 77              1076           MOV     M,A          ;
01D2 2B              1077           DCX     H            ;
01D3 2B              1078           DCX     H            ;
01D4 2B              1079           DCX     H            ;
01D5 1D              1080           DCR     E            ;DECREMENT COUNT
01D6 C2CE01    C     1081           JNZ     HELOOP       ;
01D9 E1              1082           POP     H            ;RESTORE BUFFER ADDRESS
01DA AF              1083           XRA     A            ;
01DB 320000    E     1084           STA     NSEFLG       ;SET NOISE DELETED FLAG
01DE C39701    C     1085           JMP     BLOOP5       ;
                     1086 $EJECT
                     1087 ;
                     1088 ;NOISE IS BETWEEN AT LEAST TWO BYTES
                     1089 ;<D> = BYTE (3 = LEFT, 2 = CENTER, 1 = RIGHT)
                     1090 ;<E> = RUN LENGTH
                     1091 ;STARTING PIXEL IN NSFBBS (8 = FAR LEFT, 1 = FAR RIGHT)
                     1092 ;
01E1 3A0000    E     1093 MTOBYT:   LDA     HMRCNT       ;<A> = ROW COUNT
01E4 FE03            1094           CPI     3            ;
01E6 D2E801    C     1095           JNC     BLOOP0       ;JUMP IF MORE THAN 2 ROWS
01E9 210000    E     1096           LXI     H,NSFBBS     ;
01EC 3E08            1097           MVI     A,8          ;
01EE 96              1098           SUB     M            ;
01EF 4F              1099           MOV     C,A          ;<C> = NUMBER OF WHITE BITS TO THE LEFT
01F0 3E03            1100           MVI     A,3          ;
01F2 92              1101           SUB     D            ;
01F3 3EFF            1102           MVI     A,0FFH       ;
01F5 C21802    C     1103           JNZ     SETLFT       ;JUMP IF SHADOW STARTS IN SECOND BYTE
01F8 79              1104           MOV     A,C          ;
```

```
01F9 B7             1105         ORA   A            ;CHECK FOR ALL BLACK
01FA C20602  C      1106         JNZ   DOLWHT       ;
01FD 7B             1107         MOV   A,E          ;
01FE D608           1108         SUI   8            ;
0200 5F             1109         MOV   E,A          ;DECREMENT RUN LENGTH
0201 3E00           1110         MVI   A,0          ;
0203 C31802  C      1111         JMP   SETLFT       ;
0206 0608           1112 DOLWHT: MVI   B,8          ;SET BIT COUNTER
0208 37             1113 SETLWT: STC                ;
0209 17             1114         RAL                ;
020A 05             1115         DCR   B            ;DECREMENT BIT COUNT
020B 0D             1116         DCR   C            ;DECREMENT WHITE COUNT
020C C20802  C      1117         JNZ   SETLWT       ;
020F B7             1118 SETLBK: ORA   A            ;
0210 17             1119         RAL                ;
0211 1D             1120         DCR   E            ;DECREMENT RUN LENGTH
0212 05             1121         DCR   B            ;DECREMENT BIT COUNT
0213 C20F02  C      1122         JNZ   SETLBK       ;
0216 0E00           1123         MVI   C,0          ;
0218 6F             1124 SETLFT: MOV   L,A          ;<A> = LEFT SHADOW
0219 0608           1125         MVI   B,8          ;SET BIT COUNTER
021B 79             1126         MOV   A,C          ;
021C B7             1127         ORA   A            ;
021D CA2702  C      1128         JZ    SETCBK       ;JUMP IF CENTER BEGINS WITH BLACK
0220 37             1129 SETCWT: STC                ;
0221 17             1130         RAL                ;
0222 05             1131         DCR   B            ;DECREMENT BIT COUNT
0223 0D             1132         DCR   C            ;DECREMENT WHITE COUNT
0224 C22002  C      1133         JNZ   SETCWT       ;
0227 B7             1134 SETCBK: ORA   A            ;
0228 17             1135         RAL                ;
0229 05             1136         DCR   B            ;DECREMENT BIT COUNT
022A CA3D02  C      1137         JZ    SETRHT       ;JUMP IF CENTER DONE
022D 1D             1138         DCR   E            ;DECREMENT BLACK COUNT
022E C22702  C      1139         JNZ   SETCBK       ;JUMP IF BLACK NOT DONE
0231 37             1140 CLRCRT: STC                ;
0232 17             1141         RAL                ;
0233 05             1142         DCR   B            ;
0234 C23102  C      1143         JNZ   CLRCRT       ;
0237 67             1144         MOV   H,A          ;<H> = CENTER BYTE
0238 0600           1145         MVI   B,0          ;<B> = RIGHT BYTE
023A C35402  C      1146         JMP   MKDONE       ;JUMP TO ERASE NOISE
023D 67             1147 SETRHT: MOV   H,A          ;<H> = CENTER BYTE
023E 0600           1148         MVI   B,0          ;
0240 1D             1149         DCR   E            ;
0241 CA5402  C      1150         JZ    MKDONE       ;JUMP IF BLACK COUNT = 0
0244 0E08           1151         MVI   C,8          ;
0246 B7             1152 SETRBK: ORA   A            ;
0247 17             1153         RAL                ;
0248 0D             1154         DCR   C            ;DECREMENT BIT COUNT
0249 1D             1155         DCR   E            ;DECREMENT BLACK COUNT
024A C24602  C      1156         JNZ   SETRBK       ;
024D 37             1157 SETRWT: STC                ;
024E 17             1158         RAL                ;
024F 0D             1159         DCR   C            ;DECREMENT BIT COUNT
0250 C24D02  C      1160         JNZ   SETRWT       ;
0253 47             1161         MOV   B,A          ;
                    1162 ;
                    1163 ;ERASE NOISE BY 'ANDING' SHADOW INTO BUFFER
                    1164 ;
0254 EB             1165 MKDONE: XCHG               ;<E> = LEFT SHADOW
                    1166                            ;<D> = CENTER SHADOW
0255 2A0000  E      1167         LHLD  HMBADR       ;<HL> = ADDRESS
0258 3A0000  E      1168         LDA   HMRCNT       ;
025B 4F             1169         MOV   C,A          ;<C> = ROW COUNT
025C 7E             1170 ERASE2: MOV   A,M          ;
025D A3             11771        ANA   E            ;
025E 77             1172         MOV   M,A          ;
```

```
025F 23              1173         INX     H               ;
0260 7E              1174         MOV     A,M             ;
0261 A2              1175         ANA     D               ;
0262 77              1176         MOV     M,A             ;
0263 23              1177         INX     H               ;
0264 7E              1178         MOV     A,M             ;
0265 A0              1179         ANA     B               ;
0266 77              1180         MOV     M,A             ;
0267 23              1181         INX     H               ;
0268 0D              1182         DCR     C               ;
0269 C25C02   C      1183         JNZ     ERASE2          ;
026C AF              1184         XRA     A               ;
026D 320000   E      1185         STA     NSEFLG          ;SET NOISE DELETED FLAG
0270 C3E800   C      1186         JMP     BLOOP0          ;CONTINUE WITH HORIZONTAL SCAN
                     1187 $EJECT
                     1188 ;
                     1189 ;TRANSLATE FROM RUN LENGTH TO SHADOW
                     1190 ;
0273 00              1191 NBTBLE: DB      0,80H,0C0H,0E0H,0F0H
0274 80
0275 C0
0276 E0
0277 F0
0278 F8              1192         DB      0F8H,0FCH,0FEH,0FFH
0279 FC
027A FE
027B FF
                     1193         END
```

ASSEMBLY COMPLETE,  NO ERRORS

02/14/83-DESTREADER ISOLATION CARD SOFTWARE - DEFINITION MODULE

```
LOC  OBJ           LINE          SOURCE STATEMENT

1 $NOLIST
                    796 $LIST
                    797 $TITLE('FONT LOADER')
                    798 ;        ******************
                    799 ;        *                *
                    800 ;        *    FONTLD      *
                    801 ;        *                *
                    802 ;        ******************
                    803
                    804         CSEG
                    805
                    806         PUBLIC  FONTLD          ;LOAD NEW FONT
                    807 ;
                    808 ;EXTERNAL PROCEDURE DECLARATIONS
                    809 ;
                    810         EXTRN   DIVBY4          ;DIVIDE BY 4
                    811         EXTRN   DIV816          ;DIVIDE BY 16
                    812         EXTRN   SYSERR          ;SYSTEM ERROR
                    813         EXTRN   FILL            ;FILL WITH 0FFH
                    814         EXTRN   RETCNZ          ;RETURN WITH CC.NZ
                    815 ;
                    816 ;FONT HARDWARE ADDRESS (FHA) DEFINITIONS
                    817 ;
                    818         EXTRN   FHAORG          ;FONT HARDWARE ORIGIN
                    819         EXTRN   FHATMA          ;TEST MASK ADDRESS
                    820         EXTRN   FHAOTF          ;OFFSET TO FIRST MASK
                    821 ;
                    822 ;FONT RAM ADDRESS (FRA) DEFINITIONS
                    823 ;
                    824         EXTRN   FRAFOT          ;FONT ORIGIN TABLE
                    825         EXTRN   FRAFTE          ;END OF FONT ORIGIN TABLE
                    826         EXTRN   FRAHDR          ;FONT HEADER TABLE
                    827         EXTRN   FRASEG          ;FONT SEGMENT TABLE
                    828         EXTRN   SEGMAS          ;MAXIMUM ALLOWABLE SCORE
```

```
                    829         EXTRN   SEGPTR          ;SEGMENT POINTER
                    830         EXTRN   FNTIST          ;FONT ISOLATION SCRATCH TABLE
                    831 ;
                    832 ;FONT DEFINITIONS
                    833 ;
                    834         EXTRN   FNTNUM          ;FONT NUMBER
                    835         EXTRN   FNTSGC          ;NUMBER OF SEGMENTS IN FONT
                    836         EXTRN   FNTCNT          ;NUMBER OF FONTS
                    837 ;
                    838 ;FONT SCRATCH VARIABLES
                    839 ;
                    840         EXTRN   FNTADR          ;FONT ADDRESS
                    841         EXTRN   FNTSIZ          ;FONT SIZE
                    842         EXTRN   FNTCKS          ;FONT CHECKSUM
                    843         EXTRN   FNTPTR          ;FONT TABLE POINTER
                    844
                    845         EXTRN   SYSOPT          ;SYSTEM OPTION SWITCHES
                    846 $EJECT
                    847 ;
                    848 ;BUILD FONT TABLE IF B=0FFH
                    849 ;
0000 79             850 FONTLD:: MOV    A,C             ;<A> = FONT NUMBER
0001 320000    E    851         STA     FNTNUM          ;SAVE
0004 04             852         INR     B               ;BUILD FONT TABLE?
0005 C28600    C    853         JNZ     FONT07          ;JUMP IF TABLE ALREADY BUILT
                    854 ;
                    855 ;BUILD FONT ORIGIN TABLE
                    856 ;
0008 3EFF           857         MVI     A,0FFH          ;
000A 011000         858         LXI     B,FNTMXF*2      ;<BC> = MAX NUMBER OF FONTS X 2
000D 210000    E    859         LXI     H,FRAFOT        ;<HL> = ADDRESS OF FONT ADDRESS TABLE
0010 220000    E    860         SHLD    FNTPTR          ;SAVE AS CURRENT FONT TABLE POINTER
0013 CD0000    E    861         CALL    FILL            ;FILL FONT TABLE WITH 0FFH
0016 210000         862         LXI     H,0             ;
0019 220000    E    863         SHLD    FNTADR          ;INITIALIZE CURRENT FONT ADDRESS
001C 220000    E    864         SHLD    FNTSIZ          ;INITIALIZE CURRENT FONT SIZE
001F AF             865         XRA     A               ;
0020 320000    E    866         STA     FNTCNT          ;NUMBER OF FONTS
0023 2A0000    E    867 FONTL1: LHLD    FNTADR          ;<HL> = CURRENT FONT ADDRESS
0026 EB             868         XCHG                    ;<DE> = CURRENT FONT ADDRESS
0027 2A0000    E    869         LHLD    FNTSIZ          ;<HL> = CURRENT FONT SIZE
002A 19             870         DAD     D               ;<HL> = POSSIBLE START OF NEXT FONT
002B 220000    E    871         SHLD    FNTADR          ;SAVE AS FONT ADDRESS
002E DAAC00    C    872         JC      FONT06          ;JUMP IF END OF MASK SPACE
0031 7C             873         MOV     A,H             ;
0032 3241FF         874         STA     BUSRHA          ;SET HIGH FONT ADDRESS IN HARDWARE
0035 7D             875         MOV     A,L             ;
0036 E5             876         PUSH    H               ;DELAY
0037 E1             877         POP     H               ;
0038 3242FF         878         STA     BUSRLA          ;SET LOW ADDRESS IN HARDWARE
003B 210004         879         LXI     H,FNTMRS/4      ;<HL> = MASK ROM SIZE / 4
003E 220000    E    880         SHLD    FNTSIZ          ;SAVE AS NEW FONT SIZE
0041 2147FF         881         LXI     H,BUSRRR        ;<HL> = PROM READ REGISTER
0044 4E             882         MOV     C,M             ;
0045 E5             883         PUSH    H               ;DELAY
0046 E1             884         POP     H               ;
0047 46             885         MOV     B,M             ;<BC> = FONT SIZE
0048 E5             886         PUSH    H               ;
0049 E1             887         POP     H               ;
004A 5E             888         MOV     E,M             ;
004B E5             889         PUSH    H               ;
004C E1             890         POP     H               ;
004D 56             891         MOV     D,M             ;<DE> = FONT CHECKSUM
004E 78             892         MOV     A,B             ;
004F A1             893         ANA     C               ;
0050 3C             894         INR     A               ;
0051 CA2300    C    895         JZ      FONTL1          ;JUMP IF FONT SIZE = 0FFFFH
0054 60             896         MOV     H,B             ;
```

```
0055 69              897         MOV    L,C              ;<HL> = FONT SIZE
0056 CD0000  -E-     898         CALL   DIVBY4           ;CONVERT FONT BYTE SIZE TO SIZE/4
0059 220000  E       899         SHLD   FNTSIZ           ;SAVE NEW FONT SIZE
005C 0B              900         DCX    B                ;CORRECT FOR 4 BYTES ALREADY READ
005D 0B              901         DCX    B                ;
005E 0B              902         DCX    B                ;
005F 0B              903         DCX    B                ;
                     904
                     905 $EJECT
                     906 ;
                     907 ;FONT STARTS AT THIS PROM - VERIFY FONT CHECKSUM AND UPDATE FONT TABLE
                     908 ;
0060 7B              909         MOV    A,E              ;<A> = LOW BYTE OF CHECKSUM
0061 A2              910         ANA    D                ;AND WITH HIGH BYTE
0062 3C              911         INR    A                ;CHECK FOR CHECKSUM = 0FFFFH
0063 CA8800  C       912         JZ     FONT05           ;JUMP IF DEFAULT CHECKSUM
0066 EB              913         XCHG                    ;
0067 220000  E       914         SHLD   FNTCKS           ;SAVE FONT CHECKSUM
006A 110000          915         LXI    D,0              ;PRESET BYTE ADD REG
006D 210000          916         LXI    H,0              ;PRESET CHECKSUM REG
0070 3A47FF          917 FONTL3: LDA    BUSRRR           ;GET NEXT BYTE
0073 5F              918         MOV    E,A              ;SET FOR 16 BIT ADD
0074 19              919         DAD    D                ;
0075 29              920         DAD    H                ;AFTER EACH ADD, ROTATE CHECKSUM REF LEFT
0076 D27A00  C       921         JNC    FONT04           ;AND INCREMENT
0079 23              922         INX    H                ;
007A 23              923 FONT04: INX    H                ;
007B 0B              924         DCX    B                ;COUNTER EXHAUSTED?
007C 78              925         MOV    A,B              ;
007D B1              926         ORA    C                ;
007E C27000  C       927         JNZ    FONTL3           ;NO, CONTINUE
0081 EB              928         XCHG                    ;
0082 2A0000  E       929         LHLD   FNTCKS           ;COMPARE TO CHECKSUM
0085 19              930         DAD    D                ;
0086 7C              931         MOV    A,H              ;CHECKSUMS ADD TO 0?
0087 B5              932         ORA    L                ;
0088 2A0000  E       933 FONT05: LHLD   FNTADR           ;<HL> = FONT ADDRESS
008B 44              934         MOV    B,H              ;
008C 4D              935         MOV    C,L              ;<BC> = FONT ADDRESS
008D 3EC1            936         MVI    A,ERRFCK         ;AND FONT CHECKSUM ERROR
008F C40000  E       937         CNZ    SYSERR           ;
0092 EB              938         XCHG                    ;<DE> = FONT ORIGIN ADDRESS/4
0093 210000  E       939         LXI    H,FNTCNT         ;
0096 34              940         INR    M                ;UPDATE NUMBER OF FONTS
0097 2A0000  E       941         LHLD   FNTPTR           ;<HL> = FONT POINTER
009A 7D              942         MOV    A,L              ;END OF FONT TABLE?
009B FE00   -E       943         CPI    LOW FRAFTE       ;
009D 3EC3            944         MVI    A,ERRFTM         ;IF SO,
009F CC0000  E       945         CZ     SYSERR           ;REPORT TOO MANY FONTS
00A2 73              946         MOV    M,E              ;
00A3 23              947         INX    H                ;
00A4 72              948         MOV    M,D              ;SAVE FONT ORIGIN ADDRESS/4 IN TABLE
00A5 23              949         INX    H                ;
00A6 220000  E       950         SHLD   FNTPTR           ;UPDATE FONT TABLE ENTRY POINTER
00A9 C32300  C       951         JMP    FONTL1           ;TEST NEXT FONT
                     952 $EJECT
                     953 ;
                     954 ;SELECT NEW FONT
                     955 ;
00AC 3A0000  E       956 FONT06: LDA    FNTPTR           ;IF INITIAL TABLE POINTER UNCHANGED,
00AF FE00    E       957         CPI    LOW FRAFOT       ;NO FONT FOUND
00B1 3EC2            958         MVI    A,ERRMFT         ;REPORT MISSING FONT
00B3 CC0000  E       959         CZ     SYSERR           ;
00B6 3A0000  E       960 FONT07: LDA    FNTNUM           ;<A> = NEW FONT NUMBER
00B9 FE08            961         CPI    FNTMXF           ;CHECK FOR MAXIMUM
00BB D20000  E       962         JNC    RETCNZ           ;REPORT ILLEGAL FONT NUMBER
00BE 07              963         RLC                     ;<A> = FONT TABLE INDEX
00BF 210000  E       964         LXI    H,FRAFOT         ;<HL> = START OF FONT TABLE ADDRESS
```

```
00C2 85              965         ADD     L           ;<HL> = NEW FONT ENTRY ADDRESS
00C3 6F              966         MOV     L,A         ;
00C4 5E              967         MOV     E,M         ;
00C5 23              968         INX     H           ;
00C6 56              969         MOV     D,M         ;<DE> = FONT ORIGIN HARDWARE ADDRESS
00C7 7A              970         MOV     A,D         ;
00C8 A3              971         ANA     E           ;CHECK FOR ORIGIN = 0FFFFH
00C9 3C              972         INR     A           ;RETURN FAIL (CC.NZ) IF ILLEGAL NUMBER
00CA CA0000   E      973         JZ      RETCNZ      ;<A> = NUMBER OF FONTS
00CD 3A0000   E      974         LDA     FNTCNT      ;
00D0 3D             975         DCR     A           ;
00D1 CAE300   C      976         JZ      LDHEAD      ;
00D4 3A0000   E      977         LDA     SYSOPT      ;<A> = SYSTEM OPTION
00D7 0F              978         RRC                 ;
00D8 DAE300   C      979         JC      LDHEAD      ;
00DB 3EC3            980         MVI     A,ERRFTM    ;MORE THAN ONE FONT IN 201 VERSION
00DD CD0000   E      981         CALL    SYSERR      ;
00E0 C30000   E      982         JMP     RETCNZ      ;
                     983 $EJECT
                     984 ;
                     985 ;LOAD FONT HEADER INTO RAM
                     986 ;
00E3 EB              987 LDHEAD: XCHG                ;
00E4 220000   E      988         SHLD    FHAORG      ;UPDATE ORIGIN
00E7 210000          989         LXI     H,FONTSZ    ;<HL> = 0
00EA CDA801   C      990         CALL    FONTSA      ;COMPUTE AND SET FONT HEADER ADDRESS
00ED 0620            991         MVI     B,32        ;<B> = 32 = LENGTH OF FONT HEADER
00EF 110000   E      992         LXI     D,FRAHDR    ;<DE> = FONT HEADER RAM ADDRESS
00F2 7E              993 FONTL8: MOV     A,M         ;GET NEXT BYTE OF HEADER
00F3 12              994         STAX    D           ;
00F4 13              995         INX     D           ;
00F5 05              996         DCR     B           ;
00F6 C2F200   C      997         JNZ     FONTL8      ;
                     998 ;
                     999 ;LOAD TEST MASK ADDRESS
                     1000 ;
00F9 2A1A00   E      1001        LHLD    FRAHDR+FONTTM ;
00FC EB              1002        XCHG                ;<DE> = TEST MASK ADDRESS
00FD 2A0000   E      1003        LHLD    FHAORG      ;FONT HARDWARE ORIGIN
0100 19              1004        DAD     D           ;<HL> = TEST MASK HARDWARE ORIGIN
0101 220000   E      1005        SHLD    FHATMA      ;SAVE
0104 CD0000   E      1006        CALL    DIV816      ;
0107 7C              1007        MOV     A,H         ;
0108 2F              1008        CMA                 ;
0109 67              1009        MOV     H,A         ;
010A 7D              1010        MOV     A,L         ;
010B 2F              1011        CMA                 ;
010C 6F              1012        MOV     L,A         ;
010D 220000   E      1013        SHLD    FHAOTF      ;SAVE NEGATIVE OFFSET TO FIRST MASK
                     1014 $EJECT
                     1015 ;
                     1016 ;LOAD BREAKPOINT TABLES INTO RAM
                     1017 ;
0110 2A1600   E      1018        LHLD    FRAHDR+FONTBT ;<HL> = FIRST BREAKPOINT TABLE ADDRESS
0113 CDA801   C      1019        CALL    FONTSA      ;COMPUTE AND SET FONT ADDRESS
0116 010000   E      1020        LXI     B,FRASEG    ;<BC> = SEGMENT TABLE RAM ADDRESS.
0119 1600            1021        MVI     D,0         ;
011B 7E              1022 FONTL9: MOV    A,M         ;END OF TABLE?
011C 02              1023        STAX    B           ;SAVE BYTE
011D 03              1024        INX     B           ;INCREMENT TABLE ADDRESS
011E 3C              1025        INR     A           ;
011F CA5301   C      1026        JZ      FONT10      ;JUMP IF END OF BREAKPOINT TABLE
                     1027        REPT    15          ;LOAD BREAKPOINT TABLE
  -                  1028        MOV     A,M         ;GET NEXT BYTE
  -                  1029        STAX    B           ;STORE
  -                  1030        INX     B           ;BUMP PTR
                     1031        ENDM                ;
014F 14              1077        INR     D           ;
```

```
0150 C31801  C  1078         JMP    FONTL9          ;LOAD NEXT ENTRY
0153 7A         1079 FONT10: MOV    A,D             ;
0154 320000  .E 1080         STA    FNTSGC          ;SAVE NUMBER OF SEGMENTS IN THIS FONT
0157 210000  E  1081         LXI    H,FRASEG        ;<HL> = SEGMENT RAM ADDRESS
015A 220000  E  1082         SHLD   SEGPTR          ;SAVE AS SEGMENT POINTER
                1083 ;
                1084 ;LOAD ISOLATION PARAMETER TABLE
                1085 ;
015D 2A1200  E  1086         LHLD   FRAHDR+FONTIT   ;<HL> = POINT TO ISOLATION PARAMETER TABLE
0160 CDAB01  C  1087         CALL   FONTSA          ;
0163 110000  E  1088         LXI    D,FNTIST        ;<DE> = ISOLATION SCRATCH TABLE
                1089         REPT   8               ;
   -            1090         MOV    A,M             ;READ FROM FONT PROM
   -            1091         STAX   D               ;LOAD SCRATCH TABLE
   -            1092         INX    D               ;
   -            1093         DCR    B               ;
                1094         ENDM                   ;
                1127 ;
                1128 ;LOAD TRANSLATION AND THRESHOLD TABLES
                1129 ;
0186 2A1000  E  1130         LHLD   FRAHDR+FONTAT   ;<HL> = ASCII TRANS TABLE POINTER
0189 CDAB01  C  1131         CALL   FONTSA          ;SET FONT POINTER
018C 110098     1132         LXI    D,SYSFAM        ;<DE> = ASCII MAPPING TABLE RAM ADDRESS
018F CD9F01  C  1133         CALL   FMAPLD          ;LOAD TABLE
0192 2A1400  E  1134         LHLD   FRAHDR+FONTTT   ;<HL> = THRESHOLD TABLE POINTER
0195 CDAB01  C  1135         CALL   FONTSA          ;SET FONT POINTER
0198 110099     1136         LXI    D,SYSFTT        ;<DE> = THRESHOLD TABLE RAM ADDRESS
019B CD9F01  C  1137         CALL   FMAPLD          ;
019E C9        1138         RET                     ;
                1139 $EJECT
                1140 ;
                1141 ;LOAD MASK COUNT BYTES OF TABLE @DE
                1142 ;
019F 3A0E00  E  1143 FMAPLD: LDA   FRAHDR+FONTMC    ;GET # CHARS IN FONT
01A2 47          1144         MOV    B,A             ;SET COUNTER
01A3 7E          1145 FMAPL1: MOV    A,M             ;GET NEXT BYTE
01A4 12          1146         STAX   D               ;
01A5 13          1147         INX    D               ;=>NEXT BYTE OF TABLE
01A6 05          1148         DCR    B               ;DONE?
01A7 C2A301  C  1149         JNZ    FMAPL1          ;NO, XFER NEXT BYTE
01AA C9          1150         RET                    ;DONE
                1151 ;
                1152 ;CONVERT FONT INDEX TO MASK SPACE INDEX AND SET ADDRESS
                1153 ;<HL> = OFFSET INTO MASK AREA
                1154 ;RETURNS WITH <HL> = PORT
                1155 ;
01AB EB          1156 FONTSA: XCHG                    ;
01AC 2A0000  E  1157         LHLD   FHAORG          ;ADD FONT ORIGIN TO FONT INDEX
01AF 19          1158         DAD    D               ;TO YIELD MASK SPACE INDEX
01B0 7C          1159         MOV    A,H             ;
01B1 3241FF     1160         STA    BUSRHA          ;SET HIGH ADDRESS
01B4 7D          1161         MOV    A,L             ;SET LOW ADDRESS
01B5 E5          1162         PUSH   H               ;
01B6 E1          1163         POP    H               ;DELAY
01B7 3242FF     1164         STA    BUSRLA          ;
01BA 2147FF     1165         LXI    H,BUSRRR        ;=>MASK READ PORT
01BD C9          1166         RET                    ;DONE
                1167         END
```

ASSEMBLY COMPLETE, NO ERRORS

02/14/83-DESTREADER ISOLATION CARD SOFTWARE - DEFINITION MODULE

LOC  OBJ        LINE      SOURCE STATEMENT

1 $NOLIST
                796 $LIST
                797 $TITLE ('RECOGNITION EXECUTIVE MODULE')

```
798
799 ;                   ***********
800 ;                   *         *
801 ;                   * ISOREC  *
802 ;                   *         *
803 ;                   ***********
804
805 ;
806 ;PUBLIC PROCEDURE DEFINITIONS
807 ;
808         PUBLIC  RECORG          ;ISOREC ORIGIN ADDRESS - REFERENCE ONLY
809         PUBLIC  ISOREC          ;START RECOGNITION PROCESS
810         PUBLIC  RUNFNT          ;RUN NEXT FONT DURING FONT SELECT
811         PUBLIC  RRFONT          ;RERUN CURRENT FONT DURING RETRY
812         PUBLIC  RUNSEG          ;RUN SINGLE SEGMENT
813         PUBLIC  ISORGO          ;RUN NEXT CHARACTER
814 ;
815 ;PUBLIC DATA DEFINITIONS
816 ;
817         PUBLIC  TSTSEG          ;REC TEST SEGMENT
818         PUBLIC  RECTSC          ;REC TEST SCORES
819         PUBLIC  RECTPT          ;REC TEST PATTERN
820         PUBLIC  RECDHB          ;DEFAULT ISOLATION PARAMETERS
821 ;
822 ;EXTERNAL PROCEDURE REFERENCES - ISOSYS
823 ;
824         EXTRN   SYSERR          ;REPORT SYSTEM ERROR
825         EXTRN   TSTLNK          ;LINK TO TEST PROM
826         EXTRN   TIMOUT          ;SET/RESET TIMOUT
827 ;
828 ;EXTERNAL PROCEDURES - RECOGNITION
829 ;
830         EXTRN   CHBSCH          ;CHARACTER BUFFER SEARCH
831         EXTRN   RBINIT          ;REC BUFFER INITIALIZATION
832         EXTRN   FONTLD          ;LOAD FONT
833         EXTRN   NULREC          ;NULL RECOGNITION ENTRY
834         EXTRN   BUFMOV          ;MOVING A BUFFER
835 $EJECT
836 ;
837 ;RECOGNITION VARIABLE DECLARATIONS
838 ;
839         EXTRN   RCVFLS          ;FONT LOW SCORE
840         EXTRN   RCVFLA          ;FONT LOW ASCII
841         EXTRN   RCVPOF          ;PREVIOUS MASK OFFSET
842         EXTRN   RCVBOF          ;
843         EXTRN   RCVWBC          ;AWAITING FONT SELECT BUFFER COUNT
844         EXTRN   RCVLSR          ;LOW SCORE REPORTED
845         EXTRN   RCVZSP          ;ZONE SCORE POINTER
846 ;
847 ;CURRENT FONT AND SEGMENT VARIABLES
848 ;
849         EXTRN   FHAORG          ;FONT HARDWARE ORIGIN ADDRESS
850         EXTRN   FNTSGC          ;NUMBER OF SEGMENTS IN CURRENT FONT
851         EXTRN   SEGPTR          ;CURRENT SEGMENT POINTER
852         EXTRN   SEGMAS          ;SEGMENT MAXIMUM ALLOWABLE SCORE
853         EXTRN   FRASEG          ;ADDRESS OF SEGMENT TABLES
854 ;
855 ;RECOGNITION RETRY FLAGS
856 ;
857         EXTRN   RTFCTR          ;RE-CENTER
858         EXTRN   RTFSNF          ;SMALL NOISE FILTER
859         EXTRN   RTFLNF          ;LARGE NOISE FILTER
860         EXTRN   RTFBRN          ;BURN
861         EXTRN   RTFGRW          ;REGROW
862         EXTRN   RTFUL0          ;UNDERLINE PROCESS 0
863 ;
864 ;EXTERNAL DATA - ISOSYS
865 ;
866         EXTRN   TIMER2          ;RECOGNITION TIMER
```

```
                    867 ;
                    868 ;EXTERNAL INTERFACE TABLE DEFINITIONS
                    869 ;
                    870         EXTRN   ITSROF          ;DEBUG FLAG
                    871         EXTRN   ITSR16          ;RECOGNITION TEST FLAG
                    872
                    873 $EJECT
LOC  OBJ       LINE         SOURCE STATEMENT

874                 CSEG            ;RELOC CODE FOLLOWS
                    875 RECORG:
                    876 ;      ********************************
                    877 ;      *                              *
                    878 ;      *   RECOGNITION TEST PATTERN   *
                    879 ;      *                              *
                    880 ;      ********************************
                    881 ;
                    882 ;SCORES FOR ALL 16 ZONES OF TEST CHAR
                    883 ;
0000 00             884 TSTSEG: DB      0H              ;MINUMUM HEIGHT
0001 20             885         DB      32              ;MAXIMUM HEIGHT
0002 30             886         DB      30H             ;MAXIMUM SCORE
0003 02             887         DB      2               ;MASK COUNT
0004 FFFF           888         DW      -1              ;STARTING ADDRESS
0006 0000           889         DW      0               ;BREAKPOINT ADDRESS
0008 01             890         DB      1               ;THRESHOLD CRITERIA
0009 03             891         DB      3               ;SEPARATION CRITERIA
000A 00             892         DB      0               ;FREQUENCY OF OCCURANCE
000B FF             893         DB      0FFH            ;SEGMENT DESCIPTORS
000C FFFF           894         DW      -1              ;VIRTUAL BREAPOINT ADDRESS
000E FF             895         DB      0FFH            ;SPARE
000F FF             896         DB      0FFH            ;SPARE
0010 00             897         DB      0,0,0,0         ;END OF BREAKPOINT TABLES
0011 00
0012 00
0013 00
0014 0E             898 RECTSC: DB      0EH,1FH,0FH,0DH
0015 1F
0016 0F
0017 0D
0018 1F             899         DB      1FH,0FH,13H,25H
0019 0F
001A 13
001B 25
001C 80             900         DB      80H,80H,80H,80H
001D 80
001E 80
001F 80
0020 80             901         DB      80H,80H,80H,16H
0021 80
0022 80
0023 16
0024 0E             902 RECDHB: DB      14,8,14,40,10,0FFH,0FFH,0FFH
0025 08
0026 0E
0027 28
0028 0A
0029 FF
002A FF
002B FF
                    903 $EJECT
002C 00             904 RECTPT: DB      00000000B,00000000B,00000000B
002D 00
002E 00
002F 00             905         DB      00000000B,00000000B,00000000B
0030 00
0031 00
0032 00             906         DB      00000000B,00000000B,00000000B
```

```
0033 00
0034 00
0035 00         907     DB      00000000B,00000000B,00000000B
0036 00
0037 00
0038 00         908     DB      00000000B,11111110B,00000000B
0039 FE
003A 00
003B 07         909     DB      00000111B,11111111B,11100000B
003C FF
003D E0
003E 07         910     DB      00000111B,11111111B,11100000B
003F FF
0040 E0
0041 07         911     DB      00000111B,11111111B,11100000B
0042 FF
0043 E0
0044 01         912     DB      00000001B,11111111B,11100000B
0045 FF
0046 E0
0047 01         913     DB      00000001B,11111111B,11100000B
0048 FF
0049 E0
004A 01         914     DB      00000001B,11111111B,11100000B
004B FF
004C E0
004D 01         915     DB      00000001B,11111100B,00000000B
004E FC
004F 00
0050 01         916     DB      00000001B,11111100B,00000000B
0051 FC
0052 00
0053 01         917     DB      00000001B,11111100B,00000000B
0054 FC
0055 00
0056 01         918     DB      00000001B,11111100B,00000000B
0057 FC
0058 00
0059 01         919     DB      00000001B,11111100B,00000000B
005A FC
005B 00
005C 07         920     DB      00000111B,11111100B,00000000B
005D FC
005E 00
005F 07         921     DB      00000111B,11111100B,00000000B
0060 FC
0061 00
0062 07         922     DB      00000111B,11111111B,11000000B
0063 FF
0064 C0
0065 07         923     DB      00000111B,11111111B,11000000B
0066 FF
0067 C0
0068 07         924     DB      00000111B,11111111B,11000000B
0069 FF
006A C0
006B 07         925     DB      00000111B,11111111B,11000000B
006C FF
006D C0
006E 07         926     DB      00000111B,11111111B,11000000B
006F FF
0070 C0
0071 00         927     DB      00000000B,00000000B,00000000B
0072 00
0073 00
0074 00         928     DB      00000000B,00000000B,00000000B
0075 00
0076 00
0077 00         929     DB      00000000B,00000000B,00000000B
```

```
0078 00
0079 00
007A 00        930        DB      00000000B,00000001B,00000000B
007B 01
007C 00
007D 00        931        DB      00000000B,00000000B,00000000B
007E 00
007F 00
0080 00        932        DB      00000000B,00000000B,00000000B
0081 00
0082 00
0083 00        933        DB      00000000B,00000000B,00000000B
0084 00
0085 00
0086 00        934        DB      00000000B,00000000B,00000000B
0087 00
0088 00
0089 00        935        DB      00000000B,00000000B,00000000B
008A 00
008B 00
               936 $EJECT
               937 ;
               938 ;RECOGNITION DRIVER
               939 ;CALLED TO ACTIVATE INTERRUPT DRIVEN RECOGNITION PROCESS.
               940 ;IF ANY CHARACTER BUFFER IS AWAITING RECOGNITION, THE
               941 ;RECOGNITION IN PROGRESS FLAG (RECRUN) WILL BE SET TRUE, AND
               942 ;INTERRUPT DRIVEN RECOGNITION WILL CONTINUE UNTIL ALL CHARACTER
               943 ;BUFFERS AWAITING RECOGNITION HAVE BEEN PROCESSED.
               944 ;
008C 110480    945 ISOREC: LXI    D,RECRUN      ;POINT TO REC FLAG
008F 1A        946         LDAX   D             ;<A> = RECOGNITION FLAG
0090 B7        947         ORA    A             ;0FFH = ACTIVE, 0 = IDLE
0091 C0        948         RNZ                  ;RETURN IF ALREADY RUNNING
0092 2F        949         CMA                  ;<A> = 0FFH = RECOGNITION ON
0093 12        950         STAX   D             ;SET RECOGNITION FLAG
               951 ;
               952 ;SEARCH FOR BUFFERS AWAITING RECOGNITION
               953 ;
0094 010C00    954 ISORGO: LXI    B,SYSCHC      ;<B> = NUMBER OF BUFFERS
0097 2A0A80    955         LHLD   RECPTR        ;<HL> = CURRENT REC BUFFER
009A 118000    956         LXI    D,SYSCHL      ;
009D 19        957 ISONXB: DAD    D             ;START WITH NEXT BUFFER
009E 7C        958         MOV    A,H           ;
009F FE8F      959         CPI    HIGH SYSCHE   ;
00A1 C2A700 C  960         JNZ    ISOWRP        ;
00A4 210089    961         LXI    H,SYSCHB      ;
00A7 7E        962 ISOWRP: MOV    A,M           ;
00A8 4F        963         MOV    C,A           ;
00A9 E6C0      964         ANI    RECSMK        ;
00AB FE80      965         CPI    RECSWR        ;<C> = AWAITING REC FLAG
00AD C2B600 C  966         JNZ    NOTRDY        ;
00B0 79        967         MOV    A,C           ;
00B1 E610      968         ANI    RECAFS        ;
00B3 CABF00 C  969         JZ     ISOBFD        ;JUMP IF FOUND
00B6 05        970 NOTRDY: DCR    B             ;
00B7 C29D00 C  971         JNZ    ISONXB        ;
00BA AF        972         XRA    A             ;NO BUFFERS AWAITING RECOGNITION,
00BB 320480    973         STA    RECRUN        ;TURN OFF RECOGNITION PROCESS
00BE C9        974         RET                  ;
               975 ;
               976 ;BUFFER AWAITING RECOGNITION FOUND
               977 ;RESET RETRY FLAGS (EXECUTED ONCE PER CHARACTER)
               978 ;
00BF 220A80    979 ISOBFD: SHLD   RECPTR        ;SAVE POINTER TO REC BUFFER
00C2 3A0000 E  980         LDA    ITSR16        ;
00C5 B7        981         ORA    A             ;CHECK FOR REC TEST
00C6 C2DD00 C  982         JNZ    NOMDS         ;JUMP IF REC UNDER TEST
00C9 110088    983         LXI    D,SYSOHB      ;
00CC CD0000 E  984         CALL   BUFMOV        ;SAVE ORIGINAL CHARACTER
```

```
00CF 216900        985         LXI     H,TMDRPC        ;INFORM MDS OF CHARACTER
00D2 CD0000   E    986         CALL    TSTLNK          ;
00D5 CADD00   C    987         JZ      NOMDS           ;JUMP IF REC ABORTED
00D8 AF            988         XRA     A               ;
00D9 320400        989         STA     RECRUN          ;
00DC C9            990         RET                     ;
00DD AF            991 NOMDS:  XRA     A               ;RESET RETRY FLAGS
00DE 320000   E    992         STA     RTFCTR          ;RE-REGISTRATION
00E1 320000   E    993         STA     RTFSNF          ;SMALL NOISE FILTER
                   994 $EJECT
                   995 ;
                   996 ;PROCESS FONT FROM THE BEGINNING
                   997 ;CALLED ONCE PER FONT
                   998 ;
00E4 320000   E    999 RUNFNT: STA     RTFLNF          ;RESET LARGE NOISE FILTER FLAG
00E7 320000   E   1000         STA     RTFBRN          ;RESET BURN FLAG
00EA 320000   E   1001         STA     RTFGRW          ;RESET REGROW FLAG
00ED 2A0A00       1002         LHLD    RECPTR          ;
00F0 110C00       1003         LXI     D,0CH           ;
00F3 19           1004         DAD     D               ;POINT TO BURN INDICATOR
00F4 77           1005         MOV     M,A             ;RESET NORMALIZER INDICATOR
00F5 3E03         1006         MVI     A,3             ;
00F7 320000   E   1007         STA     RTFUL0          ;RESET UNDERLINE FLAG
                  1008 ;
                  1009 ;RERUN THROUGH FONT
                  1010 ;DETERMINE SEGMENT
                  1011 ;
00FA 21FFFF       1012 RRFONT: LXI     H,0FFFFH        ;
00FD 220000   E   1013         SHLD    RCVFLS          ;INITIALIZE SCORES
0100 213F3F       1014         LXI     H,CCHREJ        ;
0103 220000   E   1015         SHLD    RCVFLA          ;INITIALIZE ASCIIS
0106 3A0000   E   1016         LDA     FNTSGC          ;
0109 4F           1017         MOV     C,A             ;<C> = NUMBER OF SEGMENTS
010A 2A0A00       1018         LHLD    RECPTR          ;<HL> = REC BUFFER
010D CD0000   E   1019         CALL    RBINIT          ;INITIALIZE BUFFER
0110 2A0A00       1020         LHLD    RECPTR          ;
0113 110700       1021         LXI     D,RECVSZ        ;
0116 19           1022         DAD     D               ;POINT TO CHARACTER HEIGHT
0117 3E20         1023         MVI     A,32            ;<A> = CHARACTER HEIGHT
0119 BE           1024         CMP     M               ;CHECK FOR HEIGHT > 32
011A D21E01   C   1025         JNC     SIZEOK          ;JUMP IF HEIGHT < 32
011D 77           1026         MOV     M,A             ;
011E 7E           1027 SIZEOK: MOV     A,M             ;
011F 210000   E   1028         LXI     H,FRASEG        ;POINT TO START OF SEGMENT TABLES
0122 220000   E   1029         SHLD    SEGPTR          ;<HL> = SAVE POINTER
0125 110F00       1030         LXI     D,15            ;OFFSET TO NEXT TABLE
0128 BE           1031 HTLOOP: CMP     M               ;CHECK FOR LOWER BOUNDS
0129 23           1032         INX     H               ;POINT TO MAX SIZE
012A DA3401   C   1033         JC      NOTSIZ          ;JUMP IF TOO SMALL
012D 47           1034         MOV     B,A             ;<B> = CHARACTER SIZE
012E 7E           1035         MOV     A,M             ;<A> = MAX HEIGHT
012F B8           1036         CMP     B               ;CHECK UPPER BOUNDS
0130 78           1037         MOV     A,B             ;RESTORE CHARACTER SIZE
0131 D24001   C   1038         JNC     CHARLD          ;JUMP IF TOO LARGE
0134 19           1039 NOTSIZ: DAD     D               ;POINT TO NEXT SEGMENT
0135 0D           1040         DCR     C               ;DECREMENT SEGMENT COUNT
0136 C22801   C   1041         JNZ     HTLOOP          ;CONTINUE CHECKING THROUGH SEGMENTS
0139 F5           1042         PUSH    PSW             ;SAVE REGISTERS
013A C5           1043         PUSH    B               ;
013B D5           1044         PUSH    D               ;
013C E5           1045         PUSH    H               ;SIMULATE INTERRUPT
013D C30000   E   1046         JMP     NULREC          ;NULL RECOGNITION ENTRY
                  1047 ;
                  1048 ;OUTPUT CHARACTER TO HARDWARE
                  1049 ;
0140 2B           1050 CHARLD: DCX     H               ;POINT TO START OF SEGMENT
0141 220000   E   1051         SHLD    SEGPTR          ;SAVE CURRENT SEGMENT POINTER
0144 AF           1052         XRA     A               ;<A> = 0
0145 3242FF       1053         STA     BUSRLA          ;RESET RECOGNITION HARDWARE
```

```
0148 2A0A30      1054          LHLD    RECPTR      ;<HL> = CHARACTER BUFFER POINTER
014B 112000      1055          LXI     D,RECCHB    ;<DE> =OFFSET TO CHAR MATRIX
014E 19          1056          DAD     D           ;<HL> = CHAR MATRIX
014F 220000   E  1057          SHLD    RCVZSP      ;SAVE ZONE SCORE POINTER
0152 1149FF      1058          LXI     D,BUSRCH    ;<DE> = CHAR OUT PORT
0155 0660       1059           MVI     B,96        ;TRANSFER IN 96 BYTES
0157 7E          1060 CHLDLP:  MOV     A,M         ;<A> = CHAR FROM BUFFER
0158 12          1061          STAAX   D           ;SEND BYTE TO HARDWARE
0159 23          1062          INX     H           ;
015A 05          1063          DCR     B           ;DECREMENT COUNTER
015B C25701   C  1064          JNZ     CHLDLP      ;
                 1065 $EJECT
                 1066 ;
                 1067 ;PROCESS A SEGMENT
                 1068 ;
015E 2A0000   E  1069 RUNSEG:  LHLD    SEGPTR      ;POINT TO CURRENT SEGMENT
0161 23          1070          INX     H           ;POINT TO MAX HEIGHT
0162 23          1071          INX     H           ;POINT TO MAX ALLOWABLE SCORE
0163 7E          1072          MOV     A,M         ;
0164 3244FF      1073          STA     BUSRTR      ;WRITE MAX SCORE TO HARDWARE
0167 320000   E  1074          STA     SEGMAS      ;SAVE
016A 23          1075          INX     H           ;
016B 7E          1076          MOV     A,M         ;<A> = BREAKPOINT COUNT
016C 2F          1077          CMA                 ;
016D 3C          1078          INR     A           ;
016E 3243FF      1079          STA     BUSRBC      ;WRITE -BREAKPOINT COUNT TO HARDWARE
0171 23          1080          INX     H           ;POINT TO STARTING ADDRESS
0172 4E          1081          MOV     C,M         ;<C> = LOW BYTE OF STARTING ADDRESS
0173 23          1082          INX     H           ;
0174 46          1083          MOV     B,M         ;<BC> = RELATIVE STARTING ADDRESS
0175 23          1084          INX     H           ;
0176 5E          1085          MOV     E,M         ;
0177 23          1086          INX     H           ;
0178 56          1087          MOV     D,M         ;<DE> = BREAKPOINT OFFSET
0179 EB          1088          XCHG                ;
017A 220000   E  1089          SHLD    RCVBOF      ;
017D 2A0000   E  1090          LHLD    FHAORG      ;<HL> = FONT ORIGIN ADDRESS
0180 09          1091          DAD     B           ;<DE> = ACTUAL STARTING ADDRESS
0181 7C          1092          MOV     A,H         ;<A> = HIGH ADDRESS
0182 3241FF      1093          STA     BUSRHA      ;WRITE HIGH ADDRESS TO HARDWARE
0185 AF          1094          XRA     A           ;<A> = 0
0186 320000   E  1095          STA     RCVLSR      ;SET LOW SCORE REPORTED
0189 7D          1096          MOV     A,L         ;<A> = LOW ADDRESS
018A 3242FF      1097          STA     BUSRLA      ;WRITE LOW ADDRESS TO HARDWARE
018D 210000      1098          LXI     H,0         ;
0190 220000   E  1099          SHLD    RCVPOF      ;INITIALIZE PREVIOUS OFFSET
0193 015000      1100          LXI     B,TORCRM    ;SET RECOGNITION INTERRUPT TIMEOUT
0196 110000   E  1101          LXI     D,TIMER2    ;USING TIMER 2
0199 21A301   C  1102          LXI     H,RECTMO    ;GET TIMEOUT SUBR ADDR
019C CD0000  - E 1103          CALL    TIMOUT      ;
019F 3245FF      1104          STA     BUSR3R      ;BEGIN RECOGNITION
01A2 C9          1105          RET                 ;DONE
                 1106
01A3 3EC5        1107 RECTMO:  MVI     A,ERRITO    ;TIMEOUT
01A5 CD0000   E  1108          CALL    SYSERR      ;REPORT RECOGNITION TIMEOUT
                 1109          END

ASSEMBLY COMPLETE,    NO ERRORS
```

What is claimed is:

1. An apparatus for recognition of printed characters having typestyles with horizontal and vertical stroke width variations, said apparatus comprising a microprocessor for producing processing instructions, character storage means coupled to the microprocessor for storing digital data representing the character to be recognized (character data hereafter), mask means coupled to the microprocessor and the character storage means for automatically providing digital data representing a plurality of typestyle masks (mask data hereafter) for comparison with the character data, processor means coupled to the microprocessor, character storage means and mask means for processing and reprocessing digital data representing mask data and character data in response to instructions received from the microprocessor, and correlation means coupled to the character storage means, the mask means and the processing means for correlating the character data and mask data, said correlation means including means for analyzing digital data representing a selectable dead-band region including a plurality of registration zones on and around a selected pixel within the printed characters which can comprise as many as nine registration zones including a central correlation zone centered on the selected central pixel, center-left, center-right, up-center and down-center correlation zones each shifted one pixel with respect to the horizontal and vertical strokes of the printed characters left, right, up and down respectively, from the selected central pixel, and up-left, up-right, down-left and down-right correlation zones each shifted one pixel with respect to the horizontal and vertical strokes of the printed characters, up and left, up and right, down and left, and down and right, respectively, from the selected central pixel, means for comparing each character pixel of character data to a corresponding combination of stored mask data representing a plurality of mask pixels within a dead-band region of plus and minus one pixel above, below, to the left and to the right, of a selected character pixel, means for comparing each mask pixel with the corresponding combination of character pixels within a dead-band region of plus and minus one pixel above, below, to the left and to the right, of a selected mask pixel, and means for storing digital data representing the correlation of mask data with character data.

2. In a character recognition system, a correlator comprising:

first means for comparing individual bits of digital data representing the character to be recognized (character data bits hereafter) with corresponding individual bits of digital data representing a plurality of typestyle masks (mask data bits hereafter) and with the logical combination of mask data bits immediately adjacent to said corresponding mask data bits, and computing a first comparison score;

second means for comparing mask data bits with the corresponding character data bits and with the logical combinations of character data bits immediately adjacent the corresponding character data bits, and computing a second comparison score;

score register coupled to the first and second means for storing the first and second comparison scores and producing a first signal in response thereto; and third means, coupled to the score register for producing a second signal if the first signal is above a preselectable value, and for producing a third signal if the first signal is below a preselected value.

3. An apparatus as in claim 1 wherein the means for analyzing digital data representing the selectable region surrounding each bit of character data comprises:

first and second delay means coupled to the character and mask data, respectively, for time delaying the character and mask data;

logic gate means coupled to the first and second delay means for digitally measuring the amount of intersection of the character and mask data and for producing a digital score representative of the amount of intersection; and a plurality of digital counters coupled to the output of the logic gate means.

4. An apparatus as in claim 3 wherein the means for storing digital data representing the correlation of mask and character data comprises a plurality of digital registers coupled to the plurality of digital counters.

5. An apparatus as in claim 3 wherein the first and second delay means comprise a first and second plurality of serially connected delay lines.

6. An apparatus as in claim 5 wherein the serially connected delay lines each have one or more time delay taps.

7. An apparatus as in claim 3 wherein the logic gate means comprises a plurality of digital gates interconnected to produce digital scores in a plurality of registration zones on and around a selected central pixel within the printed characters.

8. An apparatus as in claim 7 wherein the number of registration zones is nine.

9. An apparatus as in claim 8 wherein the registration zones comprise:

a central correlation zone centered on the selected central pixel;

center-left, center-right, up-center and down-center correlation zones each shifted one pixel with respect to the horizontal and vertical strokes of the printed characters left, right, up, and down, respectively, from the selected central pixel; and up-left, up-right, down-left, and down-right correlation zones each shifted one pixel with respect to the horizontal and vertical strokes of the printed characters, up and left, up and right, down and left, and down and right, respectively, from the selected central pixel.

10. An apparatus as in claim 7 wherein the number of registration zones is eight.

11. An apparatus as in claim 10 wherein the registration zones comprise:

a central correlation zone centered on the selected central pixel;

center-left, center-right, up-center and down-center correlation zones each shifted one pixel with respect to the horizontal and vertical strokes of the printed characters, left, right, up, and down, respectively, from the selected central pixel; and up-left, up-right, and down-right correlation zones each shifted one pixel with respect to the horizontal and vertical strokes of the printed characters, up and left, up and right, and down and right, respectively, from the selected central pixel.

12. An apparatus as in claim 3 wherein the character data is measured through a mask window centered about a selected pixel made up of a first matrix three horizontal by five vertical pixels in size, and the mask data is measured through a character window centered about the selected pixel made up of a second matrix five horizontal by three vertical pixels in size.

13. In an optical character recognition system, a method for recognizing characters printed on a page, said characters having typestyles with horizontal and vertical stroke width variations, said method comprising:

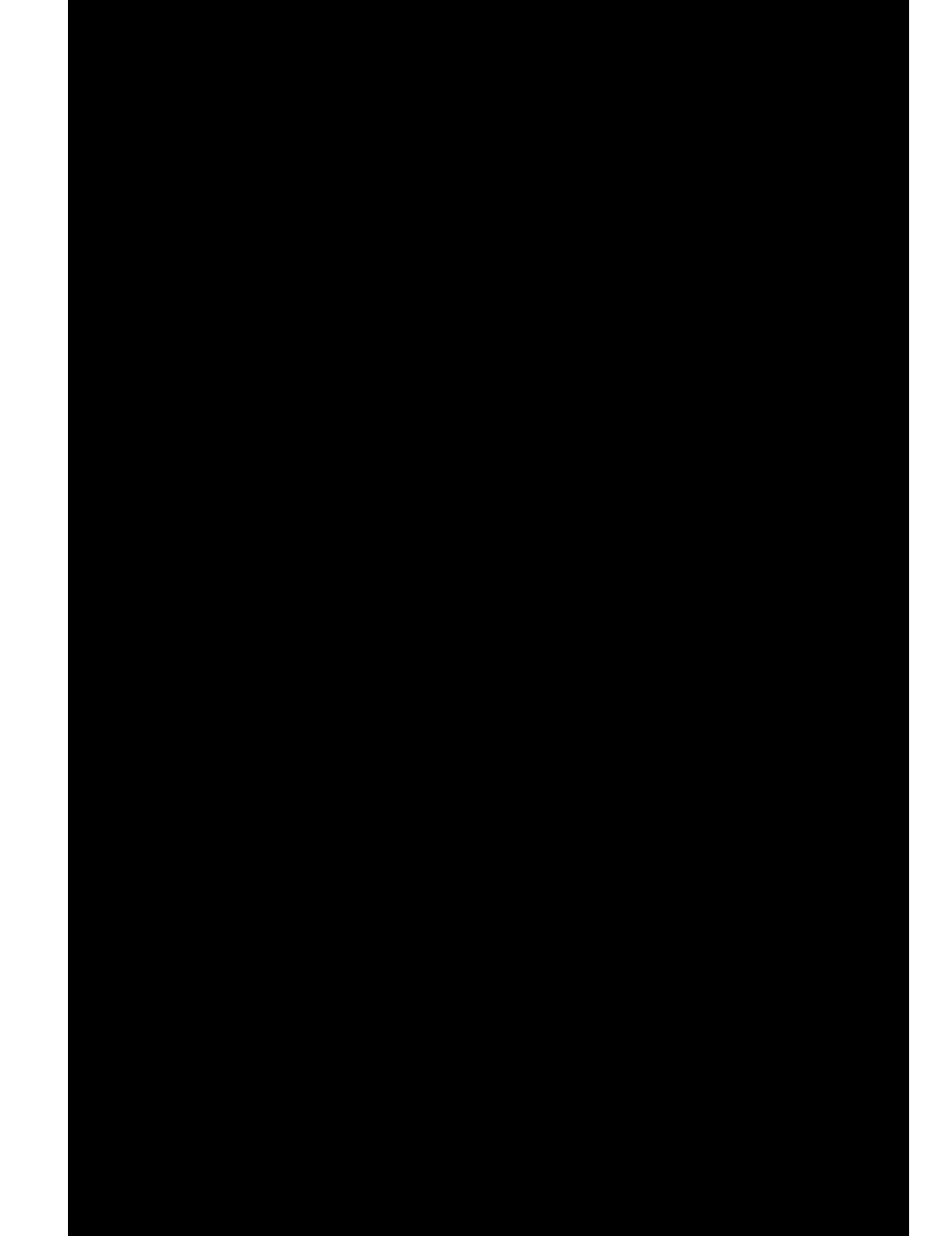

stored mask data representing a plurality of mask pixels within a deadband region of plus and minus one pixel above, below, to the left, and to the right of a selected character pixel;

(c) means for comparing each mask pixel with the corresponding combination of character pixels within a deadband region of plus and minus one pixel above, below, to the left, and to the right of a selected mask pixel; and (d) means for weighting pixels within one pixel of the nearest matching pixel with a weight of zero.

32. The apparatus as in claim 31 further comprising:

(e) means for weighting pixels more than one pixel distant from the nearest matching pixel with a weight of one.

33. The apparatus as in claim 32 further comprising:

(f) means for correlating the comparison results of a plurality of different character to mask registration zones for each character and mask pixel.

34. The apparatus as in claim 32 further comprising means for correlating the comparison results of nine different characters to mask registration zones for each character and mask pixel.

35. The apparatus as in claim 32 further comprising means for correlating the comparison results of eight different character to mask registration zones for each character and mask pixel.

36. The apparatus as in claim 33 further comprising:

(g) means for registering the lowest correlation score if the registered correlation is less than a preselected threshold score; and (h) means for signaling that a potentially satisfactory recognition has occurred.

37. The apparatus as in claim 36 further comprising means for resolving the intersection of two similar but different character masks.

38. The apparatus as in claim 37 wherein said means for resolving the intersection of two similar but different character masks comprises:

(i) means for measuring the threshold score between the mask and character data for a character which is considered recognized to obtain the lowest correlation score;

(j) means for measuring the next lowest correlation score between the recognized character and the next nearest mask neighbor;

(k) means for subtracting the next lowest correlation score from the lowest correlation score to form a separation score.

39. The apparatus as in claim 38 further comprising:

means for compressing the character data into vertical and horizontal silhouette composites;

means for erasing from the data representing the original character field silhouette bits which are isolated by a selected number of pixels greater than the smallest expected character feature size from the main silhouette;

means for repeating the steps (b) through (k) to produce a second correlation score and a second separation score; and means for signaling a satisfactory recognition if the character data field is not blank, the second correlation score is less than the original correlation score, and the second separation score is greater than the original separation score.

40. The apparatus as in claim 37 further comprising means for dividing the set of mask data into separate sets of mask data for different versions of the same generic typestyle.

41. The apparatus as in claim 36 further comprising:

means for centering the character data relative to the mask data field;

means for repeating the steps (b) through (h) to produce a third correlation score;

means for comparing the original and the third correlation scores; and means for accepting the lower of the original and the third correlation scores.

42. The apparatus as in claim 36 further comprising:

(l) means erasing from the character data data representing darkened areas in the bottom row of the character field; and means for repeating steps (b) through (h) and (l) up to a specified number of times if in each repetition the correlation score is less than the previous repetition.

43. The apparatus as in claim 36 further comprising:

(m) means for removing from the character data data representing at least one pixel from the perimeter of each character stroke; and (n) means for repeating elements (b) through (h) and (m) up to a specified number of times if in each repetition the correlation score is less than in the previous repetition.

44. The apparatus as in claim 40 in which the elements (m) and (n) are used continuously within each page of printed characters.

45. The apparatus as in claim 36 further comprising:

(o) means for removing from the character data data representing one pixel from the top and left of each character stroke;

(p) means for removing from the character data data representing one pixel from the bottom and right of each character stroke; and means for repeating elements (b) through (h), (o), and (p) up to a specified number of times if in each repetition the correlation score is less than in the previous repetition.

46. The apparatus as in claim 36 comprising:

(q) means for adding up to the character data data representing one pixel to the top, bottom, left, and right of each character stroke; and (r) means for repeating elements (b) through (h) and (q) up to a specified number of times if in each repetition the correlation score is less than in the previous repetition.

47. The apparatus as in claim 46 in which the elements (q) and (r) are used continuously within each page of printed characters.

48. The apparatus as in claim 36 further comprising means for applying a single character mask set within one typestyle to each successive character until no satisfactory recognition has occurred for one of the successive characters.

* * * * *